US012630738B2

(12) United States Patent
Morgan

(10) Patent No.: US 12,630,738 B2
(45) Date of Patent: May 19, 2026

(54) IN-MOLD COATING CROSSLINKERS, COMPOSITIONS, SYSTEMS, PROCESSES AND ARTICLES

(71) Applicant: RED SPOT PAINT & VARNISH CO., INC., Evansville, IN (US)

(72) Inventor: Paul Leston Morgan, Evansville, IN (US)

(73) Assignee: RED SPOT PAINT & VARNISH CO., INC., Evansville, IN (US)

( * ) Notice: Subject to any disclaimer, the term of this patent is extended or adjusted under 35 U.S.C. 154(b) by 801 days.

(21) Appl. No.: 17/986,596

(22) Filed: Nov. 14, 2022

(65) Prior Publication Data

US 2023/0086386 A1 Mar. 23, 2023

Related U.S. Application Data

(63) Continuation of application No. PCT/US2022/029224, filed on May 13, 2022.

(60) Provisional application No. 63/188,804, filed on May 14, 2021.

(51) Int. Cl.
*C09D 175/06* (2006.01)
*C08K 3/04* (2006.01)

(52) U.S. Cl.
CPC .............. *C09D 175/06* (2013.01); *C08K 3/04* (2013.01)

(58) Field of Classification Search
CPC ................................ C09D 175/06; C08K 3/04
See application file for complete search history.

(56) References Cited

U.S. PATENT DOCUMENTS

| | | | |
|---|---|---|---|
| 3,554,886 A | | 1/1971 | Colomb, Jr. et al. |
| 3,715,342 A | * | 2/1973 | Colomb, Jr. ....... C08G 18/6795 |
| | | | 526/281 |
| 8,518,305 B2 | * | 8/2013 | Tomasulo ................ G03C 1/73 |
| | | | 546/14 |
| 2016/0200938 A1 | * | 7/2016 | Berger ............... C08G 18/0823 |
| | | | 524/591 |

FOREIGN PATENT DOCUMENTS

| | | |
|---|---|---|
| EP | 2 721 106 B1 | 4/2014 |
| EP | 3 495 441 B1 | 6/2019 |

OTHER PUBLICATIONS

International Search Report and Written Opinion for PCT/US2022/029224 mailed Aug. 12, 2022.

* cited by examiner

*Primary Examiner* — Robert S Jones, Jr.
*Assistant Examiner* — Elizabeth Amato
(74) *Attorney, Agent, or Firm* — Foley & Lardner LLP

(57) ABSTRACT

The present disclosure relates generally to in-mold coating compositions that can be adhered to a surface of an article that comprises a cycloolefin polymer, such as polydicyclopentadiene (PDCPD); the constituents, including crosslinkers and polyols, of in-mold coating compositions that can be adhered to a surface of an article that comprises a cycloolefin polymer; systems for adhering an in-mold coating composition to a surface of an article that comprises a cycloolefin polymer; methods for adhering an in-mold coating composition to a surface of an article that comprises a cycloolefin polymer; an in-mold coating layer adhered to a surface of an article that comprises a cycloolefin polymer; and articles comprising an in-mold coating layer adhered to a surface of an article that comprises a cycloolefin polymer.

23 Claims, 22 Drawing Sheets

In-Mold Multifunctional Layer

Interface

Cycloolefin Polymer Layer
(formed upon polymerization)

Mold

Release Agent Layer

In-Mold Multifunctional Layer

Interface

Cycloolefin Polymer Layer
(formed upon polymerization)

Figure 3

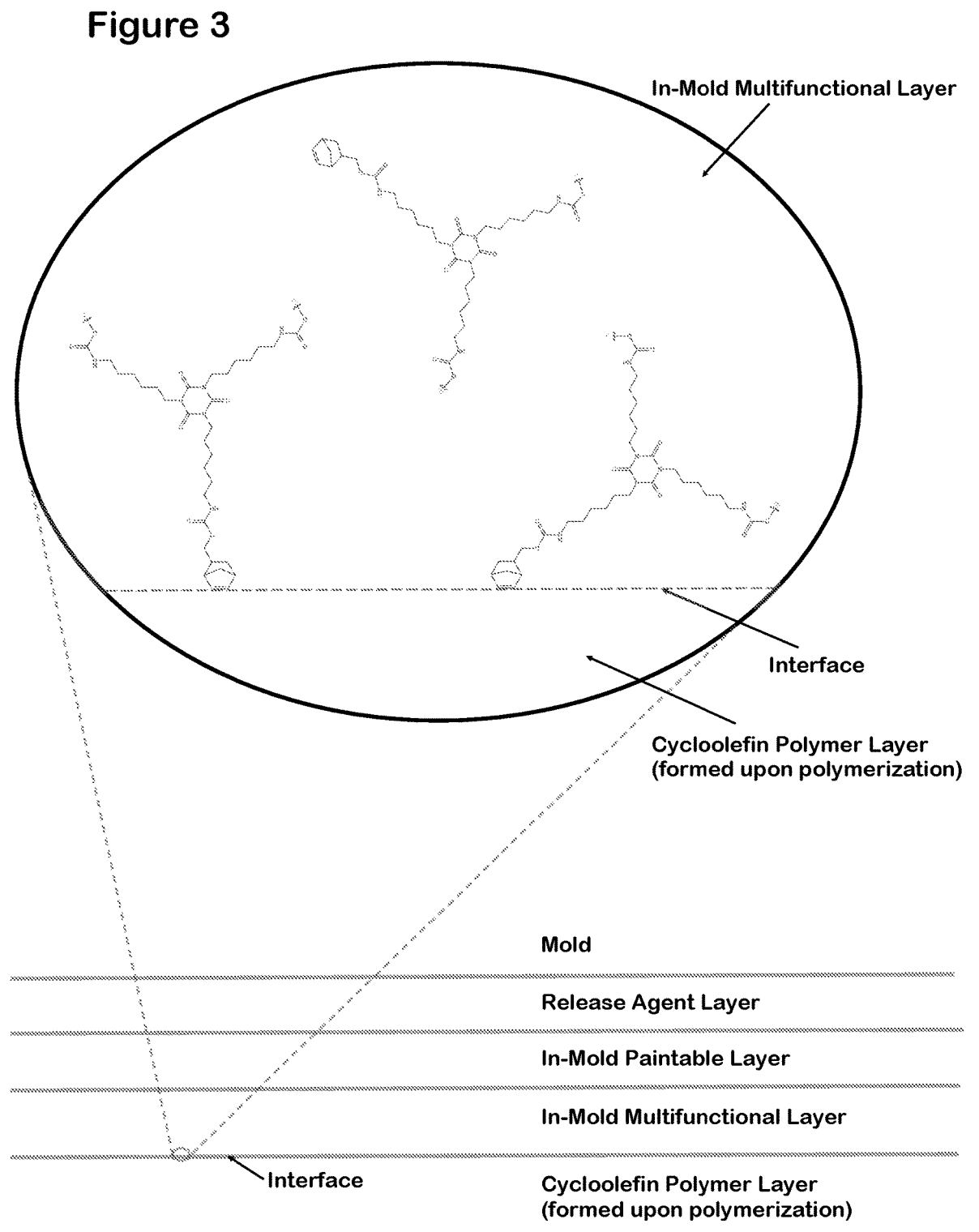

In-Mold Multifunctional Layer

Interface

Cycloolefin Polymer Layer
(formed upon polymerization)

Mold

Release Agent Layer

In-Mold Paintable Layer

In-Mold Multifunctional Layer

Interface

Cycloolefin Polymer Layer
(formed upon polymerization)

In-Mold Multifunctional Layer

Interface

Cycloolefin Polymer Layer
(formed upon polymerization)

Mold

Release Agent Layer

In-Mold Weatherable Topcoat Layer

In-Mold Multifunctional Layer

Interface

Cycloolefin Polymer Layer
(formed upon polymerization)

Figure 5a:  Representative strained cyclic olefins having one or more hydroxyl functional groups

bicyclo[2.2.1]hept-5-en-2-ol

Formula S1.1

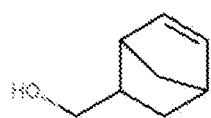

{bicyclo[2.2.1]hept-5-en-2-yl}methanol

Formula S1.2

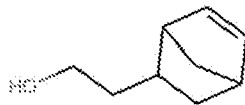

2-{bicyclo[2.2.1]hept-5-en-2-yl}ethan-1-ol

Formula S1.3

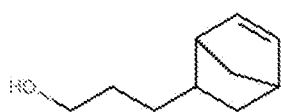

3-{bicyclo[2.2.1]hept-5-en-2-yl}propan-1-ol

Formula S1.4

4-{bicyclo[2.2.1]hept-5-en-2-yl}butan-1-ol

Formula S1.5

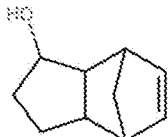

tricyclo[5.2.1.0²,⁶]dec-8-en-3-ol

Formula S1.6

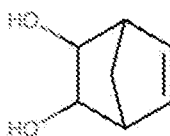

bicyclo[2.2.1]hept-5-ene-2,3-diol

Formula S1.7

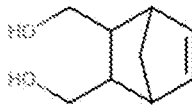

[3-(hydroxymethyl)bicyclo[2.2.1]hept-5-en-2-yl]methanol

Formula S1.8

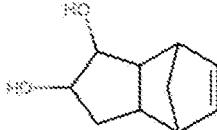

tricyclo[5.2.1.0²,⁶]dec-8-ene-3,4-diol

Formula S1.9

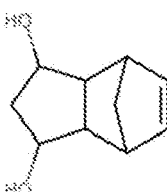

tricyclo[5.2.1.0²,⁶]dec-8-ene-3,5-diol

Formula S1.10

Figure 5b:  Representative strained cyclic olefins having one or more hydroxyl functional groups

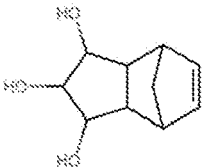

tricyclo[5.2.1.0²,⁶]dec-8-ene-3,4,5-triol,

Formula S1.11

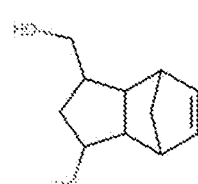

5-(hydroxymethyl)tricyclo[5.2.1.0²,⁶]dec-8-en-3-ol,

Formula S1.12

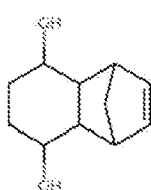

tricyclo[6.2.1.0²,⁷]undec-9-ene-3,6-diol,

Formula S1.13

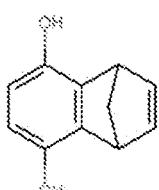

tricyclo[6.2.1.0²,⁷]undeca-2(7),3,5,9-tetraene-3,6-diol,

Formula S1.14

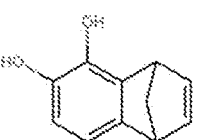

tricyclo[6.2.1.0²,⁷]undeca-2,4,6,9-tetraene-3,4-diol,

Formula S1.15

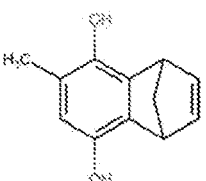

4-methyltricyclo[6.2.1.0²,⁷]undeca-2,4,6,9-tetraene-3,6-diol,

Formula S1.16

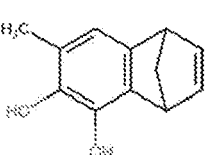

5-methyltricyclo[6.2.1.0²,⁷]undeca-2(7),3,5,9-tetraene-3,4-diol,

Formula S1.17

5-ethyltricyclo[6.2.1.0²,⁷]undeca-2(7),3,5,9-tetraene-3,4-diol.

Formula S1.18

Figure 6: Representative strained cyclic olefins having one or more isocyanate functional groups
5-(2-isocyanatoethyl)bicyclo[2.2.1]hept-2-ene
Formula S2.1
5-(isocyanatomethyl)bicyclo[2.2.1]hept-2-ene
Formula S2.2
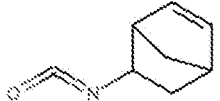
5-isocyanatobicyclo[2.2.1]hept-2-ene
Formula S2.3
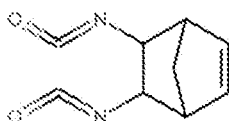
5,6-diisocyanatobicyclo[2.2.1]hept-2-ene
Formula S2.4

Figure 7a: Representative multifunctional crosslinkers

Formula 1

Formula 2

Formula 3

Formula 4

Formula 5

Formula 1.1:

Figure 7b: Representative multifunctional crosslinkers

Formula 1.2:

Formula 1.3:

Figure 7c: Representative multifunctional crosslinkers

Formula 1.4:

Formula 1.5:

Figure 7d: Representative multifunctional crosslinkers

Formula 1.6:

Formula 1.7:

Figure 7e: Representative multifunctional crosslinkers

Formula 1.8:

Formula 1.9:

Figure 7f:  Representative multifunctional crosslinkers

Formula 1.10:

Formula 1.11:

Figure 7g:  Representative multifunctional crosslinkers

Formula 1.12:

Formula 1.13:

Figure 7h:  Representative multifunctional crosslinkers

Formula 2.1:

Formula 2.2:

Figure 7i: Representative multifunctional crosslinkers

Formula 3.1:

Formula 3.2:

Figure 7j: Representative multifunctional crosslinkers

Formula 4.1:

Formula 4.2:

Figure 7k: Representative multifunctional crosslinkers

Formula 5.1:

Formula 5.2:

Figure 7I: Representative multifunctional crosslinkers

Formula 6:

Formula 6.1:

Formula 6.2:

Figure 7m:  Representative multifunctional crosslinkers

Formula 7:

Formula 7.1:

Formula 7.2:

Formula 7.3:

Figure 8a: Representative crosslinked polyols comprises a first polyol molecule comprises a second polyol molecule

Formula 8:

Figure 8b: Representative crosslinked polyols
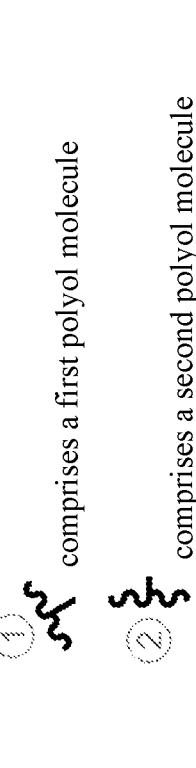
comprises a first polyol molecule
comprises a second polyol molecule
Formula 9:
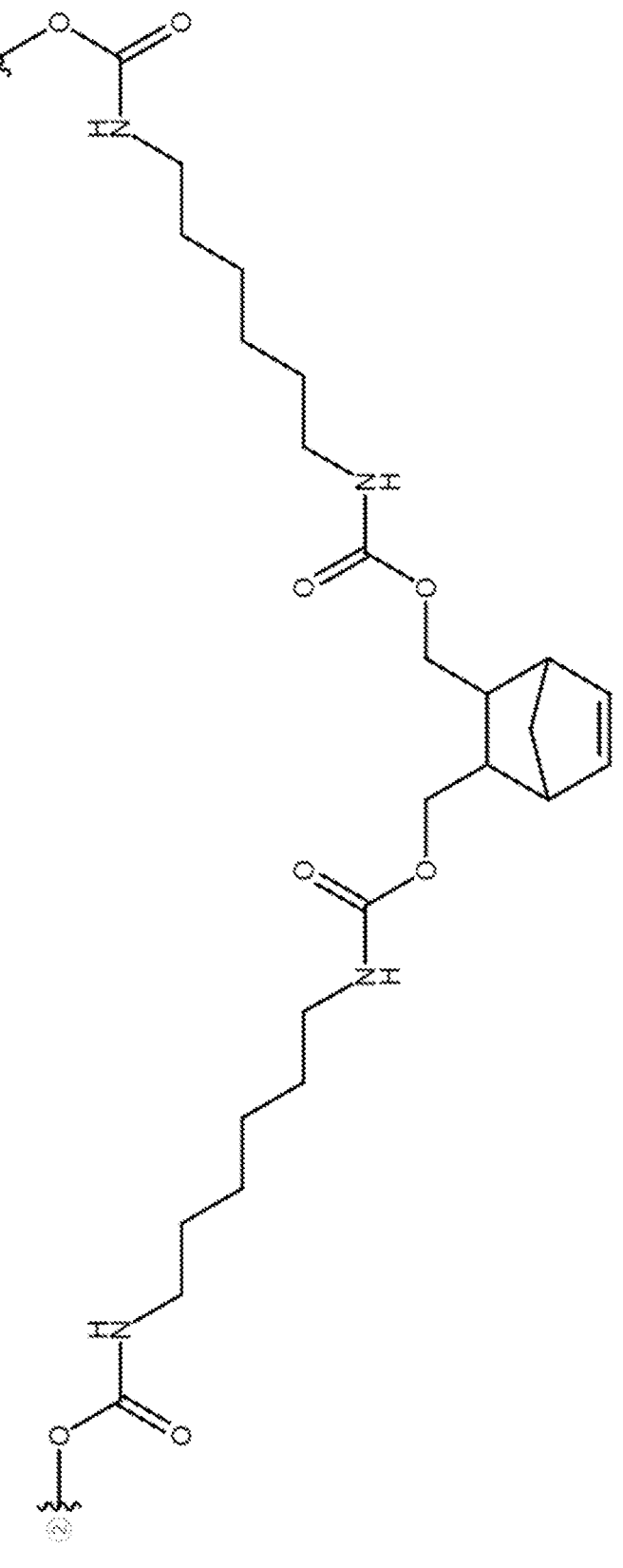

IN-MOLD COATING CROSSLINKERS, COMPOSITIONS, SYSTEMS, PROCESSES AND ARTICLES

CROSS REFERENCE TO RELATED APPLICATIONS

This application is a continuation of International Patent Application No. PCT/US2022/029224, filed May 13, 2022, which claims priority from U.S. Provisional Patent Application No. 63/188,804, filed May 14, 2021, both of which are hereby incorporated by reference in their entireties.

FIELD

The present disclosure relates generally to in-mold coating compositions that can be adhered to a surface of an article that comprises a cycloolefin polymer, such as polydicyclopentadiene (PDCPD); the constituents, including crosslinkers and polyols, of in-mold coating compositions that can be adhered to a surface of an article that comprises a cycloolefin polymer; systems for adhering an in-mold coating composition to a surface of an article that comprises a cycloolefin polymer; methods for adhering an in-mold coating composition to a surface of an article that comprises a cycloolefin polymer; an in-mold coating layer adhered to a surface of an article that comprises a cycloolefin polymer; and articles comprising an in-mold coating layer adhered to a surface of an article that comprises a cycloolefin polymer.

BACKGROUND

Cycloolefin polymers are thermoplastic polymers that can be molded into articles having desired geometries and dimensions. The molding process typically involves injecting low viscosity solutions comprising strained cyclic olefin monomers, such as formulated dicyclopentadiene (DCPD) solutions, into a closed mold. Under the effect of an appropriate catalyst, the monomers rapidly polymerize into an article that comprises a cycloolefin polymer. The resulting articles are generally polyolefinic in nature with some remaining alkene content.

Due to the polyolefinic nature of cycloolefin polymers, traditional coating compositions often fail to adhere to cycloolefin polymer articles. In the case of cycloolefin polymer articles comprising polydicyclopentadiene (PDCPD), one approach to overcome poor adherence has been to oxidize some of the double bonds found near the surface of the PDCPD article, after which the material becomes paintable using specialty primers and topcoats. But because UV light degrades PDCPD, articles comprising PDCPD must be protected from UV exposure until coated. Having a cost-effective and commercially feasible means to coat articles comprising cycloolefin polymers, such as articles comprising PDCPD, during the molding process would result in significant cost reductions for manufacturers of such articles.

There is a need for crosslinkers, polyols, compositions, methods, and systems for applying in-mold coatings to articles that comprise a cycloolefin polymer, such as PDCPD. This disclosure addresses these needs.

BRIEF SUMMARY

In one aspect, provided herein is an in-mold coating composition, the in-mold coating composition comprising:
   a plurality of polyol molecules;
   a polyol-polyol crosslinker functionality;

a polyol-cycloolefin crosslinker functionality; and
   a urethane formation catalyst.

In another aspect, provided herein is an in-mold coating composition, the in-mold coating composition comprising:
   a plurality of polyol molecules;
   a urethane formation catalyst; and
   a multifunctional crosslinker,
   wherein the multifunctional crosslinker comprises:
   a first isocyanate substructure comprising a first isocyanate functional group;
   a second isocyanate substructure comprising a second isocyanate functional group; and
   a cyclic olefin substructure comprising a strained cyclic olefin moiety.

In another aspect, provided herein is a multifunctional crosslinker for use in a system for applying an in-mold coating to an article that comprises a cycloolefin polymer, the multifunctional crosslinker comprising:
   a first isocyanate substructure comprising a first isocyanate functional group;
   a second isocyanate substructure comprising a second isocyanate functional group, and
   a cyclic olefin substructure comprising a strained cyclic olefin moiety.

In another aspect, provided herein is a multi-component system for applying an in-mold coating to a surface of an article that comprises polydicyclopentadiene (PDCPD), the multi-component comprising:
   a first component (Component A) comprising a plurality of polyol molecules; and
   a second component (Component B) comprising a multifunctional crosslinker,
   wherein the multifunctional crosslinker comprises:
   a first isocyanate substructure comprising a first isocyanate functional group;
   a second isocyanate substructure comprising a second isocyanate functional group, and
   a cyclic olefin substructure comprising a strained cyclic olefin moiety.

In another aspect, provided herein is a method of manufacturing an in-mold coated article, the method comprising:
   providing a mold having a prepared mold surface;
   contacting the prepared mold surface with one or more in-mold coating compositions, thereby providing a coated mold surface having one or more layers of coating material; and
   contacting the coated mold surface with a polymerizable cyclic olefin material to form a cycloolefin polymer layer through a polymerization reaction,
   wherein at least one in-mold coating composition is an in-mold multifunctional composition, the in-mold multifunctional composition comprising:
   a plurality of polyol molecules;
   a polyol-polyol crosslinker functionality;
   a polyol-cycloolefin crosslinker functionality; and
   a urethane formation catalyst; and
   wherein the in-mold multifunctional composition adheres to the cycloolefin polymer to form an in-mold coated article.

In another aspect, provided herein is a method of manufacturing an in-mold coated article, the method comprising:
   providing a mold having a prepared mold surface;
   contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one in-mold coating composition is an in-mold multifunctional composition, the in-mold multifunctional composition comprising:

a plurality of polyol molecules;

a urethane formation catalyst; and a multifunctional crosslinker; and wherein the in-mold multifunctional composition adheres to the cycloolefin polymer to form an in-mold coated article.

In another aspect, provided herein is an in-mold coated article, the article manufactured using a method comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one in-mold coating composition is an in-mold multifunctional composition, the in-mold multifunctional composition comprising:

a plurality of polyol molecules;

a polyol-polyol crosslinker functionality;

a polyol-cycloolefin crosslinker functionality; and a urethane formation catalyst; and wherein the in-mold multifunctional composition adheres to the cycloolefin polymer to form an in-mold coated article.

In another aspect, provided herein is a crosslinked polyol, the crosslinked polyol comprising:

a first polyol molecule;

a second polyol molecule; and a linked multifunctional crosslinker, wherein the linked multifunctional crosslinker comprises a strained cyclic olefin moiety, and wherein the linked multifunctional crosslinker is bound to the first polyol molecule though a first urethane functional group, and is bound to the second polyol molecule though a second urethane functional group.

These and other aspects and features of the disclosure are described in the following drawings, detailed description, examples, illustrative embodiments, and claims.

DESCRIPTION OF THE DRAWINGS

The disclosure can be more completely understood with reference to the following drawings:

FIG. 3 is a schematic representation of an in-mold multifunctional layer in contact with a formulated DCPD solution injected into a closed mold, which formulated DCPD forms a cycloolefin polymer layer upon polymerization, as described for FIG. 1. A multifunctional crosslinker, which is found within the in-mold multifunctional layer, is also depicted in schematic form, also as described for FIG. 1. In this schematic representation, a distinct in-mold paintable layer is present. In some embodiments, upon removing the in-mold coated cycloolefin polymer article from the mold, a weatherable coating system, for example, may be applied post-mold to the in-mold coated cycloolefin polymer article. The in-mold paintable layer need not, but optionally may, comprise a multifunctional crosslinker. An optional release agent layer is also present in this depicted embodiment. In some embodiments, the optional release agent layer is removed from the in-mold coated cycloolefin polymer article after the article is removed from the mold. In some embodiments, the optional release agent layer is removed from the in-mold coated cycloolefin polymer article after the article is removed from the mold, and a weatherable coating system is then applied post-mold to the in-mold coated cycloolefin polymer article.

FIGS. 5a and 5b depict representative strained cyclic olefin compounds, each strained cyclic olefin compound comprising one or more strained cyclic olefin moieties and one or more hydroxyl functional groups.

FIG. 6 depicts representative strained cyclic olefin compounds, each strained cyclic olefin compound comprising one or more strained cyclic olefin moieties and one or more isocyanate functional groups.

Figure 7A:
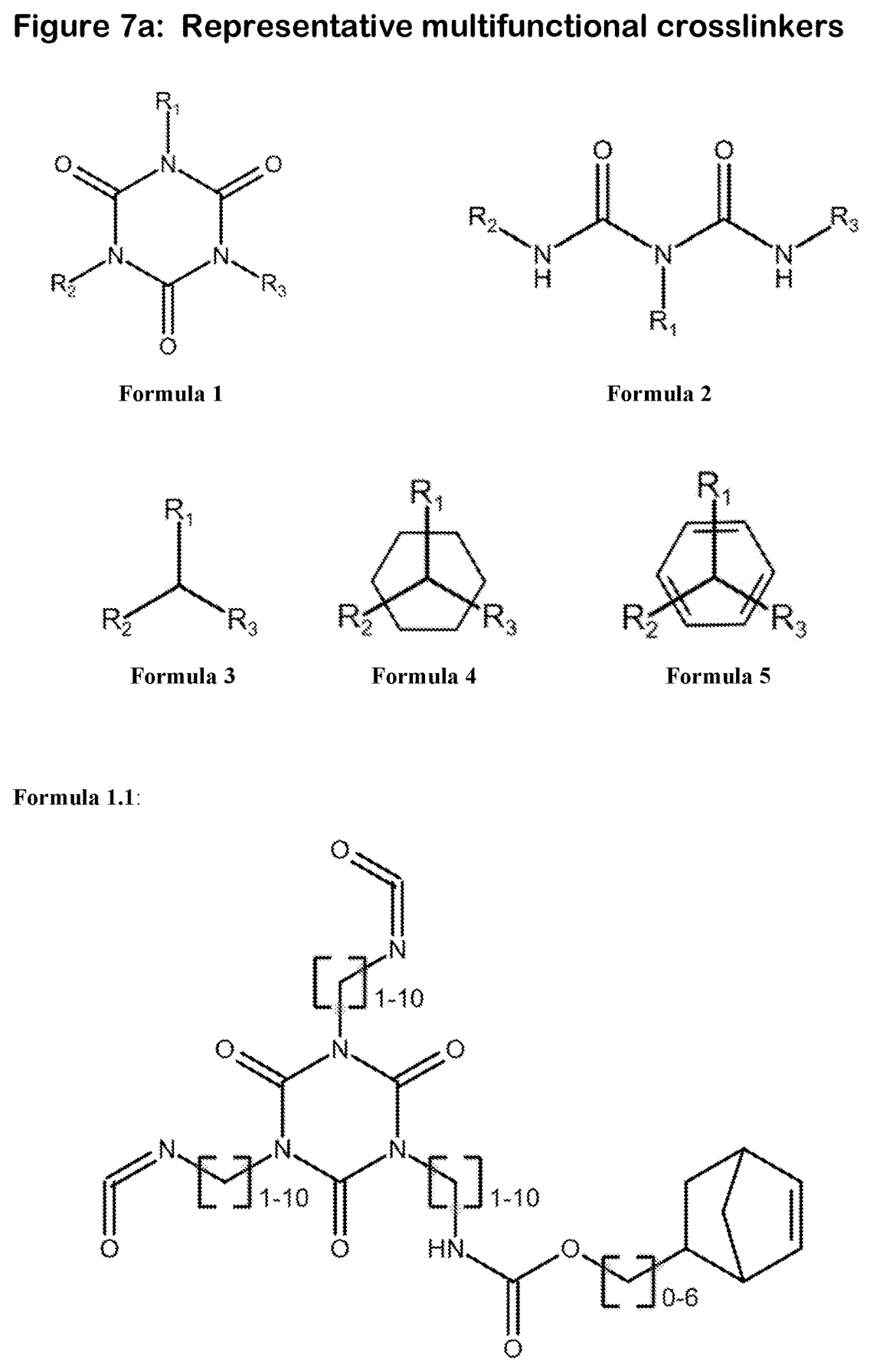
Figure 7B:
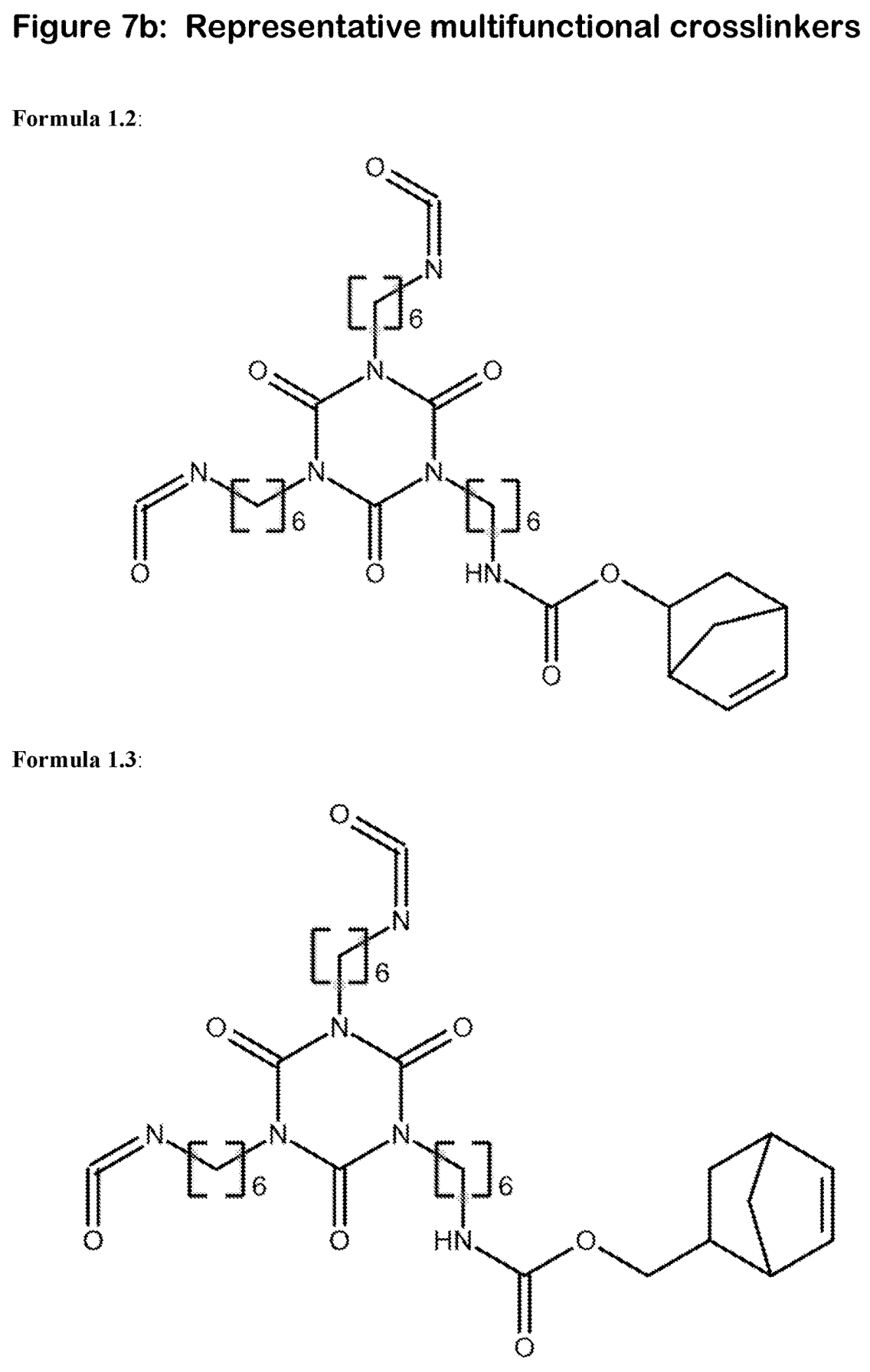
Figure 7C:
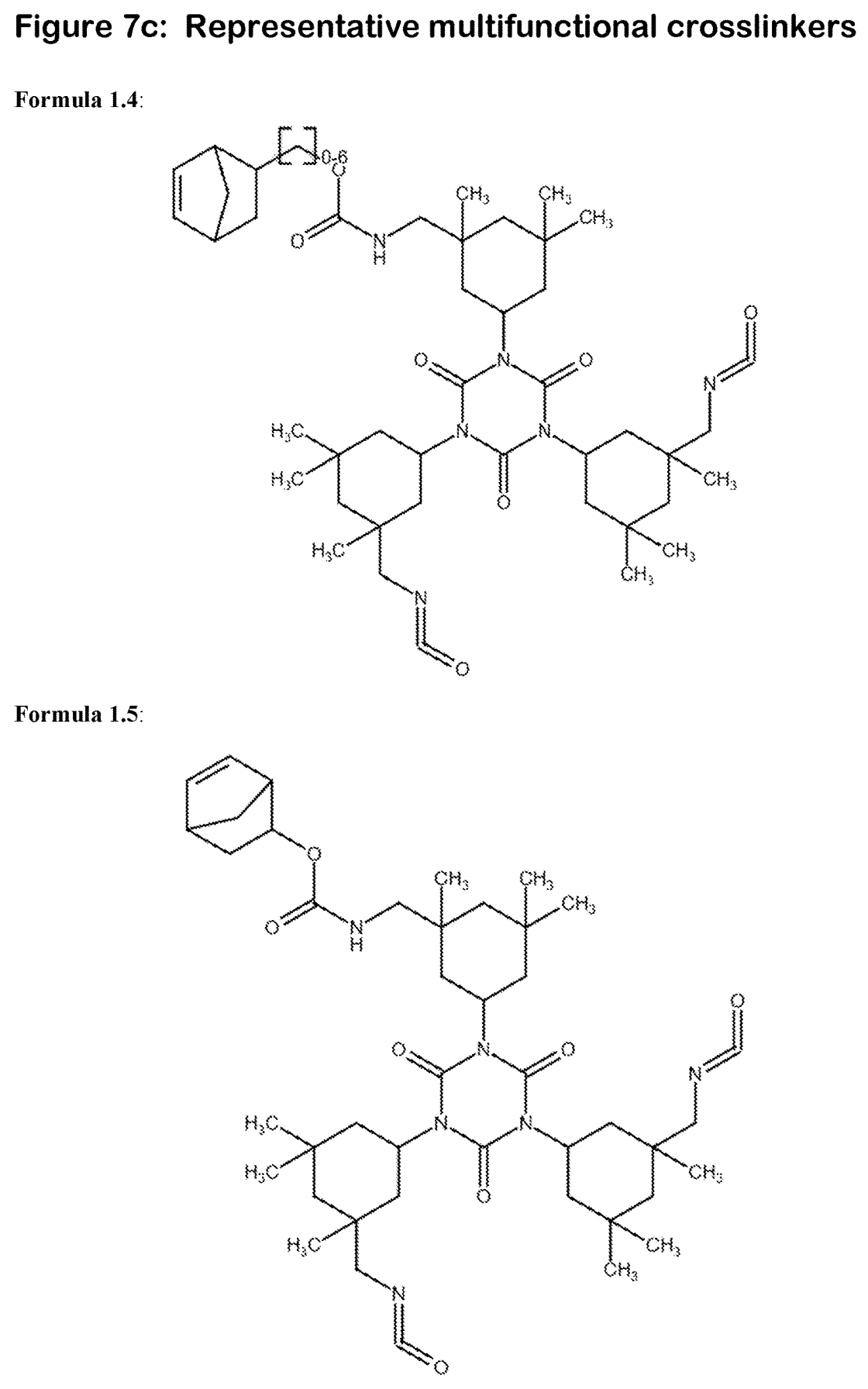
Figure 7D:
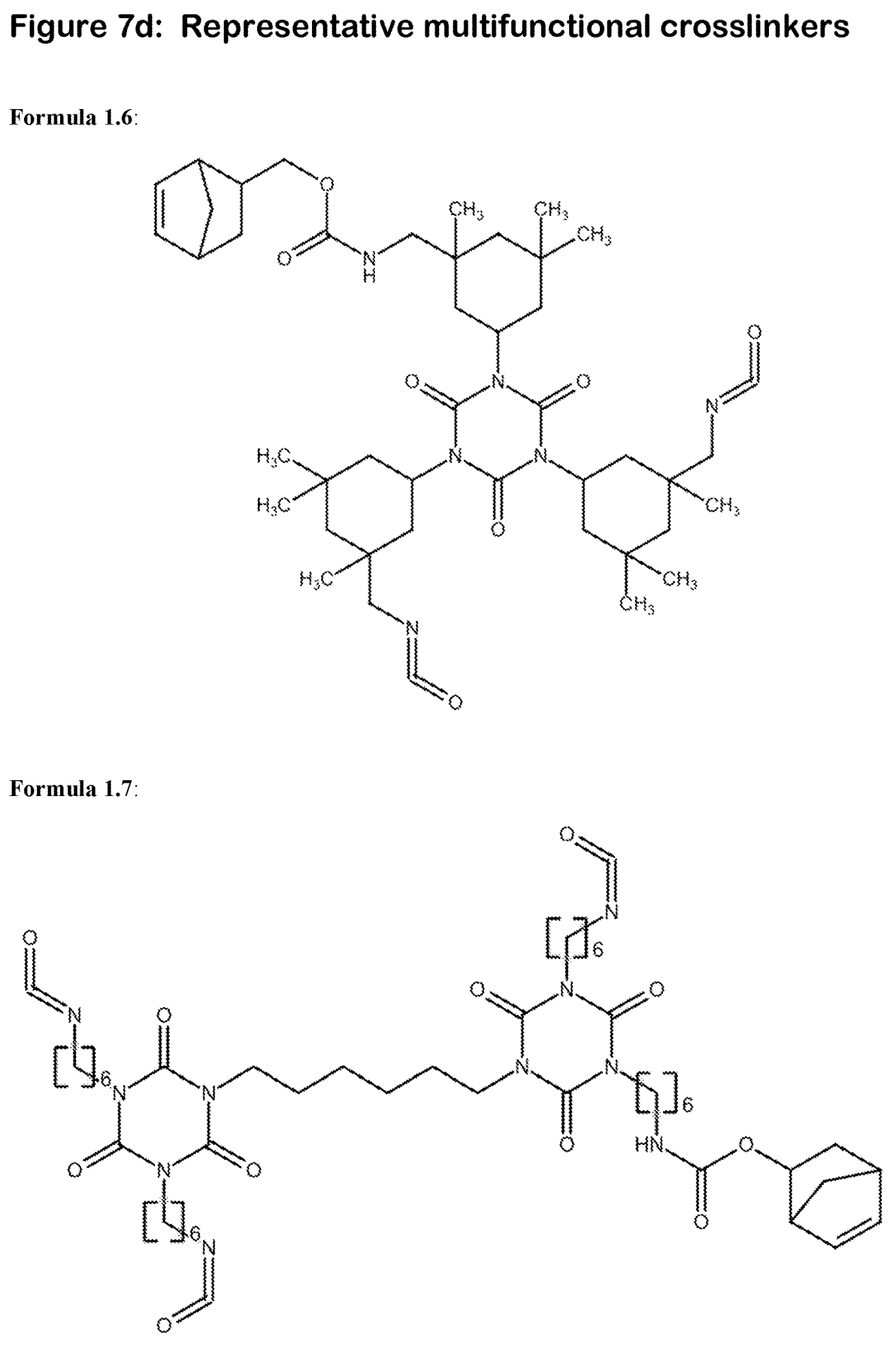
Figure 7E:
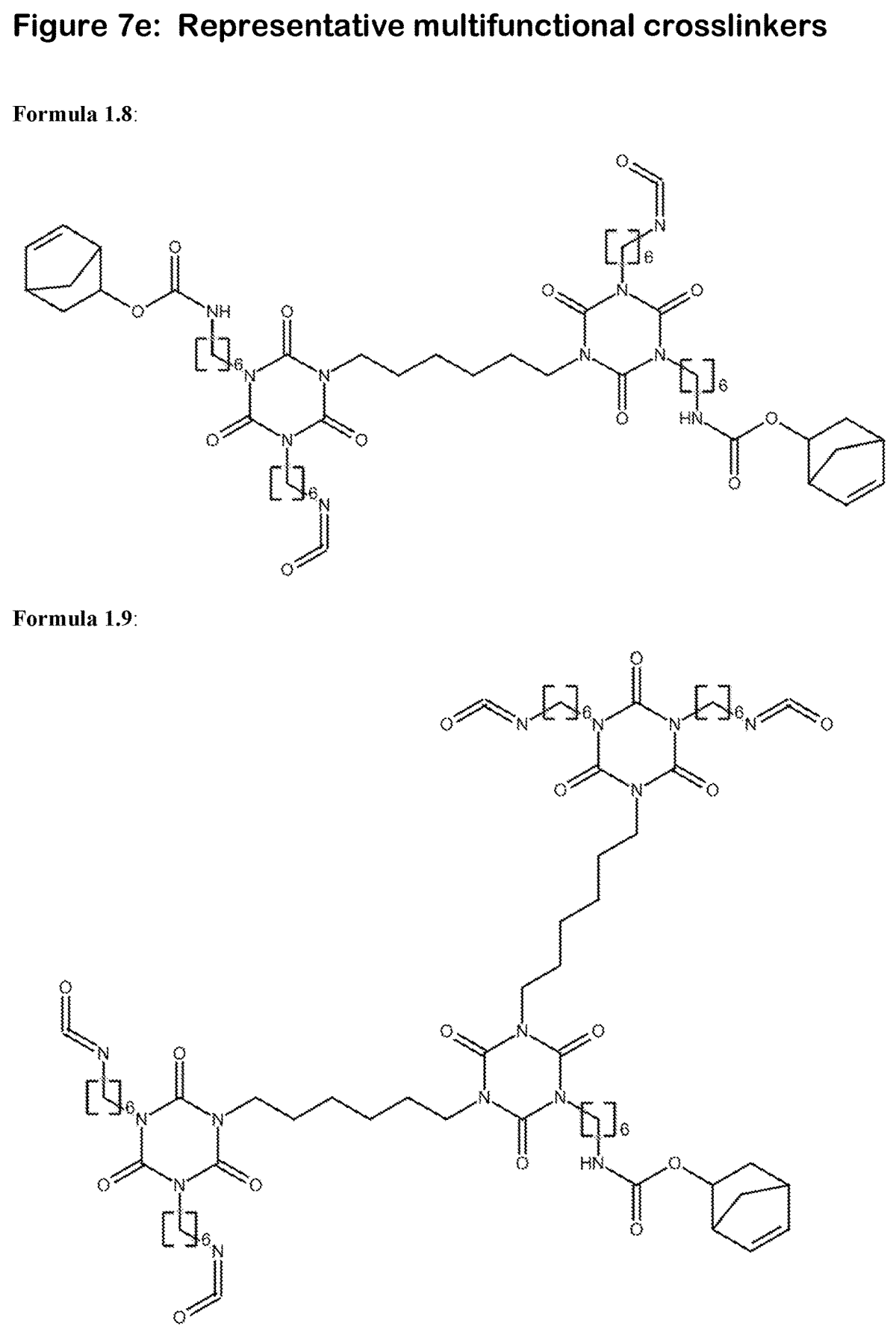
Figure 7F:
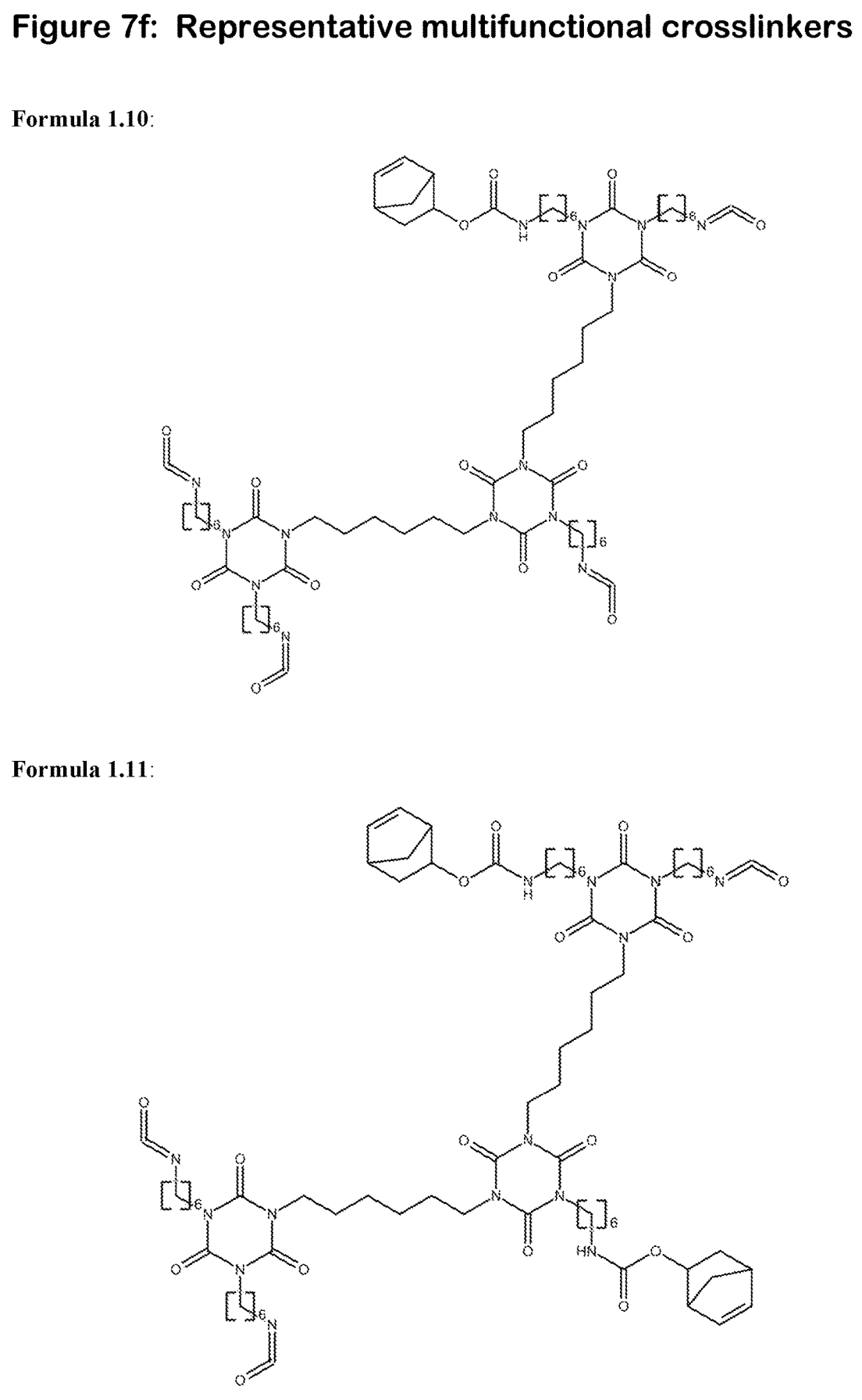
Figure 7G:
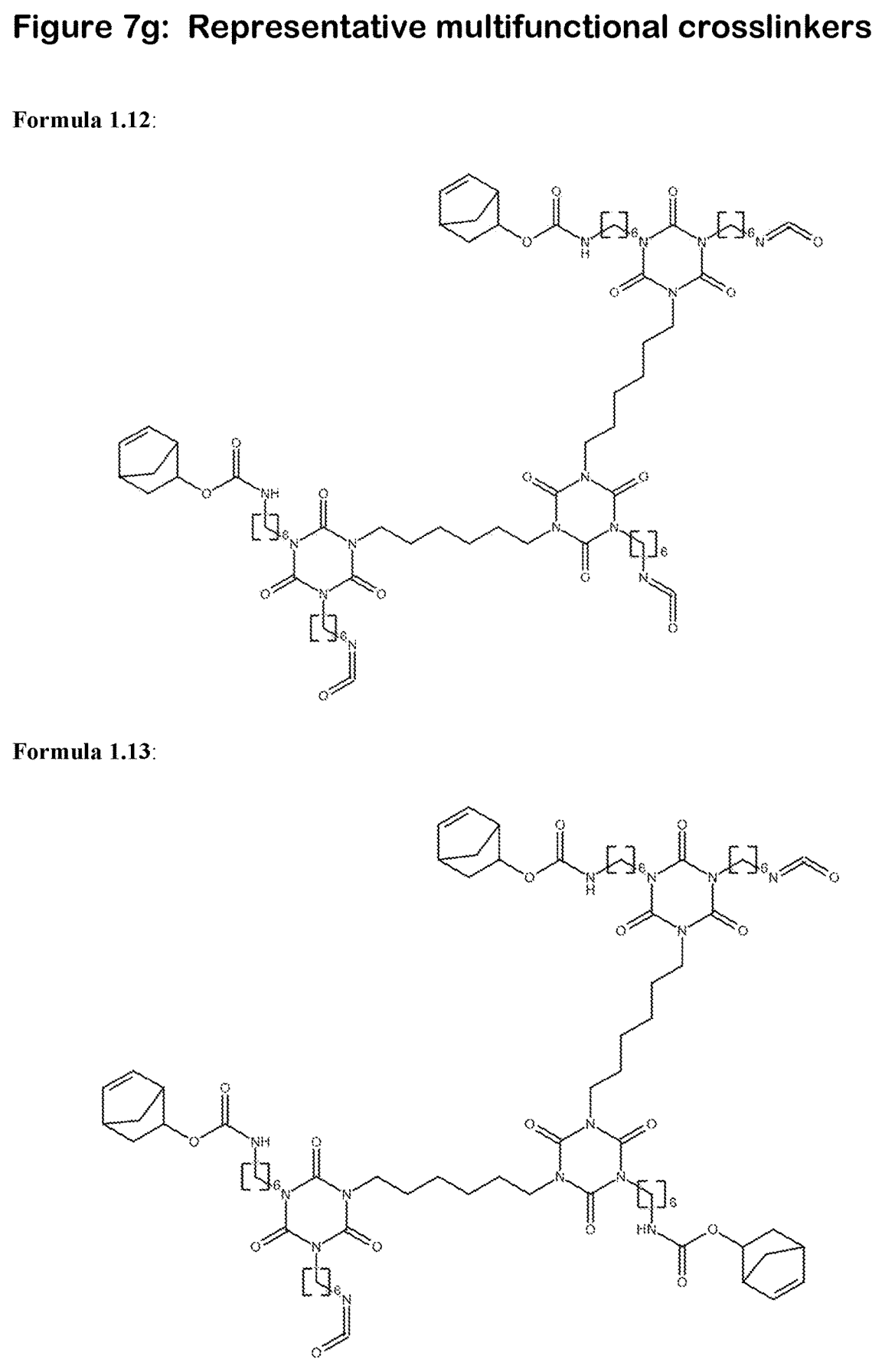
Figure 7H:
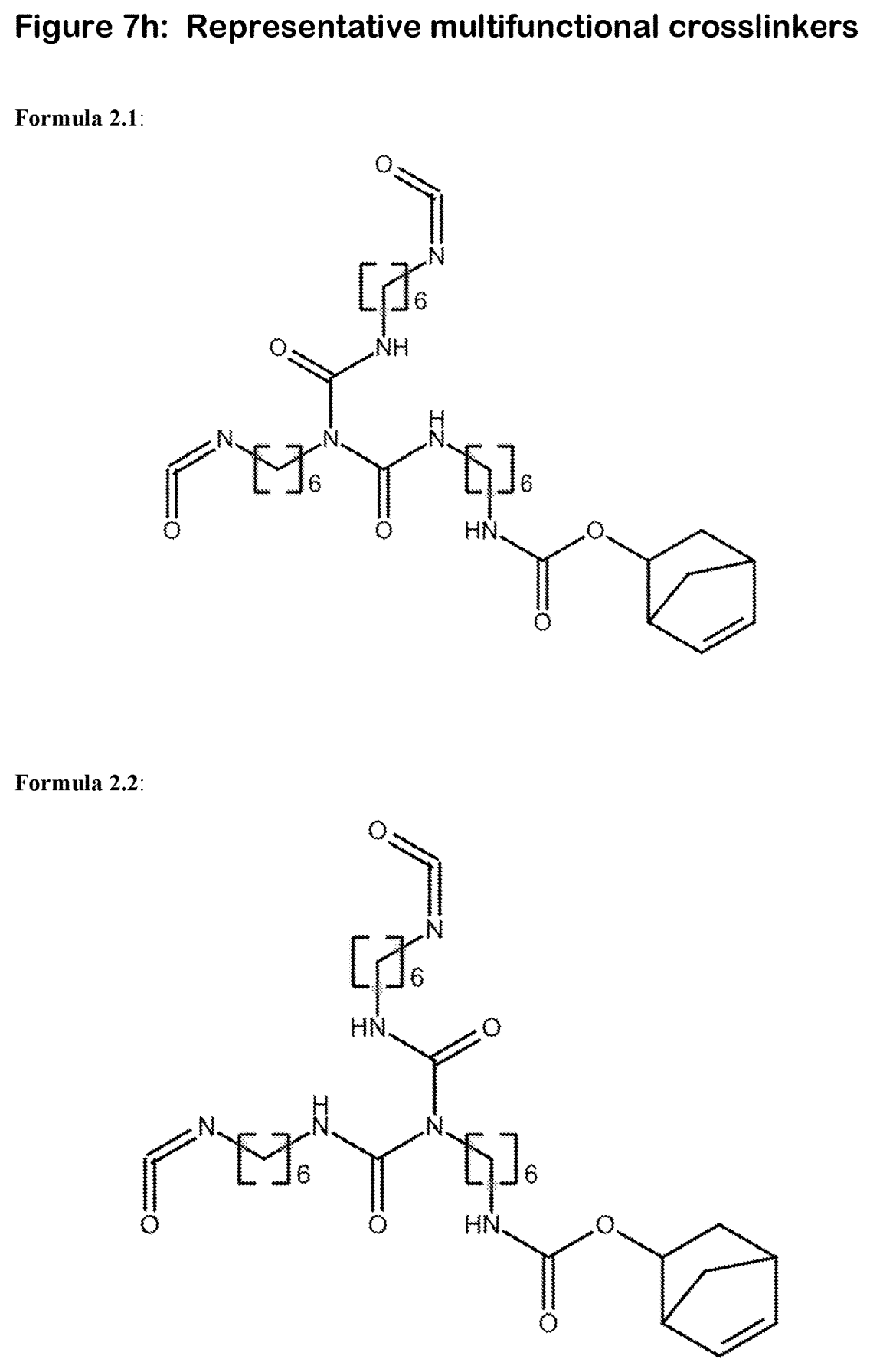
Figure 7I:
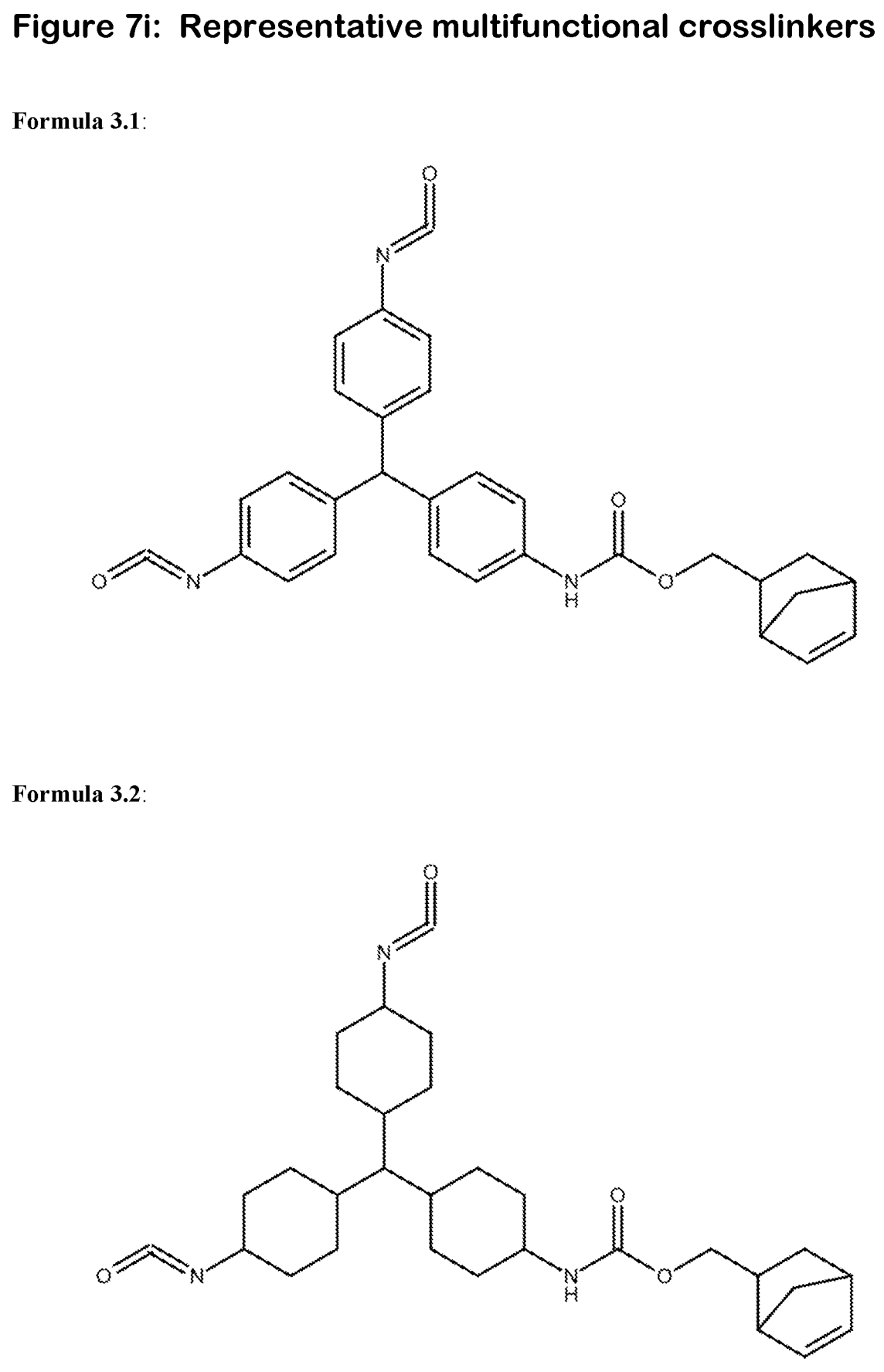
Figure 7J:
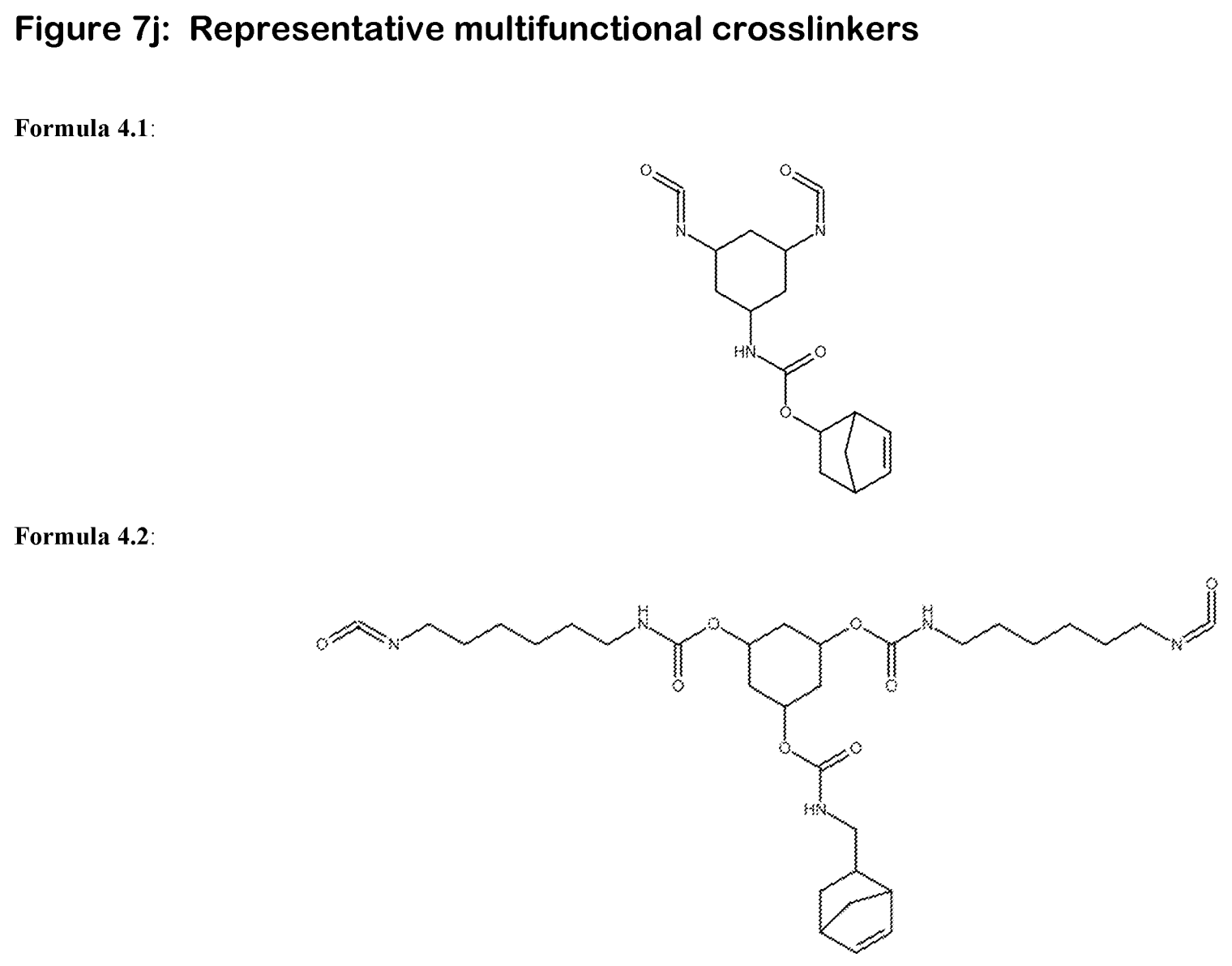
Figure 7K:
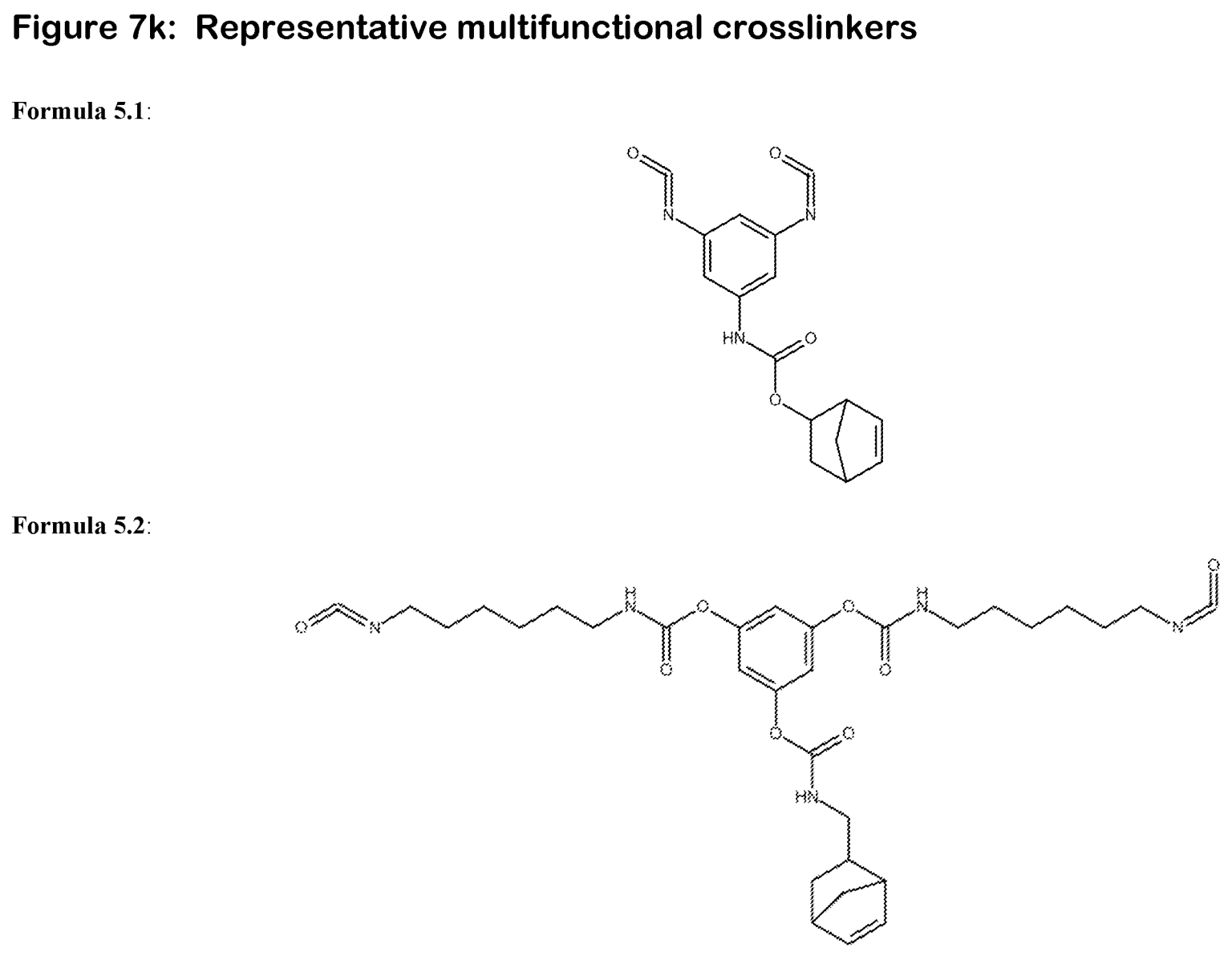
Figure 7I:
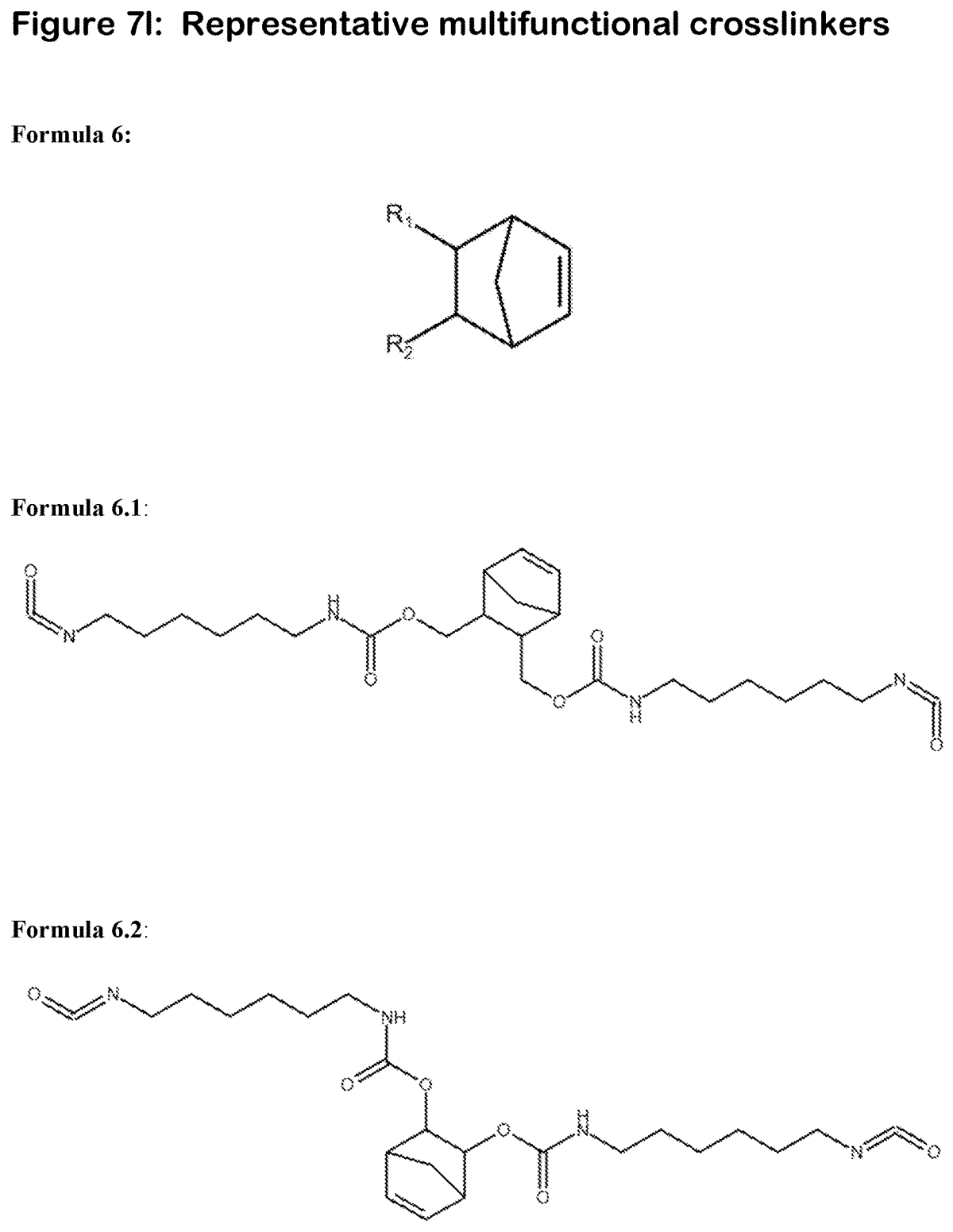
Figure 7M:
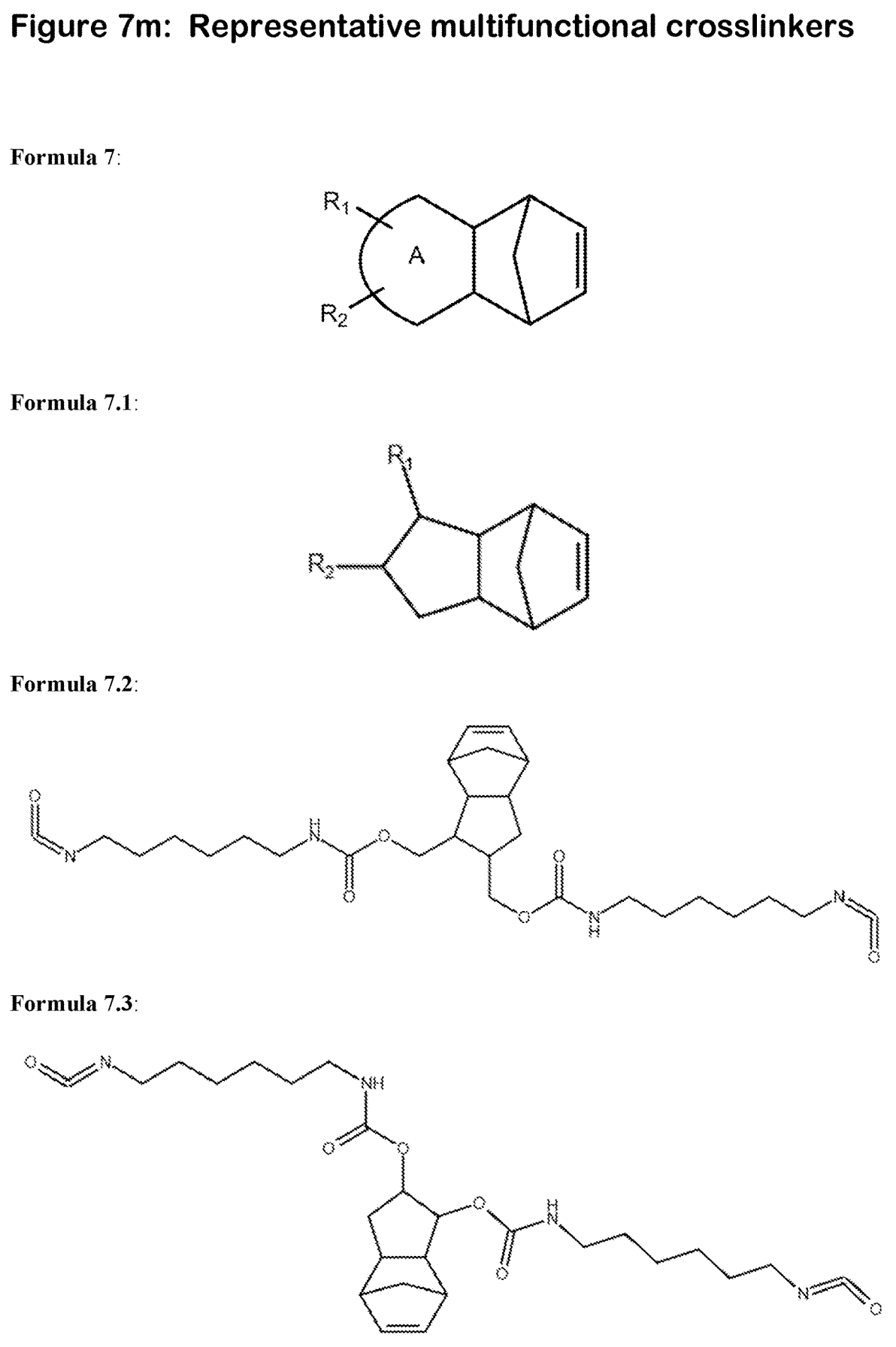

FIGS. 7a, 7b, 7c, 7d, 7e, 7f, 7g, 7h, 7i, 7j, 7k, 7l and 7m depict representative multifunctional crosslinkers.

Figure 8A:
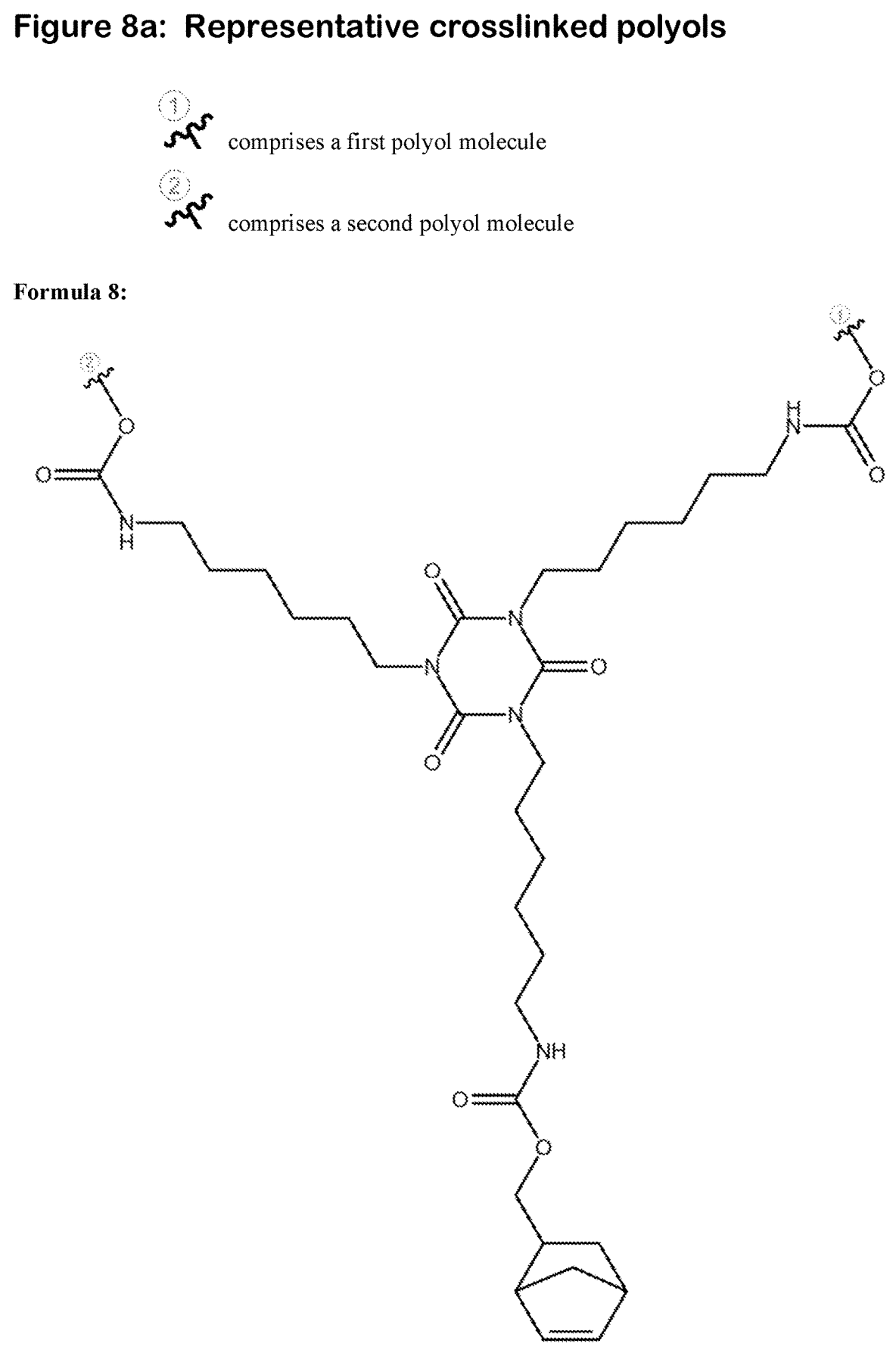

FIGS. 8a and 8b depict representative crosslinked polyols.

DETAILED DESCRIPTION

Figure 1:
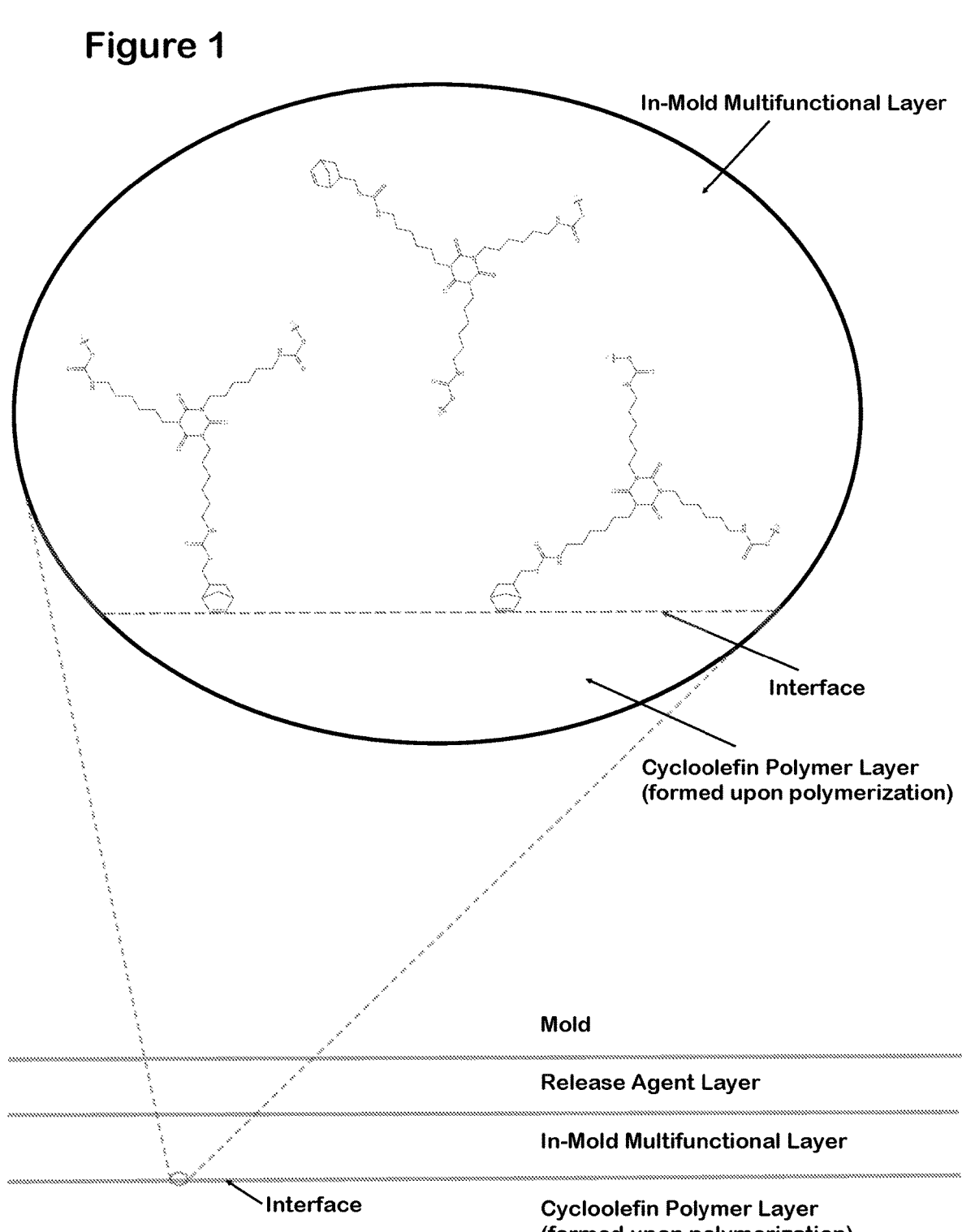
FIG. 1 is a schematic representation of an in-mold multifunctional layer in contact with a formulated DCPD solution injected into a closed mold, which formulated DCPD forms a cycloolefin polymer layer upon polymerization. A multifunctional crosslinker, which is found within the in-mold multifunctional layer, is also depicted in schematic form. In this schematic representation, two polyol molecules are bound to each multifunctional crosslinker through urethane bonds, and the norbornene moiety of each multifunctional crosslinker is in a closed ring configuration, as would be expected immediately upon injection of the formulated DCPD solution into the closed mold. Without being limited to any particular theory, it is believed that some of the norbornene moieties of the multifunctional crosslinkers may, with time, bind to the cycloolefin polymer layer through covalent or non-covalent interactions at an interface shared between the in-mold multifunctional layer and the cycloolefin polymer layer. In some embodiments, the in-mold multifunctional layer may also function as an in-mold paintable layer. In some embodiments, upon removing the in-mold coated cycloolefin polymer article from the mold, a weatherable coating system, for example, may be applied post-mold to the in-mold coated cycloolefin polymer article. An optional precoating layer comprising a release agent (alternatively referred to as a release agent layer or a mold release agent layer) is also present in this depicted embodiment. In some embodiments, the optional release agent layer is removed from in-mold coated cycloolefin polymer article, such as by wiping with isopropyl alcohol or other solvents, after the article is removed from the mold. In some embodiments, the optional release agent layer is removed from the in-mold coated cycloolefin polymer article after the article is removed from the mold, and a weatherable coating system is then applied post-mold to the in-mold coated cycloolefin polymer article.
Figure 2:
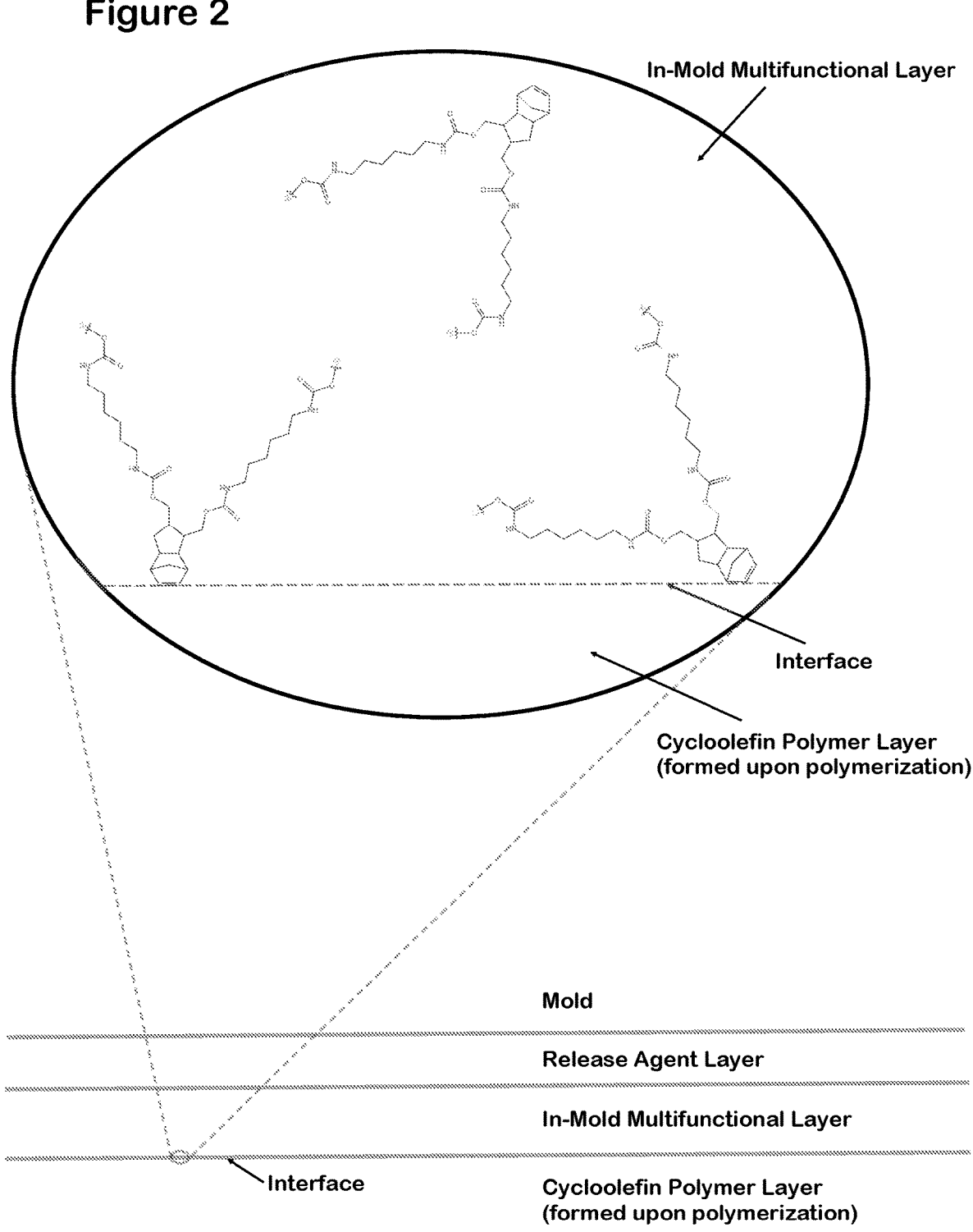
FIG. 2 is a schematic representation of an in-mold multifunctional layer in contact with a formulated DCPD solution injected into a closed mold, which formulated DCPD forms a cycloolefin polymer layer upon polymerization, as described for FIG. 1. A multifunctional crosslinker, which is found within the in-mold multifunctional layer, is also depicted in schematic form, also as described for FIG. 1 and illustrates a different embodiment of the multifunctional crosslinker compared to the multifunctional crosslinker depicted in FIG. 1. In some embodiments, the in-mold multifunctional layer may also function as an in-mold paintable layer. In some embodiments, upon removing the in-mold coated cycloolefin polymer article from the mold, a weatherable coating system, for example, may be applied post-mold to the in-mold coated cycloolefin polymer article. An optional release agent layer is also present in this depicted embodiment. In some embodiments, the optional release agent layer is removed from in-mold coated cycloolefin polymer article after the article is removed from the mold. In some embodiments, the optional release agent layer is removed from the in-mold coated cycloolefin polymer article after the article is removed from the mold, and a weatherable coating system is then applied post-mold to the in-mold coated cycloolefin polymer article.
Figure 4:
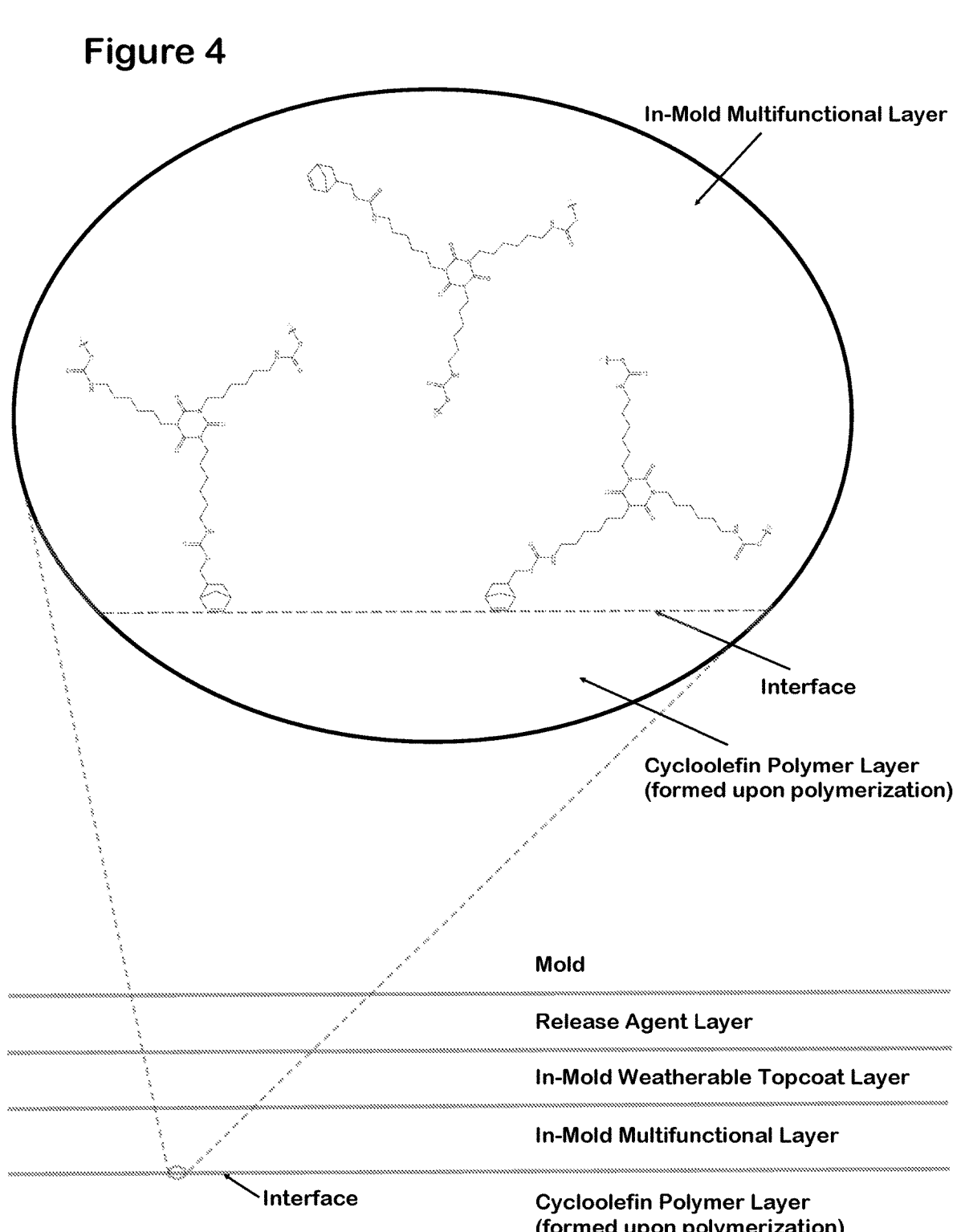
FIG. 4 is a schematic representation of an in-mold multifunctional layer in contact with a formulated DCPD solution injected into a closed mold, which formulated DCPD forms a cycloolefin polymer layer upon polymerization, as described for FIG. 1. A multifunctional crosslinker, which is found within the in-mold multifunctional layer, is also depicted in schematic form, also as described for FIG. 1. In this schematic representation, an in-mold weatherable topcoat layer is present. An optional release agent layer is also present in this depicted embodiment. In some embodiments, the optional release agent layer is removed from the in-mold coated cycloolefin polymer article after the article is removed from the mold.

The present disclosure relates generally to in-mold coating compositions that can be adhered to a surface of an article that comprises a cycloolefin polymer, such as polydicyclopentadiene (PDCPD); the constituents, including crosslinkers and polyols, of in-mold coating compositions that can be adhered to a surface of an article that comprises a cycloolefin polymer; systems for adhering an in-mold coating composition to a surface of an article that comprises a cycloolefin polymer; methods for adhering an in-mold coating composition to a surface of an article that comprises a cycloolefin polymer; an in-mold coating layer adhered to a surface of an article that comprises a cycloolefin polymer; and articles comprising an in-mold coating layer adhered to a surface of an article that comprises a cycloolefin polymer.

The disclosed compositions have unexpected properties and benefits, such as an ability to adhere to the surface of an article that comprises a cycloolefin polymer when applied using in-mold processes. Some embodiments are exemplified below.

1. Definitions

Unless defined otherwise, all technical and scientific terms used herein have the same meaning as is commonly understood by one of ordinary skill in the art to which this disclosure belongs.

As used herein, the singular forms "a," "an," and "the" include plural references unless indicated otherwise, expressly or by context. For example, "a" dimer includes one or more dimers, unless indicated otherwise, expressly or by context.

As used herein, "moiety" refers to a part or a functional group of a molecule.

As used herein, "strained cyclic olefin moiety" refers to a cyclic olefin moiety comprising two adjacent $sp^2$-hybridized carbon centers that form a double bond within a ring structure, which ring structure is subject to ring strain, and which ring strain enhances the reactivity of the double bond. The amount of ring strain varies for each strained cyclic olefin moiety and depends upon a number of factors including the size of the ring, the presence and identity of substituents, and the presence of multiple rings. Representative compounds comprising a strained cyclic olefin moiety include, but are not limited to, cyclobutene, cyclopentene, cycloheptene, cyclooctene, cyclooctadiene, cyclooctatetraene, dicyclopentadiene, and norbornene. In some embodiments, the strained cyclic olefin moiety is a bicyclic moiety, wherein the two adjacent $sp^2$-hybridized carbon centers that form the double bond reside in a five, six, seven, or eight membered ring. In some embodiments, the strained cyclic olefin moiety is a bicyclic moiety comprising a first ring and a second ring, wherein: the first ring is a five, six, or seven membered ring; and the second ring is a five, six, or seven membered ring. In some embodiments, the bicyclic moiety is a bridged bicyclic moiety. In some embodiments, the strained cyclic olefin moiety is a bridged bicyclic moiety comprising a first ring and a second ring, wherein: the first ring is a five, six, or seven membered ring; and the second ring is a five, six, or seven membered ring. In some embodiments, the strained cyclic olefin moiety is a bridged bicyclic moiety comprising a first ring and a second ring, wherein: the first ring is a five, six, or seven membered ring; and the second ring is a five, six, or seven membered ring, wherein either the first or the second ring optionally comprises a heteroatom. In some embodiments, the strained cyclic olefin moiety is a bridged bicyclic moiety comprising a first ring and a second ring, wherein: the first ring is a five, six, or seven membered ring; and the second ring is a five, six, or seven membered ring. In some embodiments, the strained cyclic olefin moiety is a bridged bicyclic moiety comprising a first ring and a second ring, wherein: the first ring is a five, six, or seven membered ring; and the second ring is a five, six, or seven membered ring, wherein either the first or the second ring optionally comprises a heteroatom, and wherein the heteroatom is oxygen (O). In some embodiments, the strained cyclic olefin moiety is a bridged bicyclic moiety comprising a first ring and a second ring, wherein: the first ring is a six membered ring; and the second ring is a five, six, or seven membered ring, and wherein either the first ring or the second ring optionally comprises a heteroatom, and wherein the heteroatom is oxygen (O). In some embodiments, the strained cyclic olefin moiety comprises the following backbone structure:

Formula M1 wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. Representative examples of molecules that comprise the strained cyclic olefin moiety of Formula M1 include: norbornene; 5-norbornene-2-ol; 5-norbornene-2,3-dimethanol; 5-ethylidene-2-norbornene; 2-{bicyclo[2.2.1]hept-5-en-2-ylidene}ethan-1-ol; {2-oxabicyclo[2.2.2]oct-5-en-3-yl}methanol; dicyclopentadiene; tricyclopentadiene; tetracyclododecene; 2-{bicyclo[2.2.2]oct-5-en-2-ylidene}ethan-1-ol; {bicyclo[2.2.2]oct-5-en-2-yl}methanol; bicyclo[2.2.2]oct-7-ene-2,5-diol; [7-(hydroxymethyl)bicyclo[3.2.2]non-8-en-6-yl]methanol; [3-(hydroxymethyl)-7-oxabicyclo[2.2.1]hept-5-en-2-yl]methanol; 15,16-dioxapentacyclo[10.2.1.1$^{5,8}$.0$^{2,11}$.0$^{4,9}$]hexadeca-6,13-diene; 7-oxabicyclo[2.2.1]hept-5-en-2-ol 8-oxabicyclo[3.2.1]oct-6-en-2-ol; 10-oxa-4-azatricyclo[5.2.1.0$^{2,6}$]dec-8-ene; and 15,16-dioxapentacyclo[10.2.1.1$^{5,8}$.0$^{2,11}$.0$^{4,9}$]hexadeca-6,13-diene.

As used herein, "bicyclo[2.2.1]hept-2-ene moiety" refers to a strained cyclic olefin moiety that comprises a bridged bicyclic moiety, the bridged bicyclic moiety comprising the following backbone structure:

Formula M1.1

As used herein, the terms "bicyclo[2.2.1]hept-2-ene moiety" and "norbornene moiety" are synonymous, and may be used interchangeably. Representative examples of molecules that comprise a norbornene moiety include: norbornene; 5-norbornene-2-ol; 5-norbornene-2,3-dimethanol; 5-ethylidene-2-norbornene; tricyclopentadiene; 2-{bicyclo[2.2.1]hept-5-en-2-ylidene}ethan-1-ol; tricyclo[5.2.1.0$^{2,6}$]deca-4,8-dien-3-ol; dicyclopentadiene; 4-(isocyanatomethyl)-4-azatricyclo[5.2.1.0$^{2,6}$]dec-8-ene-3,5-dione; and tetracyclododecene; tricyclo[5.2.1.0$^{2,6}$]deca-4,8-dien-3-ol.

As used herein, "7-oxabicyclo[2.2.1]hept-2-ene moiety" refers to a strained cyclic olefin moiety that comprises a bridged bicyclic moiety, the bridged bicyclic moiety comprising the following backbone structure:

Formula M1.2

Representative examples of molecules that comprise a 7-oxabicyclo[2.2.1]hept-2-ene moiety include: 7-oxabicyclo[2.2.1]hept-2-ene; 7-oxabicyclo[2.2.1]hept-5-en-2-ol; 15,16-dioxapentacyclo[10.2.1.1$^{5,8}$.0$^{2,11}$.0$^{4,9}$]hexadeca-6,13-diene; 10-oxa-4-azatricyclo[5.2.1.0$^{2,6}$]dec-8-ene; [3-(hydroxymethyl)-7-oxabicyclo[2.2.1]hept-5-en-2-yl]methanol.

As used herein, "2-oxabicyclo[2.2.1]hept-5-ene moiety" refers to a strained cyclic olefin moiety that comprises a bridged bicyclic moiety, the bridged bicyclic moiety comprising the following backbone structure:

Formula M1.3

Representative examples of molecules that comprise a 2-oxabicyclo[2.2.1]hept-5-ene moiety include: 2-oxabicyclo[2.2.1]hept-5-ene; and {2-oxabicyclo[2.2.2]oct-5-en-3-yl}methanol.

As used herein, "strained cyclic olefin compound" refers to a molecule that comprises a strained cyclic olefin moiety.

As used herein, "cycloolefin polymer" refers to a polymer prepared by polymerizing reactants using ring-opening metathesis polymerization or vinyl-type addition polymerization, wherein the reactants include molecules that comprise a strained cyclic olefin moiety. In some embodiments, the strained cyclic olefin moiety comprises a bridged bicyclic moiety. Examples of cycloolefin polymers include cyclic olefin polymer (COP) and cyclic olefin copolymer (COC). In some embodiments, the cycloolefin polymer described herein is a polymer prepared by polymerizing reactants using ring-opening metathesis polymerization, wherein the reactants include molecules that comprise a strained cyclic olefin moiety that comprises a bridged bicyclic moiety. In some embodiments, the cycloolefin polymer described herein is a polymer prepared by polymerizing reactants using ring-opening metathesis polymerization, wherein the reactants include molecules that comprise a strained cyclic olefin moiety that comprises a bridged bicyclic moiety, the bridged bicyclic moiety comprising the backbone structure of Formula M1, wherein: (a) B$_1$ comprises —C— and B$_2$ comprises —C—; or (b) B$_1$ comprises —C— and B$_2$ comprises —O—; or (c) B$_1$ comprises —O— and B$_2$ comprises —C—. In some embodiments, the cycloolefin polymer described herein is a polymer prepared by polymerizing reactants using ring-opening metathesis polymerization, wherein the reactants include molecules that comprise a bicyclo[2.2.1]hept-2-ene moiety. In some embodiments, the cycloolefin polymer described herein is a polymer prepared by polymerizing reactants using ring-opening metathesis polymerization, wherein the reactants include molecules that comprise a 7-oxabicyclo[2.2.1]hept-2-ene moiety. In some embodiments, the cycloolefin polymer described herein is a polymer prepared by polymerizing reactants using ring-opening metathesis polymerization, wherein the reactants include molecules that comprise a 2-oxabicyclo[2.2.1]hept-5-ene moiety. In some embodiments, the cycloolefin polymer described herein is a polymer prepared by polymerizing reactants using vinyl-type addition polymerization, wherein the reactants include molecules that comprise a strained cyclic olefin moiety that comprises a bridged bicyclic moiety. In some embodiments, the cycloolefin polymer described herein is a polymer prepared by polymerizing reactants using vinyl-type addition polymerization, wherein the reactants include molecules that comprise a strained cyclic olefin moiety that comprises a bridged bicyclic moiety, the bridged bicyclic moiety comprising the backbone structure of Formula M1, wherein: (a) B$_1$ comprises —C— and B$_2$ comprises —C—; or (b) B$_1$ comprises —C— and B$_2$ comprises —O—; or (c) B$_1$ comprises —O— and B$_2$ comprises —C—. In some embodiments, the cycloolefin polymer described herein is a polymer prepared by polymerizing reactants using vinyl-type addition polymerization, wherein the reactants include molecules that comprise a bicyclo[2.2.1]hept-2-ene moiety. In some embodiments, the cycloolefin polymers described herein is a polymer prepared by polymerizing reactants using vinyl-type addition polymerization, wherein the reactants include molecules that comprise a 7-oxabicyclo[2.2.1]hept-2-ene moiety. In some embodiments, the cycloolefin polymer described herein is a polymer prepared by polymerizing reactants using vinyl-type addition polymerization, wherein the reactants include molecules that comprise a 2-oxabicyclo[2.2.1]hept-5-ene moiety. In some embodiments, the cycloolefin polymer described herein is a cyclic olefin polymer or cyclic olefin copolymer prepared by polymerizing reactants using ring-opening metathesis polymerization, wherein the reactants include one or more of cyclobutene, cyclopentene, cycloheptene, cyclooctene, cyclooctadiene, cyclooctatetraene, hydroxydicyclopentadiene, dicyclopentadiene, and norbornene. In some embodiments, the cycloolefin polymer described herein is a cyclic olefin polymer or cyclic olefin copolymer formed by polymerizing a solution comprising dicyclopentadiene monomers in the presence of a ROMP catalyst. In some embodiments, cycloolefin polymer described herein is a cyclic olefin polymer or cyclic olefin copolymer that comprises polydicyclopentadiene (PDCPD). In some embodiments, the cyclic olefin copolymer described herein comprises polydicyclopentadiene (PDCPD). In some embodiments, the cyclic olefin polymer described herein comprises polydicyclopentadiene (PDCPD).

As used herein, "polymerizable cyclic olefin material" refers to a composition that comprises a plurality of strained cyclic olefin compounds that can polymerize to form a cycloolefin polymer, such as a cyclic olefin polymer or a cyclic olefin copolymer. In some embodiments, the polymerizable cyclic olefin material is a material that polymerizes to form a cycloolefin polymer using ring-opening metathesis polymerization. In some embodiments, polymerizable cyclic olefin material is a material that polymerizes to form a cycloolefin polymer using vinyl-type addition polymerization.

As used herein, "in-mold coating process" refers to a method for adhering a coating material to a molded article before the article is released from its mold. Generally, an in-mold coating process comprises: (a) contacting a prepared mold surface with an in-mold coating composition, thereby providing a coated mold surface; and (b) contacting the coated mold surface with a polymerizable material to form an in-mold coated article. In some embodiments, the polymerizable material comprises a polymerizable cyclic olefin material, such as a formulated dicyclopentadiene (DCPD) solution. In some embodiments, the coated mold surface comprises multiple layers. In some embodiments, the coated mold surface comprises two or more layers. For example, in some embodiments, a prepared mold surface is contacted with a first in-mold coating composition comprising coating material, thereby providing a coated mold surface having one layer of coating material, and the resulting coated mold surface is subsequently contacted with a second in-mold coating composition comprising coating material, thereby providing a coated mold surface having two layers of coating material. In some embodiments, the layers may comprise differing components. In some embodiments, the prepared mold surface comprises a layer of precoating material, such as a mold release agent. In some embodiments, a prepared mold surface comprising a layer of precoating material is, for example, contacted with a first in-mold coating composition comprising coating material, thereby providing a coated mold surface having two layers, namely one layer of precoating material and one layer of coating material. See FIG. 1.

As used herein, "prepared mold surface" refers to a mold surface that has been prepared for use in an in-mold coating process. In some embodiments, preparing the mold surface for use in an in-mold coating process comprises preheating the mold surface. In some embodiments, preparing the mold surface for use in an in-mold coating process comprises applying layer of precoating material, such as a mold release agent, to the mold surface. In some embodiments, preparing a mold surface for use in an in-mold coating process comprises (a) preheating the mold surface, and (b) applying a layer of precoating material, such as a mold release agent, to the mold surface. As such, in some embodiments, a prepared mold surface is, for example, a preheated mold surface; in some embodiments, a prepared mold surface is, for example, a mold surface comprising a layer of precoating material, such as a mold release agent; and in some embodiments, a prepared mold surface is, for example, a preheated mold surface comprising a layer of precoating material, such as a mold release agent.

As used herein, "cycloolefin polymer layer" refers to a layer of cycloolefin polymer formed upon contacting a coated mold surface with a polymerizable cyclic olefin material during an in-mold coating process under conditions to form a cycloolefin polymer. In some embodiments, the cycloolefin polymer layer is formed through ring-opening metathesis polymerization. In some embodiments, the cycloolefin polymer layer is formed through vinyl-type addition polymerization. In some embodiments, the cycloolefin polymer layer comprises cyclic olefin polymer. In some embodiments, the cycloolefin polymer layer comprises cyclic olefin copolymer. A cycloolefin polymer layer that comprises cyclic olefin polymer may, in the alternative, be referred to as a cyclic olefin polymer layer. A cycloolefin polymer layer that comprises cyclic olefin copolymer may, in the alternative, be referred to as a cyclic olefin copolymer layer.

As used herein, "polyol-polyol crosslinker functionality" refers to the ability of a crosslinker to: (a) react with a first polyol molecule to form a covalent bond therewith, and (b) react with a second polyol molecule to form a covalent bond therewith, thereby crosslinking at least two polyol molecules. In some embodiments, the crosslinker having polyol-polyol crosslinker functionality comprises at least two isocyanate groups, each of which can react with a hydroxyl group of a polyol molecule to form a urethane functional group.

As used herein, "polyol-cycloolefin crosslinker functionality" refers to the ability of a crosslinker to: (a) react with at least one polyol molecule to form a covalent bond therewith, and (b) adhere to a cycloolefin polymer, thereby crosslinking at least one polyol molecule to a cycloolefin polymer. In preferred embodiments, the crosslinker comprising polyol-cycloolefin crosslinker functionality comprises a strained cyclic olefin moiety, such as a norbornene moiety. In some embodiments, the crosslinker having polyol-cycloolefin crosslinker functionality adheres to a cycloolefin polymer at or near an interface shared between an in-mold multifunctional layer and a cycloolefin polymer layer. In such embodiments, the strained cyclic olefin moiety of the crosslinker may adhere to the cycloolefin polymer at the interface through any adhesion mechanism. Without being limited to any particular theory, it is believed that some of the strained cyclic olefin moieties of the multifunctional crosslinkers may, with time, bind to the cycloolefin polymer layer through covalent or non-covalent interactions at the interface shared between the in-mold multifunctional layer and the cycloolefin polymer layer. For example, the adhesion of the strained cyclic olefin moiety to the cycloolefin polymer at the interface may occur through a non-covalent binding interaction, or the adhesion of the strained cyclic olefin moiety to the cycloolefin polymer at the interface may occur through covalent bond formation. In some embodiments, the adhesion of the strained cyclic olefin moiety to the cycloolefin polymer at the interface may occur through a non-covalent binding interaction. In some embodiments, the adhesion of the strained cyclic olefin moiety to the cycloolefin polymer at the interface may occur through covalent bond formation.

As used herein, "multifunctional crosslinker" refers to a crosslinker comprising at least the following two functionalities: (a) a polyol-polyol crosslinker functionality, and (b) a polyol-cycloolefin crosslinker functionality.

As used herein, "in-mold multifunctional composition" refers to an in-mold coating composition comprising: (a) a polyol-cycloolefin crosslinker functionality, and (b) a polyol-polyol crosslinker functionality. In some embodiments, the polyol-polyol crosslinker functionality resides in a first crosslinker, while the polyol-cycloolefin crosslinker functionality resides in a second crosslinker. In preferred embodiments, the polyol-polyol crosslinker functionality and the polyol-cycloolefin crosslinker functionality reside in a multifunctional crosslinker.

As used herein, "in-mold multifunctional layer" refers to a layer of in-mold coating material comprising: (a) a polyol-cycloolefin crosslinker functionality, and (b) a polyol-polyol crosslinker functionality. In preferred embodiments, the multifunctional layer comprises a multifunctional cross-linker. In some embodiments, the in-mold multifunctional layer is a paintable in-mold multifunctional layer. In preferred embodiments, at least one interface forms between at least one in-mold multifunctional layer and at least one cycloolefin polymer layer. For example, in some embodiments, a prepared mold surface is contacted with an in-mold multifunctional composition, thereby providing a coated mold surface having one layer of coating material, after which the resulting coated mold surface having one layer of coating material is contacted with a polymerizable cyclic olefin material during the in-mold coating process under conditions to form a cycloolefin polymer, thereby forming at least one interface between at least one in-mold multifunctional layer and at least one cycloolefin polymer layer. In some embodiments, a prepared mold surface is contacted with a first in-mold coating composition, thereby providing a coated mold surface having one layer of coating material, and the resulting coated mold surface having one layer of coating material is subsequently contacted with a second in-mold coating composition, the second in-mold coating composition being a first in-mold multifunctional composition, thereby providing a coated mold surface having two layers (including one in-mold multifunctional layer), each layer differing from the other, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer. In some embodiments, a prepared mold surface comprising a layer of precoating material, such as a release agent, is, for example, contacted with an in-mold multifunctional composition, thereby providing a coated mold surface having two layers, namely one mold release layer and one in-mold multifunctional layer, each layer differing from the other, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer. See FIG. 1. In some embodiments, the release agent layer is removed from the article, such as by wiping with isopropyl alcohol or other solvents, after the article is removed from the mold. In some embodiments, two or more in-mold multifunctional layers may be present, provided that at least one in-mold multifunctional layer forms an interface with at least one cycloolefin polymer layer upon contacting the coated mold surface with a polymerizable cyclic olefin material during an in-mold coating process under conditions to form a cycloolefin polymer. For example, in some embodiments, a prepared mold surface is first contacted with a first in-mold multifunctional composition, thereby providing a coated mold surface having one in-mold multifunctional layer, and the resulting coated mold surface having one in-mold multifunctional layer is subsequently contacted with a second in-mold multifunctional composition, thereby providing a coated mold surface having two in-mold multifunctional layers, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer.

As used herein, "in-mold paintable layer" refers to an in-mold layer that, after removing the in-mold coated article from the mold, may be painted or coated post-mold. For example, a weatherable coating system (such as Red Spot 206LE as a basecoat, followed by Red Spot 379S as a clear topcoat) may be applied post-mold to an in-mold paintable layer. In some embodiments, the in-mold paintable layer is a layer capable of adhering a weatherable coating system (such as Red Spot 206LE as a basecoat, followed by Red Spot 379S as a clear topcoat) with sufficient adherence to pass one or more of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01). In some embodiments, the in-mold paintable layer is a layer capable of adhering a weatherable coating system (such as Red Spot 206LE as a basecoat, followed by Red Spot 379S as a clear topcoat) with sufficient adherence to pass two or more of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01). In some embodiments, the in-mold paintable layer is a layer capable of adhering a weatherable coating system (such as Red Spot 206LE as a basecoat, followed by Red Spot 379S as a clear topcoat) with sufficient adherence to pass each of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01).

As used herein, "layer-specific flash time" refers to a time period occurring during an in-mold coating process, the time period (a) beginning immediately after a specified coating composition has been applied to form a specified layer of coating material and (b) ending either (i), in the case of a coating composition applied before a next coating composition is applied to form a next layer of coating material, immediately upon the start of applying the next coating composition to form the next layer of coating material or (ii), in the case of the final coating composition being applied, immediately upon injection of a polymerizable cyclic olefin material, such as formulated dicyclopentadiene (DCPD) solutions, into the closed mold. For example, in the case of an in-mold coating process comprising providing a coated mold surface having one layer of coating material, the first layer-specific flash time (a) begins immediately after a first coating composition has been applied to form a first layer of coating material and (b) ends immediately upon injection of a polymerizable cyclic olefin material, such as formulated dicyclopentadiene (DCPD) solutions, into the closed mold. Similarly, for example, in the case of an in-mold coating process comprising providing a coated mold surface having two layers of coating material, the first layer-specific flash time (a) begins immediately after a first coating composition has been applied to form a first layer of coating material and (b) ends immediately upon the start of applying a second coating composition to form the second layer of coating material; and the second layer-specific flash time (a) begins immediately after the second coating composition has been applied to form the second layer of coating material and (b) ends immediately upon injection of a polymerizable cyclic olefin material, such as formulated dicyclopentadiene (DCPD) solutions, into the closed mold. In some embodiments, the presence of multiple layers of coating material is contemplated, and in such embodiments, each layer-specific flash time may be the same or different. The layer-specific flash time for a specified in-mold multifunctional layer may, in the alternative, be referred to as an in-mold multifunctional layer flash time.

As used herein, "total flash time" refers to a sum total of layer-specific flash times, including in-mold multifunctional layer flash times, transpiring during an in-mold process. For example, for an in-mold coating process having three layer-specific flash times, with two of those layer-specific flash times being in-mold multifunctional layer flash times, the total in-mold multifunctional layer flash time is the sum total of the three layer-specific flash times.

As used herein, "polyol resin" refers to a composition comprising a plurality of polyol molecules, each polyol molecule comprising a plurality of hydroxyl groups. Representative polyol resins include, for example, acrylic polyol resins, polyester polyol resins, cellulosic polyol resins, and polyolefin polyol resins. In general, acrylic polyol resins comprise a plurality of acrylic polyol molecules, each acrylic polyol molecule comprising a plurality of acrylic functional groups and a plurality of hydroxyl groups. Representative acrylic polyol resins include: Joncryl 507, Joncryl 587, Joncryl 581, Joncryl 935, Joncryl 920, Joncryl 922, Acrylamac 232-1700, Acrylamac 232-1375, Acrylamac 232-2780, Acrylamac HS 232-2328, Acrylamac HS 232-2350, MAcrynal SM 540/60BAC, MAcrynal 9494/65XBAC, MAcrynal SM2810/75BAC, Olester Q750, and Acrydic AU-7002. In general, polyester polyol resins comprise a plurality of polyester polyol molecules, each polyester polyol molecule comprising a plurality of polyester functional groups and a plurality of hydroxyl groups. Representative polyester polyol resins include: CAPA 4101, CAPA 2043, CAPA 2047, CAPA 3022, CAPA 3031, CAPA 3041, CAPA 3050J, Polymac 220-1001, Polymac 66-6686, Polymac 220-2015, Polymac HS 57-5763, Setal 168 SS-80, Setal 1406, 26-1619, HPP 6000-65 PMA, HPP 7866, HPP 6007, Aroplaz 6420, and Aroplaz 4294. In general, cellulosic polyol resins comprise a plurality of cellulosic polyol molecules, each cellulosic polyol molecule comprising a plurality of cellulosic moieties and a plurality of hydroxyl groups. Representative cellulosic polyol resins include: Eastman CAB-171-15, Eastman CAB-321-0.1, Eastman CAB-381-0.1, Eastman CAB-381-0.5, Eastman CAB-381-2, CAB-381-20, Eastman CAB-500-5, Eastman CAB-531-1, Eastman CAB-551-0.2, and Eastman CAB-553-0.4. In general, polyolefin polyol resins comprise a plurality of polyolefin polyol molecules, each polyolefin polyol molecule comprising a plurality of polyolefin moieties and a plurality of hydroxyl groups. Representative polyolefin polyol resins include: Krasol HLBH P-2000, Krasol HLBH P-3000, Krasol LBH P 2000, Krasol LBH P 3000, PolyBD R-45HTLO, PolyBD R-45M, PolyBD R-20 LM, Vybar H-6175, Vybar H-6164.

As used herein, "in-mold coated article" refers to an article manufactured using an in-mold coating process. In some embodiments, the in-mold coated article comprises a cycloolefin polymer having an in-mold coating layer adhered to a surface thereof.

As used herein, "multi-component system" refers to a system that comprises at least two components that are mixed together to provide a curable coating composition, such as an in-mold coating composition. Once mixed, the resulting curable coating composition may be applied to a surface. Generally, a multi-component system for applying a polyurethane coating will include at least (a) a first component comprising a plurality of polyol molecules, and (b) a second component comprising a plurality of crosslinkers comprising polyol-polyol crosslinker functionality. In some embodiments, the crosslinker comprising polyol-polyol crosslinker functionality is a multifunctional crosslinker comprising at least the following two functionalities: (a) a polyol-polyol crosslinker functionality, and (b) a polyol-cycloolefin crosslinker functionality.

As used herein, $C_m$-$C_n$, such as $C_1$-$C_{12}$, $C_1$-$C_8$, or $C_0$-$C_6$ when used before a group, refers to that group containing m to n carbon atoms, where $C_0$ means that the group is not present at the indicated location.

As used herein, "alkyl" is intended to include both branched and straight-chain saturated aliphatic hydrocarbon groups having the specified number of carbon atoms. For example, $C_1$-$C_{10}$, as in "$C_1$-$C_{10}$ alkyl" is defined to include groups having 1, 2, 3, 4, 5, 6, 7, 8, 9 or 10 carbons in a linear or branched arrangement. For example, "$C_1$-$C_{10}$ alkyl" specifically includes methyl, ethyl, n-propyl, i-propyl, n-butyl, t-butyl, i-butyl, pentyl, hexyl, heptyl, octyl, nonyl, decyl, and so on.

As used herein, "cycloalkyl" refers to a monocyclic or polycyclic saturated aliphatic hydrocarbon group having the specified number of carbon atoms. For example, "cycloalkyl" includes cyclopropyl, methyl-cyclopropyl, 2,2-dimethyl-cyclobutyl, 2-ethyl-cyclopentyl, cyclohexyl, and so on. In an embodiment of the invention the term "cycloalkyl" includes the groups described immediately above and further includes monocyclic unsaturated aliphatic hydrocarbon groups. For example, "cycloalkyl" as defined in this embodiment includes cyclopropyl, methyl-cyclopropyl, 2,2-dimethyl-cyclobutyl, 2-ethyl-cyclopentyl, cyclohexyl, cyclopentenyl, cyclobutenyl and so on.

As used herein, "aryl" refers to any stable monocyclic or bicyclic carbon ring of up to 7 atoms in each ring, wherein at least one ring is aromatic. Examples of such aryl elements include phenyl, naphthyl, tetrahydronaphthyl, indanyl and biphenyl. In cases where the aryl substituent is bicyclic and one ring is non-aromatic, it is understood that attachment is via the aromatic ring.

As used herein, "heteroaryl" refers to a stable monocyclic or bicyclic ring of up to 7 atoms in each ring, wherein at least one ring is aromatic and contains from 1 to 4 heteroatoms selected from the group consisting of O, N and S. Heteroaryl groups within the scope of this definition include but are not limited to: acridinyl, carbazolyl, cinnolinyl, quinoxalinyl, pyrrazolyl, indolyl, benzotriazolyl, furanyl, thienyl, benzothienyl, benzofuranyl, benzimidazolonyl, benzoxazolonyl, quinolinyl, isoquinolinyl, dihydroisoindolonyl, imidazopyridinyl, isoindolonyl, indazolyl, oxazolyl, oxadiazolyl, isoxazolyl, indolyl, pyrazinyl, pyridazinyl, pyridinyl, pyrimidinyl, pyrrolyl, tetrahydroquinoline. As with the definition of heterocyclyl below, "heteroaryl" is also understood to include the N-oxide derivative of any nitrogen-containing heteroaryl. In cases where the heteroaryl substituent is bicyclic and one ring is non-aromatic or contains no heteroatoms, it is understood that attachment is via the aromatic ring or via the heteroatom containing ring, respectively. In some embodiments, a heteroaryl contains 0-3 N atoms in the ring. In some embodiments, a heteroaryl contains 1-3 N atoms in the ring. In some embodiments, a heteroaryl contains 0-3 N atoms, 0-1 O atoms, and 0-1 S atoms in the ring. In some embodiments, a heteroaryl is a monocyclic or bicyclic heteroaryl. In some embodiments, heteroaryl is a $C_3$-$C_{10}$ heteroaryl.

As used herein, "heterocyclyl" refers to a 3- to 10-membered aromatic or nonaromatic heterocycle containing from 1 to 4 heteroatoms selected from the group consisting of O, N and S, and includes bicyclic groups. For the purposes of this invention, the term "heterocyclic" is also considered to be synonymous with the terms "heterocycle" and "heterocyclyl" and is understood as also having the definitions set forth herein. "Heterocyclyl" therefore includes the above mentioned heteroaryls, as well as dihydro and tetrahydro analogs thereof. Further examples of "heterocyclyl" include, but are not limited to the following: azetidinyl, benzoimidazolyl, benzofuranyl, benzofurazanyl, benzopyrazolyl, benzotriazolyl, benzothiophenyl, benzoxazolyl, carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxooxazolidinyl, oxazolyl, oxazoline, oxopiperazinyl, oxopyrrolidinyl, oxomorpholinyl, isoxazoline, oxetanyl, pyranyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrahydropyranyl, tetrahydrofuranyl, tetrahydrothiopyranyl, tetrahydroisoquinolinyl, tetrazolyl, tetrazolopyridyl, thiadiazolyl, thiazolyl, thienyl, triazolyl, 1,4-dioxanyl, hexahydroazepinyl, piperazinyl, piperidinyl, pyridin-2-onyl, pyrrolidinyl, morpholinyl, thiomorpholinyl, dihydrobenzoimidazolyl, dihydrobenzofuranyl, dihydrobenzothiophenyl, dihydrobenzoxazolyl, dihydrofuranyl, dihydroimidazolyl, dihydroindolyl, dihydroisooxazolyl, dihydroisothiazolyl, dihydrooxadiazolyl, dihydrooxazolyl, dihydropyrazinyl, dihydropyrazolyl, dihydropyridinyl, dihydropyrimidinyl, dihydropyrrolyl, dihydroquinolinyl, dihydrotetrazolyl, dihydrothiadiazolyl, dihydrothiazolyl, dihydrothienyl, dihydrotriazolyl, dihydroazetidinyl, dioxidothiomorpholinyl, methylenedioxybenzoyl, tetrahydrofuranyl, and tetrahydrothienyl, and N-oxides thereof. Attachment of a heterocyclyl substituent can occur via a carbon atom or via a heteroatom.

Unless indicated otherwise, the referenced functional groups may be substituted with one or more additional group(s) individually (e.g., "optionally substituted") and independently selected from alkyl, cycloalkyl, aryl, heteroaryl, heterocyclyl, hydroxy, alkoxy, aryloxy, alkylthio, arylthio, alkylsulfoxide, arylsulfoxide, alkylsulfone, arylsulfone, cyano, halo, nitro, haloalkyl, fluoroalkyl, fluoroalkoxy, and amino, including mono- and di-substituted amino groups, and the protected derivatives thereof. In some embodiments, substituted groups are substituted with one or two of the preceding groups. In some embodiments, an optional substituent on an aliphatic carbon atom (acyclic or cyclic, saturated or unsaturated carbon atoms, excluding aromatic carbon atoms) includes oxo (=O).

In certain embodiments, the compounds presented herein possess one or more stereocenters and each center independently exists in either the R or S configuration. The compounds presented herein include all diastereomeric, enantiomeric, and epimeric forms as well as the appropriate mixtures thereof. Stereoisomers are obtained, if desired, by methods such as stereoselective synthesis and/or the separation of stereoisomers by chiral chromatographic columns.

2. In-Mold Coating Compositions

Provided in one aspect, the in-mold coating compositions described herein comprise:
   a plurality of polyol molecules;
   a polyol-polyol crosslinker functionality;
   a polyol-cycloolefin crosslinker functionality; and
   a urethane formation catalyst.

The plurality of polyol molecules described herein may comprise acrylic polyol molecules, polyester polyol molecules, cellulosic polyol molecules, polyolefin polyol molecules, or any mixture thereof. In some embodiments, the plurality of polyol molecules comprises acrylic polyol molecules. In some embodiments, the plurality of polyol molecules comprises polyester polyol molecules. In some embodiments, the plurality of polyol molecules comprises cellulosic polyol molecules. In some embodiments, the plurality of polyol molecules comprises a mixture of acrylic polyol molecules and polyester polyol molecules. In some embodiments, the plurality of polyol molecules comprises a mixture of acrylic polyol molecules, polyester polyol molecules, and polyolefin polyol molecules. In some embodiments, the plurality of polyol molecules comprises a mixture of acrylic polyol molecules and polyolefin polyol molecules. In some embodiments, the plurality of polyol molecules comprises a mixture of polyester polyol molecules and polyolefin polyol molecules. In some embodiments, the plurality of polyol molecules comprises a mixture of cellulosic polyol molecules and polyolefin polyol molecules.

The polyol molecules described herein may be components of polyol resins. Representative polyol resins include, for example, acrylic polyol resins, polyester polyol resins, cellulosic polyol resins, and polyolefin polyol resins. In general, acrylic polyol resins comprise a plurality of acrylic polyol molecules, each acrylic polyol molecule comprising a plurality of acrylic functional groups and a plurality of hydroxyl groups. Representative acrylic polyol resins include: Joncryl 507, Joncryl 587, Joncryl 581, Joncryl 935, Joncryl 920, Joncryl 922, Acrylamac 232-1700, Acrylamac 232-1375, Acrylamac 232-2780, Acrylamac HS 232-2328, Acrylamac HS 232-2350, MAcrynal SM 540/60BAC, MAcrynal 9494/65XBAC, MAcrynal SM2810/75BAC, Olester Q750, and Acrydic AU-7002. In general, polyester polyol resins comprise a plurality of polyester polyol molecules, each polyester polyol molecule comprising a plurality of polyester functional groups and a plurality of hydroxyl groups. Representative polyester polyol resins include: CAPA 4101, CAPA 2043, CAPA 2047, CAPA 3022, CAPA 3031, CAPA 3041, CAPA 3050J, Polymac 220-1001, Polymac 66-6686, Polymac 220-2015, Polymac HS 57-5763, Setal 168 SS-80, Setal 1406, 26-1619, HPP 6000-65 PMA; HPP 7866, HPP 6007, Aroplaz 6420, Aroplaz 4294. In general, cellulosic polyol resins comprise a plurality of cellulosic polyol molecules, each cellulosic polyol molecule comprising a plurality of cellulosic moieties and a plurality of hydroxyl groups. Representative cellulosic polyol resins include: Eastman CAB-171-15, Eastman CAB-321-0.1, Eastman CAB-381-0.1, Eastman CAB-381-0.5, Eastman CAB-381-2, CAB-381-20, Eastman CAB-500-5, Eastman CAB-531-1, Eastman CAB-551-0.2, and Eastman CAB- 553-0.4. In general, polyolefin polyol resins comprise a plurality of polyolefin polyol molecules, each polyolefin polyol molecule comprising a plurality of polyolefin moieties and a plurality of hydroxyl groups. Representative polyolefin polyol resins include: Krasol HLBH P-2000, Krasol HLBH P-3000, Krasol LBH P 2000, Krasol LBH P 3000, PolyBD R-45HTLO, PolyBD R-45M, PolyBD R-20 LM, Vybar H-6175, Vybar H-6164.

The urethane formation catalyst present in the in-mold coating compositions described herein may comprise a tin-based catalyst, a bismuth-based catalyst, a zinc-based catalyst, or a titanium-based catalyst. In some embodiments, the urethane formation catalyst may also be an organotin catalyst, an organobismuth catalyst, or a titanate catalyst. For instance, the tin-based catalyst may be an organotin catalyst, the bismuth-based catalyst may be an organobismuth catalyst, and the titanium-based catalyst may be a titanate catalyst.

In some embodiments, the urethane formation catalyst is a tin-based catalyst. Examples of illustrative tin-based catalysts include, but are not limited to, dibutyltin dilaurate, dioctyl tin dilaurate, dibutyltin mercaptide, dioctyl tin mercaptide, dimethyl tin dilaurate, or dimethyl tin mercaptide. In some embodiments, the tin-based catalyst is dibutyltin dilaurate, dioctyl tin dilaurate, dibutyltin mercaptide, dioctyl tin mercaptide, dimethyl tin dilaurate, or dimethyl tin mercaptide.

In some embodiments, the in-mold coating compositions described herein may comprise a UV absorber. Representative examples of UV absorbers include benzophenone UV absorbers, benzotriazole UV absorbers, and triazine UV absorbers. Representative examples of benzophenone UV absorbers include: Lowiolite 20 (CAS 131-57-7); CHISORB BP-12 (CAS No. 1843 May 6); and CHISORB BP-6 (CAS No. 131-54-4). Representative examples of benzotriazole UV absorbers include: Tinuvin 1130 (CAS 102577-46-8); Tinuvin 326 (CAS 3864-99-1); Tinuvin 384 (CAS 12759-17-9); Tinuvin 900 (CAS 70321-86-2); Tinuvin 928 (CAS 73936-91-1); and Tinuvin 328 (CAS 25973-55-1). Representative examples of triazine UV absorbers include: Tinuvin 400 (CAS 153519-44-9); Tinuvin 479 (CAS 204848-45-3); Appolo-1164 (CAS 2725-22-6); Appolo-1164L (CAS 137759-38-7); Appolo-1164 GL (CAS1820-28-6); and Appolo-1577 (CAS 147315-50-2).

In some embodiments, the in-mold coating compositions described herein may comprise a light stabilizer. In some embodiments, the light stabilizer comprises a hindered amine light stabilizer. Representative examples of hindered amine light stabilizers (HALS) include: Tinuvin 292 (CAS 41556-26-7); Tinuvin 123 (CAS 129757-67-1); Tinuvin 249; Tinuvin 622 (CAS 65447-77-0); and Tinuvin 152 (CAS 191743-75-6).

In some embodiments, the in-mold coating compositions described herein may comprise a UV absorber and a light stabilizer. In some embodiments, the in-mold coating compositions described herein may comprise a UV absorber and a hindered amine light stabilizer.

In some embodiments, the in-mold coating composition comprising a UV absorber and/or a light stabilizer, when applied to a cycloolefin polymer using an in-mold coating process, provides an in-mold multifunctional layer that blocks at least 70% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 80% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 90% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 95% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 99% of UV light from reaching the cycloolefin polymer.

In some embodiments, the in-mold coating compositions described herein may further comprise a conductive pigment. In some embodiments, the introduction of a conductive pigment provides conductivity to the in-mold multifunctional layer. Illustrative examples of conductive pigments include but are not limited to conductive carbon black, graphene, carbon nanotubes, antimony-doped tin oxides, indium-doped tin oxides, and silver-coated particles. In some embodiments, the conductive pigment is selected from the group consisting of: conductive carbon black, graphene, carbon nanotubes, antimony-doped tin oxides, indium-doped tin oxides, and silver-coated particles. In some embodiments, the in-mold coating composition, when applied to a cycloolefin polymer using an in-mold coating process, imparts conductivity to an in-mold multifunctional layer.

In some embodiments, the in-mold coating composition comprises one or more solvents. In some embodiments, the solvent comprises one or more organic solvents. In some embodiments, the solvent comprises a solvent blend. In some embodiments, the solvent blend comprises one or more of acetone, butyl acetate, methyl isobutyl ketone, methyl amyl ketone, methyl ethyl ketone, methyl propyl ketone, isobutyl acetate, propylene glycol monomethyl ether acetate, and xylene. In some embodiments, the solvent blend comprises methyl propyl ketone, isobutyl acetate, and methyl amyl ketone. In some embodiments, the solvent blend comprises about 50% methyl propyl ketone, about 35% isobutyl acetate, and about 15% methyl amyl ketone. In some embodiments, the solvent blend comprises methyl isobutyl ketone, methyl amyl ketone, and methyl ethyl ketone. In some embodiments, the solvent blend comprises about 80% methyl isobutyl ketone, about 10% methyl amyl ketone, and about 10% methyl ethyl ketone. In some embodiments, the solvent blend comprises butyl acetate, propylene glycol monomethyl ether acetate, and acetone. In some embodiments, the solvent blend comprises about 40% butyl acetate, about 20% propylene glycol monomethyl ether acetate, and about 40% acetone. In some embodiments, the solvent blend comprises methyl isobutyl ketone, butyl acetate, and xylene. In some embodiments, the solvent blend comprises about 47.5% methyl isobutyl ketone, about 40% butyl acetate, and 12.5% xylene.

In some preferred embodiments, the polyol-polyol crosslinker functionality and the polyol-cycloolefin crosslinker functionality reside in a multifunctional crosslinker. In such embodiments, the in-mold coating composition comprises:

a plurality of polyol molecules;

a multifunctional crosslinker; and a urethane formation catalyst.

The multifunctional crosslinkers for the in-mold coating compositions described herein include multifunctional crosslinkers comprising a first isocyanate substructure comprising a first isocyanate functional group; a second isocyanate substructure comprising a second isocyanate functional group; and a cyclic olefin substructure comprising a strained cyclic olefin moiety. Additional examples of multifunctional crosslinkers for the in-mold coating compositions described herein include those discussed in Section 4 of the present disclosure.

3. In-Mold Coating Systems

Described herein is a multi-component system for applying an in-mold coating to a surface of an article that comprises a cycloolefin polymer, such as polydicyclopentadiene (PDCPD), the multi-component comprising:

a first component (Component A) comprising a plurality of polyol molecules; and a second component (Component B) comprising a multifunctional crosslinker.

The multifunctional crosslinkers for the in-mold coating systems described herein include multifunctional crosslinkers comprising a first isocyanate substructure comprising a first isocyanate functional group; a second isocyanate substructure comprising a second isocyanate functional group; and a cyclic olefin substructure comprising a strained cyclic olefin moiety. Additional examples of multifunctional crosslinkers for the in-mold coating systems described herein include those discussed in Section 4 of the present disclosure.

The plurality of polyol molecules present in the first component (Component A) may comprise: (a) acrylic polyol molecules; (b) polyester polyol molecules; (c) cellulosic polyol molecules; (d) polyolefin polyol molecules, or (e) any mixture thereof. In some embodiments, the plurality of polyol molecules comprises: (a) a mixture of acrylic polyol molecules and polyester polyol molecules; or (b) a mixture of polyester polyol molecules and cellulosic polyol molecules; or (c) a mixture of acrylic polyol molecules and cellulosic polyol; or (d) a mixture of acrylic polyol molecules, polyester polyol molecules, and cellulosic polyol molecules.

The first component (Component A) and/or the second component (Component B) may further comprise a urethane formation catalyst. In some embodiments, the urethane formation catalyst comprises a tin-based catalyst, a bismuth-based catalyst, a zinc-based catalyst, or a titanium-based catalyst.

The first component (Component A) and/or the second component (Component B) may further comprise one or more solvents. In some embodiments, the solvent comprises one or more organic solvents. In some embodiments, the first component (Component A) comprises a solvent blend. In some embodiments, the solvent blend comprises one or more of acetone, butyl acetate, methyl isobutyl ketone, methyl amyl ketone, methyl ethyl ketone, methyl propyl ketone, isobutyl acetate, propylene glycol monomethyl ether acetate, and xylene. In some embodiments, the solvent blend comprises methyl propyl ketone, isobutyl acetate, and methyl amyl ketone. In some embodiments, the solvent blend comprises about 50% methyl propyl ketone, about 35% isobutyl acetate, and about 15% methyl amyl ketone. In some embodiments, the solvent blend comprises methyl isobutyl ketone, methyl amyl ketone, and methyl ethyl ketone. In some embodiments, the solvent blend comprises about 80% methyl isobutyl ketone, about 10% methyl amyl ketone, and about 10% methyl ethyl ketone. In some embodiments, the solvent blend comprises butyl acetate, propylene glycol monomethyl ether acetate, and acetone. In some embodiments, the solvent blend comprises about 40% butyl acetate, about 20% propylene glycol monomethyl ether acetate, and about 40% acetone. In some embodiments, the solvent blend comprises methyl isobutyl ketone, butyl acetate, and xylene. In some embodiments, the solvent blend comprises about 47.5% methyl isobutyl ketone, about 40% butyl acetate, and 12.5% xylene. The second component (Component B) may further comprise one or more solvents. In some embodiments, the solvent comprises one or more organic solvents. In some embodiments, the second component (Component B) comprises Xylene and/or Methyl Propyl Ketone.

4. Multifunctional Crosslinkers

The multifunctional crosslinkers described herein comprise at least two functionalities, namely: (a) a polyol-polyol crosslinker functionality, and (b) a polyol-cycloolefin crosslinker functionality. The multifunctional crosslinkers described herein may include a first isocyanate substructure comprising a first isocyanate functional group, a second isocyanate substructure comprising a second isocyanate functional group, and a cyclic olefin substructure comprising a strained cyclic olefin moiety, such a norbornene moiety. In some embodiments, the multifunctional crosslinker may be covalently bound to at least two polyol molecules, and may include a strained cyclic olefin moiety, such as a norbornene moiety. In some embodiments, the multifunctional crosslinker may be bound to at least two polyol molecules though a urethane functional group, and may include a strained cyclic olefin moiety, such as a norbornene moiety. The multifunctional crosslinkers may be included as a component of an in-mold coating composition comprising a plurality of polyol molecules (discussed supra). The multifunctional crosslinkers may crosslink two or more polyol molecules, such as those found in commercially available polyol resins. Specifically, in the presence of a urethane formation catalyst, the first isocyanate functional group of the multifunctional crosslinker may react with a first polyol molecule to form a first urethane functional group, and the second isocyanate functional group of the multifunctional crosslinker may react with a second polyol molecule to form a second urethane functional group, thereby crosslinking two more polyol molecules.

The first isocyanate substructure described herein comprises the first isocyanate (NCO) group. The first isocyanate substructure may comprise an alkyl linker covalently attached to the NCO group, which NCO group may be a terminal NCO group. The alkyl linker may further comprise an aryl (e.g., phenyl) linker containing one or more aryl moieties; a heteroaryl (e.g., pyridinyl) linker containing one or more heteroaryl moieties; or a cycloalkyl (e.g., unsubstituted or substituted cyclohexyl) linker containing one or more cycloalkyl linkers.

In some embodiments, the first isocyanate substructure comprises —$(C_0$-$C_{10}$ alkyl)-N=C=O, where $C_0$ means that the alkyl linker is not present at the indicated location. That is, the structure represented by —$(C_0$ alkyl)-N=C=O is the same structure represented by —N=C=O. In some embodiments, the first isocyanate substructure comprises —$(C_1$-$C_{10}$ alkyl)-N=C=O, —$(C_1$-$C_8$ alkyl)-N=C=O, —$(C_1$-$C_6$ alkyl)-N=C=O, or —$(C_1$-$C_4$ alkyl)-N=C=O, which include —$(C_1$ alkyl)-N=C=O, —$(C_2$ alkyl)-N=C=O, —$(C_3$ alkyl)-N=C=O, —$(C_4$ alkyl)-N=C=O, —($C_5$ alkyl)-N=C=O, —($C_6$ alkyl)-N=C=O, —($C_7$ alkyl)-N=C=O, —($C_8$ alkyl)-N=C=O, —($C_9$ alkyl)-N=C=O, or —($C_{10}$ alkyl)-N=C=O. In some embodiments, the first isocyanate substructure comprises —($CH_2$)—N=C=O, —($CH_2$)$_2$—N=C=O, —($CH_2$)$_3$—N=C=O, —($CH_2$)$_4$—N=C=O, —($CH_2$)$_5$—N=C=O, —($CH_2$)$_6$—N=C=O, —($CH_2$)$_7$—N=C=O, —($CH_2$)$_8$—N=C=O, —($CH_2$)$_9$—N=C=O, or —($CH_2$)$_{10}$—N=C=O. In some embodiments, the first isocyanate substructure comprises —($CH_2$)$_6$—N=C=O.

In some embodiments, the first isocyanate substructure comprises —$U^1$—($C_1$-$C_{10}$ alkyl)-N=C=O, wherein $U^1$ comprises —O—(C=O)—NH— or —NH—(C=O)—O—. In some embodiments, the first isocyanate substructure comprises —$U^1$—($C_1$-$C_{10}$ alkyl)-N=C=O, —$U^1$—($C_1$-$C_8$ alkyl)-N=C=O, —$U^1$—($C_1$-$C_6$ alkyl)-N=C=O, or —$U^1$—($C_1$-$C_4$ alkyl)-N=C=O, which include —$U^1$—($C_1$ alkyl)-N=C=O, —$U^1$—($C_2$ alkyl)-N=C=O, —$U^1$—($C_3$ alkyl)-N=C=O, —$U^1$—($C_4$ alkyl)-N=C=O, —$U^1$—($C_5$ alkyl)-N=C=O, —$U^1$—($C_6$ alkyl)-N=C=O, —$U^1$—($C_7$ alkyl)-N=C=O, —$U^1$—($C_8$ alkyl)-N=C=O, —$U^1$—($C_9$ alkyl)-N=C=O, or —$U^1$—($C_{10}$ alkyl)-N=C=O. In some embodiments, the first isocyanate substructure comprises —$U^1$—($CH_2$)—N=C=O, —$U^1$—($CH_2$)$_2$—N=C=O, —$U^1$—($CH_2$)$_3$—N=C=O, —$U^1$—($CH_2$)$_4$—N=C=O, —$U^1$—($CH_2$)$_5$—N=C=O, —$U^1$—($CH_2$)$_6$—N=C=O, —$U^1$—($CH_2$)$_7$—N=C=O, —$U^1$—($CH_2$)$_8$—N=C=O, —$U^1$—($CH_2$)$_9$—N=C=O, or —$U^1$—($CH_2$)$_{10}$—N=C=O. In some embodiments, the first isocyanate substructure comprises —$U^1$—($CH_2$)$_6$—N=C=O.

In some embodiments, the first isocyanate substructure comprises -$L^1$-($C_0$-$C_{10}$ alkyl)-N=C=O, wherein $L^1$ comprises one or more $C_3$-$C_{10}$ cycloalkyl, $C_6$-$C_{10}$ aryl, and $C_2$-$C_{10}$ heteroaryl. When the alkyl linker is $C_0$, then the alkyl linker is not present. That is, the structure represented by -$L^1$-($C_0$ alkyl)-N=C=O is the same structure represented by -$L^1$-N=C=O. In some embodiments, the first isocyanate substructure comprises -$L^1$-($C_1$-$C_{10}$ alkyl)-N=C=O, -$L^1$-($C_1$-$C_8$ alkyl)-N=C=O, -$L^1$-($C_1$-$C_6$ alkyl)-N=C=O, or -$L^1$-($C_1$-$C_4$ alkyl)-N=C=O, which include -$L^1$-($C_1$ alkyl)-N=C=O, -$L^1$-($C_2$ alkyl)-N=C=O, -$L^1$-($C_3$ alkyl)-N=C=O, -$L^1$-($C_4$ alkyl)-N=C=O, -$L^1$-($C_5$ alkyl)-N=C=O, -$L^1$-($C_6$ alkyl)-N=C=O, -$L^1$-($C_7$ alkyl)-N=C=O, -$L^1$-($C_8$ alkyl)-N=C=O, -$L^1$-($C_9$ alkyl)-N=C=O, or -$L^1$-($C_{10}$ alkyl)-N=C=O. In some embodiments, the first isocyanate substructure comprises -$L^1$-($CH_2$)—N=C=O, -$L^1$-($CH_2$)$_2$—N=C=O, -$L^1$-($CH_2$)$_3$—N=C=O, -$L^1$-($CH_2$)$_4$—N=C=O, -$L^1$-($CH_2$)$_5$—N=C=O, -$L^1$-($CH_2$)$_6$—N=C=O, -$L^1$-($CH_2$)$_7$—N=C=O, -$L^1$-($CH_2$)$_8$—N=C=O, -$L^1$-($CH_2$)$_9$—N=C=O, or -$L^1$-($CH_2$)$_{10}$—N=C=O. In some embodiments, the first isocyanate substructure comprises -$L^1$-($CH_2$)$_6$—N=C=O. In some embodiments, $L^1$ comprises one or more $C_3$-$C_{10}$ cycloalkyl, such as substituted or unsubstituted cyclohexyl. In some embodiments, $L^1$ comprises one or more aryl, such as substituted or unsubstituted phenyl and substituted or unsubstituted biphenyl. In some embodiments, $L^1$ comprises one or more substituted or unsubstituted or heteroaryl, such as substituted or unsubstituted pyridinyl.

In some embodiments, the first isocyanate substructure comprises —$U^1$-$L^1$-($C_0$-$C_{10}$ alkyl)-N=C=O, wherein $U^1$ comprises —O—(C=O)—NH— or —NH—(C=O)—O—; and $L^1$ comprises one or more $C_3$-$C_{10}$ cycloalkyl, $C_6$-$C_{10}$ aryl, and $C_2$-$C_{10}$ heteroaryl. When the alkyl linker is $C_0$, then the alkyl linker is not present. That is, the structure represented by —$U^1$-$L^1$-($C_0$ alkyl)-N=C=O is the same structure represented by —$U^1$-$L^1$-N=C=O. In some embodiments, the first isocyanate substructure comprises —$U^1$-$L^1$-($C_1$-$C_{10}$ alkyl)-N=C=O, —$U^1$-$L^1$ ($C_1$-$C_8$ alkyl)-N=C=O, —$U^1$-$L^1$-($C_1$-$C_6$ alkyl)-N=C=O, or —$U^1$-$L^1$-($C_1$-$C_4$ alkyl)-N=C=O, which include —$U^1$-$L^1$-($C_1$ alkyl)-N=C=O, —$U^1$-$L^1$-($C_2$ alkyl)-N=C=O, —$U^1$-$L^1$-($C_3$ alkyl)-N=C=O, —$U^1$-$L^1$-($C_4$ alkyl)-N=C=O, —$U^1$-$L^1$-($C_5$ alkyl)-N=C=O, —$U^1$-$L^1$-($C_6$ alkyl)-N=C=O, —$U^1$-$L^1$-($C_7$ alkyl)-N=C=O, —$U^1$-$L^1$-($C_8$ alkyl)-N=C=O, —$U^1$-$L^1$-($C_9$ alkyl)-N=C=O, or —$U^1$-$L^1$-($C_{10}$ alkyl)-N=C=O. In some embodiments, the first isocyanate substructure comprises —$U^1$-$L^1$-($CH_2$)—N=C=O, —$U^1$-$L^1$-($CH_2$)$_2$—N=C=O, —$U^1$-$L^1$-($CH_2$)$_3$—N=C=O, —$U^1$-$L^1$-($CH_2$)$_4$—N=C=O, —$U^1$-$L^1$-($CH_2$)$_5$—N=C=O, —$U^1$-$L^1$-($CH_2$)$_6$—N=C=O, —$U^1$-$L^1$-($CH_2$)$_7$—N=C=O, $U^1$-$L^1$-($CH_2$)$_8$—N=C=O, —$U^1$-$L^1$-($CH_2$)$_9$—N=C=O, or —$U^1$-$L^1$-($CH_2$)$_{10}$—N=C=O. In some embodiments, the first isocyanate substructure comprises —$U^1$-$L^1$-($CH_2$)$_6$—N=C=O. In some embodiments, $L^1$ comprises one or more $C_3$-$C_{10}$ cycloalkyl, such as substituted or unsubstituted cyclohexyl. In some embodiments, $L^1$ comprises one or more aryl, such as substituted or unsubstituted phenyl and substituted or unsubstituted biphenyl. In some embodiments, $L^1$ comprises one or more substituted or unsubstituted or heteroaryl, such as substituted or unsubstituted pyridinyl.

The second isocyanate substructure described herein comprises the second isocyanate (NCO) group. The second isocyanate substructure may comprise an alkyl linker covalently attached to the NCO group, which NCO group may be a terminal NCO group. The alkyl linker may further comprise an aryl (e.g., phenyl) linker containing one or more aryl moieties; a heteroaryl (e.g., pyridinyl) linker containing one or more heteroaryl moieties; or a cycloalkyl (e.g., unsubstituted or substituted cyclohexyl) linker containing one or more cycloalkyl linkers.

In some embodiments, the second isocyanate substructure comprises —($C_0$-$C_{10}$ alkyl)-N=C=O, where $C_0$ means that the alkyl linker is not present at the indicated location. That is, the structure represented by —($C_0$ alkyl)-N=C=O is the same structure represented by —N=C=O. In some embodiments, the second isocyanate substructure comprises —($C_1$-$C_{10}$ alkyl)-N=C=O, —($C_1$-$C_8$ alkyl)-N=C=O, —($C_1$-$C_6$ alkyl)-N=C=O, or —($C_1$-$C_4$ alkyl)-N=C=O, which include —($C_1$ alkyl)-N=C=O, —($C_2$ alkyl)-N=C=O, —($C_3$ alkyl)-N=C=O, —($C_4$ alkyl)-N=C=O, —($C_5$ alkyl)-N=C=O, —($C_6$ alkyl)-N=C=O, —($C_7$ alkyl)-N=C=O, —($C_8$ alkyl)-N=C=O, —($C_9$ alkyl)-N=C=O, or —($C_{10}$ alkyl)-N=C=O. In some embodiments, the second isocyanate substructure comprises ($CH_2$)—N=C=O, —($CH_2$)$_2$—N=C=O, —($CH_2$)$_3$—N=C=O, —($CH_2$)$_4$—N=C=O, —($CH_2$)$_5$—N=C=O, —($CH_2$)$_6$—N=C=O, —($CH_2$)$_7$—N=C=O, —($CH_2$)$_8$—N=C=O, —($CH_2$)$_9$—N=C=O, or —($CH_2$)$_{10}$—N=C=O. In some embodiments, the second isocyanate substructure comprises —($CH_2$)$_6$—N=C=O.

In some embodiments, the second isocyanate substructure comprises —$U^2$—($C_1$-$C_{10}$ alkyl)-N=C=O, wherein $U^2$ comprises —O—(C=O)—NH— or —NH—(C=O)—O—. In some embodiments, the second isocyanate substructure comprises —$U^2$—($C_1$-$C_{10}$ alkyl)-N=C=O, —$U^2$—($C_1$-$C_8$ alkyl)-N=C=O, —$U^2$—($C_1$-$C_6$ alkyl)-N=C=O, or —$U^2$—($C_1$-$C_4$ alkyl)-N=C=O, which include —$U^2$—($C_1$ alkyl)-N=C=O, —$U^2$—($C_2$ alkyl)-N=C=O, —$U^2$—($C_3$ alkyl)-N=C=O, —$U^2$—($C_4$ alkyl)-N=C=O, —$U^2$—($C_5$ alkyl)-N=C=O, —$U^2$—($C_6$ alkyl)-N=C=O, —$U^2$—($C_7$ alkyl)-N=C=O, —$U^2$—($C_8$ alkyl)-N=C=O, —$U^2$—

($C_9$ alkyl)-N=C=O, or —$U^2$—($C_{10}$ alkyl)-N=C=O. In some embodiments, the second isocyanate substructure comprises —$U^2$—($CH_2$)—N=C=O, —$U^2$—($CH_2$)$_2$—N=C=O, —$U^2$—($CH_2$)$_3$—N=C=O, —$U^2$—($CH_2$)$_4$—N=C=O, —$U^2$—($CH_2$)$_5$—N=C=O, —$U^2$—($CH_2$)$_6$—N=C=O, —$U^2$—($CH_2$)$_7$—N=C=O, —$U^2$—($CH_2$)$_8$—N=C=O, —$U^2$—($CH_2$)$_9$—N=C=O, or —$U^2$—($CH_2$)$_{10}$—N=C=O. In some embodiments, the second isocyanate substructure comprises —$U^2$—($CH_2$)$_6$—N=C=O.

In some embodiments, the second isocyanate substructure comprises -$L^2$-($C_0$-$C_{10}$ alkyl)-N=C=O, wherein $L^2$ comprises one or more $C_3$-$C_{10}$ cycloalkyl, $C_6$-$C_{10}$ aryl, and $C_2$-$C_{10}$ heteroaryl. When the alkyl linker is $C_0$, then the alkyl linker is not present. That is, the structure represented by -$L^2$-($C_0$ alkyl)-N=C=O is the same structure represented by -$L^2$-N=C=O. In some embodiments, the second isocyanate substructure comprises -$L^2$-($C_1$-$C_{10}$ alkyl)-N=C=O, -$L^2$-($C_1$-$C_8$ alkyl)-N=C=O, -$L^2$-($C_1$-$C_6$ alkyl)-N=C=O, or -$L^2$-($C_1$-$C_4$ alkyl)-N=C=O, which include -$L^2$-($C_1$ alkyl)-N=C=O, -$L^2$-($C_2$ alkyl)-N=C=O, -$L^2$-($C_3$ alkyl)-N=C=O, -$L^2$-($C_4$ alkyl)-N=C=O, -$L^2$-($C_5$ alkyl)-N=C=O, -$L^2$-($C_6$ alkyl)-N=C=O, -$L^2$-($C_7$ alkyl)-N=C=O, -$L^2$-($C_8$ alkyl)-N=C=O, -$L^2$-($C_9$ alkyl)-N=C=O, or -$L^2$-($C_{10}$ alkyl)-N=C=O. In some embodiments, the second isocyanate substructure comprises -$L^2$-($CH_2$)—N=C=O, -$L^2$-($CH_2$)$_2$—N=C=O, -$L^2$-($CH_2$)$_3$—N=C=O, -$L^2$-($CH_2$)$_4$—N=C=O, -$L^2$-($CH_2$)$_5$—N=C=O, -$L^2$-($CH_2$)$_6$—N=C=O, -$L^2$-($CH_2$)$_7$—N=C=O, -$L^2$-($CH_2$)$_8$—N=C=O, -$L^2$-($CH_2$)$_9$—N=C=O, or -$L^2$-($CH_2$)$_{10}$—N=C=O. In some embodiments, the second isocyanate substructure comprises -$L^2$-($CH_2$)$_6$—N=C=O. In some embodiments, $L^2$ comprises one or more $C_3$-$C_{10}$ cycloalkyl, such as substituted or unsubstituted cyclohexyl. In some embodiments, $L^2$ comprises one or more aryl, such as substituted or unsubstituted phenyl and substituted or unsubstituted biphenyl. In some embodiments, $L^2$ comprises one or more substituted or unsubstituted or heteroaryl, such as substituted or unsubstituted pyridinyl.

In some embodiments, the second isocyanate substructure comprises —$U^2$-$L^2$-($C_0$-$C_{10}$ alkyl)-N=C=O, wherein $U^2$ comprises —O—(C=O)—NH— or —NH—(C=O)—O—; and $L^2$ comprises one or more $C_3$-$C_{10}$ cycloalkyl, $C_6$-$C_{10}$ aryl, and $C_2$-$C_{10}$ heteroaryl. When the alkyl linker is $C_0$, then the alkyl linker is not present. That is, the structure represented by —$U^2$-$L^2$-($C_0$ alkyl)-N=C=O is the same structure represented by —$U^2$-$L^2$-N=C=O. In some embodiments, the second isocyanate substructure comprises —$U^2$-$L^2$-($C_1$-$C_{10}$ alkyl)-N=C=O, —$U^2$-$L^2$-($C_1$-$C_8$ alkyl)-N=C=O, —$U^2$-$L^2$-($C_1$-$C_6$ alkyl)-N=C=O, or —$U^2$-$L^2$-($C_1$-$C_4$ alkyl)-N=C=O, which include —$U^2$-$L^2$-($C_1$ alkyl)-N=C=O, —$U^2$-$L^2$-($C_2$ alkyl)-N=C=O, —$U^2$-$L^2$-($C_3$ alkyl)-N=C=O, —$U^2$-$L^2$-($C_4$ alkyl)-N=C=O, —$U^2$-$L^2$-($C_5$ alkyl)-N=C=O, —$U^2$-$L^2$-($C_6$ alkyl)-N=C=O, —$U^2$-$L^2$-($C_7$ alkyl)-N=C=O, —$U^2$-$L^2$-($C_8$ alkyl)-N=C=O, —$U^2$-$L^2$-($C_9$ alkyl)-N=C=O, or —$U^2$-$L^2$-($C_{10}$ alkyl)-N=C=O. In some embodiments, the second isocyanate substructure comprises —$U^2$-$L^2$-($CH_2$)—N=C=O, —$U^2$-$L^2$-($CH_2$)$_2$—N=C=O, —$U^2$-$L^2$-($CH_2$)$_3$—N=C=O, —$U^2$-$L^2$-($CH_2$)$_4$—N=C=O, —$U^2$-$L^2$-($CH_2$)$_5$—N=C=O, —$U^2$-$L^2$-($CH_2$)$_6$—N=C=O, —$U^2$-$L^2$-($CH_2$)$_7$—N=C=O, —$U^2$-$L^2$-($CH_2$)$_8$—N=C=O, —$U^2$-$L^2$-($CH_2$)$_9$—N=C=O, or —$U^2$-$L^2$-($CH_2$)$_{10}$—N=C=O. In some embodiments, the second isocyanate substructure comprises —$U^2$-$L^2$-($CH_2$)$_6$—N=C=O. In some embodiments, $L^2$ comprises one or more $C_3$-$C_{10}$ cycloalkyl, such as substituted or unsubstituted cyclohexyl. In some embodiments, $L^2$ comprises one or more aryl, such as substituted or unsubstituted phenyl and substituted or unsubstituted biphenyl. In some embodiments, $L^2$ comprises one or more substituted or unsubstituted or heteroaryl, such as substituted or unsubstituted pyridinyl.

The cyclic olefin substructure described herein comprises the strained cyclic olefin moiety. The cyclic olefin substructure may comprise a first alkyl linker covalently attached to the strained cyclic olefin moiety, which strained cyclic olefin moiety may be a terminal end group. In some embodiments, the strained cyclic olefin moiety is a bicyclic moiety, wherein the two adjacent sp²-hybridized carbon centers that form the double bond reside in a five, six, or seven membered ring. In some embodiments, the strained cyclic olefin moiety is a bridged bicyclic moiety, the bridge optionally comprising a heteroatom. In some embodiments, the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the strained cyclic olefin moiety comprises (a) a norbornene moiety, (b) a 7-oxabicyclo[2.2.1]hept-2-ene moiety, or (c) a 7-oxabicyclo[2.2.1] hept-2-ene moiety. In some embodiments, the strained cyclic olefin moiety comprises a norbornene moiety. The first alkyl linker may further comprise an aryl (e.g., phenyl) linker containing one or more aryl moieties; a heteroaryl (e.g., pyridinyl) linker containing one or more heteroaryl moieties; or a cycloalkyl (e.g., unsubstituted or substituted cyclohexyl) linker containing one or more cycloalkyl linkers. The first alkyl may further comprise a second alkyl linker.

In some embodiments, the cyclic olefin substructure comprises —($C_0$-$C_{10}$ alkyl)-N=C(=O)O—Y—X, wherein Y is $C_0$-$C_{10}$ alkyl and X comprises a strained cyclic olefin moiety. In some embodiments, the cyclic olefin substructure comprises —($C_0$-$C_{10}$ alkyl)-N=C(=O)O—Y—X, wherein Y is $C_0$-$C_{10}$ alkyl and X comprises a strained cyclic olefin moiety, wherein the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the cyclic olefin substructure comprises —($C_0$-$C_{10}$ alkyl)-N=C(=O)O—Y—X, wherein Y is $C_0$-$C_{10}$ alkyl and X comprises a strained cyclic olefin moiety, wherein the strained cyclic olefin moiety comprises (a) a norbornene moiety, (b) a 7-oxabicyclo[2.2.1]hept-2-ene moiety, or (c) a 7-oxabicyclo [2.2.1]hept-2-ene moiety. In some embodiments, the cyclic olefin substructure comprises —($C_0$-$C_{10}$ alkyl)-N=C(=O)O—Y—X, wherein Y is $C_0$-$C_{10}$ alkyl and X comprises a strained cyclic olefin moiety, wherein the strained cyclic olefin moiety comprises a norbornene moiety. The structure represented by —($C_0$ alkyl)-N=C(=O)O—Y—X is the same structure represented by —N=C(=O)O—Y—X. Similarly, when Y is $C_0$, the structure represented by —($C_0$-$C_{10}$ alkyl)-N=C(=O)O—Y—X is the same structure represented by —($C_0$-$C_{10}$ alkyl)-N=C(=O)O—X. In some embodiments, the cyclic olefin substructure comprises —($C_1$-$C_{10}$ alkyl)-N=C(=O)O—Y—X, —($C_1$-$C_8$ alkyl)-N=C(=O)O—Y—X, —($C_1$-$C_6$ alkyl)-N=C(=O)O—Y—X, or —($C_1$-$C_4$ alkyl)-N=C(=O)O—Y—X, which include —($C_1$ alkyl)-N=C(=O)O—Y—X, —($C_2$ alkyl)-N=C(=O)O—Y—X, —($C_3$ alkyl)-N=C(=O)O—Y—X, —($C_4$ alkyl)-N=C(=O)O—Y—X, —($C_5$ alkyl)-N=C (=O)O—Y—X, —(C$_6$ alkyl)-N=C(=O)O—Y—X, —(C$_7$ alkyl)-N=C(=O)O—Y—X, —(C$_8$ alkyl)-N=C(=O)O—Y—X, —(C$_9$ alkyl)-N=C(=O)O—Y—X, or —(C$_{10}$ alkyl)-N=C(=O)O—Y—X. In some embodiments, the cyclic olefin substructure comprises —(CH$_2$)—N=C(=O)O—Y—X, —(CH$_2$)$_2$—N=C(=O)O—Y—X, —(CH$_2$)$_3$—N=C(=O)O—Y—X, —(CH$_2$)$_4$—N=C(=O)O—Y—X, —(CH$_2$)$_5$—N=C(=O)O—Y—X, —(CH$_2$)$_6$—N=C(=O)O—Y—X, —(CH$_2$)$_7$—N=C(=O)O—Y—X, —(CH$_2$)$_8$—N=C(=O)O—Y—X, —(CH$_2$)$_9$—N=C(=O)O—Y—X, or —(CH$_2$)$_{10}$—N=C(=O)O—Y—X. In some embodiments, the cyclic olefin substructure comprises —(CH$_2$)$_6$—N=C(=O)O—Y—X.

In some embodiments, the cyclic olefin substructure comprises —U$^3$—(C$_1$-C$_{10}$ alkyl)-N=C(=O)O—Y—X, wherein Y is C$_0$-C$_{10}$ alkyl; U$^3$ comprises —O—(C=O)—NH— or —NH—(C=O)—O—; and X comprises a strained cyclic olefin moiety. In some embodiments, the cyclic olefin substructure comprises —U$^3$—(C$_1$-C$_{10}$ alkyl)-N=C(=O)O—Y—X, wherein Y is C$_0$-C$_{10}$ alkyl; U$^3$ comprises —O—(C=O)—NH— or —NH—(C=O)—O—; and X comprises a strained cyclic olefin moiety, wherein the strained cyclic olefin moiety is a bridged bicyclic moiety, the bridged bicyclic moiety comprising the backbone structure of Formula M1, wherein: (a) B$_1$ comprises —C— and B$_2$ comprises —C—; or (b) B$_1$ comprises —C— and B$_2$ comprises —O—; or (c) B$_1$ comprises —O— and B$_2$ comprises —C—. In some embodiments, the cyclic olefin substructure comprises —U$^3$—(C$_1$-C$_{10}$ alkyl)-N=C(=O)O—Y—X, wherein Y is C$_0$-C$_{10}$ alkyl; U$^3$ comprises —O—(C=O)—NH— or —NH—(C=O)—O—; and X comprises a strained cyclic olefin moiety, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the cyclic olefin substructure comprises —U$^3$—(C$_1$-C$_{10}$ alkyl)-N=C(=O)O—Y—X, wherein Y is C$_0$-C$_{10}$ alkyl; U$^3$ comprises —O—(C=O)—NH— or —NH—(C=O)—O—; and X comprises a strained cyclic olefin moiety, wherein the strained cyclic olefin moiety comprises a norbornene moiety. When Y is C$_0$, the structure represented by —U$^3$—(C$_0$-C$_{10}$ alkyl)-N=C(=O)O—Y—X is the same structure represented by —U$^3$—(C$_0$-C$_{10}$ alkyl)-N=C(=O)O—X. In some embodiments, the cyclic olefin substructure comprises —U$^3$—(C$_1$-C$_{10}$ alkyl)-N=C(=O)O—Y—X, —U$^3$—(C$_1$-C$_8$ alkyl)-N=C(=O)O—Y—X, —U$^3$—(C$_1$-C$_6$ alkyl)-N=C(=O)O—Y—X, or —U$^3$—(C$_1$-C$_4$ alkyl)-N=C(=O)O—Y—X, which include —U$^3$—(C$_1$ alkyl)-N=C(=O)O—Y—X, —U$^3$—(C$_2$ alkyl)-N=C(=O)O—Y—X, —U$^3$—(C$_3$ alkyl)-N=C(=O)O—Y—X, —U$^3$—(C$_4$ alkyl)-N=C(=O)O—Y—X, —U$^3$—(C$_5$ alkyl)-N=C(=O)O—Y—X, —U$^3$—(C$_6$ alkyl)-N=C(=O)O—Y—X, —U$^3$—(C$_7$ alkyl)-N=C(=O)O—Y—X, —U$^3$—(C$_8$ alkyl)-N=C(=O)O—Y—X, —U$^3$—(C$_9$ alkyl)-N=C(=O)O—Y—X, or —U$^3$—(C$_{10}$ alkyl)-N=C(=O)O—Y—X. In some embodiments, the cyclic olefin substructure comprises —U$^3$—(CH$_2$)—N=C(=O)O—Y—X, —U$^3$—(CH$_2$)$_2$—N=C(=O)O—Y—X, —U$^3$—(CH$_2$)$_3$—N=C(=O)O—Y—X, —U$^3$—(CH$_2$)$_4$—N=C(=O)O—Y—X, —U$^3$—(CH$_2$)$_5$—N=C(=O)O—Y—X, —U$^3$—(CH$_2$)$_6$—N=C(=O)O—Y—X, —U$^3$—(CH$_2$)$_7$—N=C(=O)O—Y—X, —U$^3$—(CH$_2$)$_8$—N=C(=O)O—Y—X, —U$^3$—(CH$_2$)$_9$—N=C(=O)O—Y—X, or —U$^3$—(CH$_2$)$_{10}$—N=C(=O)O—Y—X. In some embodiments, the cyclic olefin substructure comprises —U$^3$—(CH$_2$)$_6$—N=C(=O)O—Y—X.

In some embodiments, the cyclic olefin substructure comprises -L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; and X comprises a strained cyclic olefin moiety. In some embodiments, the cyclic olefin substructure comprises -L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; and X comprises a strained cyclic olefin moiety, wherein the strained cyclic olefin moiety is a bridged bicyclic moiety, the bridged bicyclic moiety comprising the backbone structure of Formula M1, wherein: (a) B$_1$ comprises —C— and B$_2$ comprises —C—; or (b) B$_1$ comprises —C— and B$_2$ comprises —O—; or (c) B$_1$ comprises —O— and B$_2$ comprises —C—. In some embodiments, the cyclic olefin substructure comprises -L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; and X comprises a strained cyclic olefin moiety, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the cyclic olefin substructure comprises -L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; and X comprises a strained cyclic olefin moiety, wherein the strained cyclic olefin moiety comprises a norbornene moiety. The structure represented by -L$^3$-(C$_0$ alkyl)-N=C(=O)O—Y—X is the same structure represented by -L$^3$-N=C(=O)O—Y—X. Similarly, when Y is C$_0$, the structure represented by -L$^3$-(C$_0$-C$_{10}$ alkyl)-N=C(=O)O—Y—X is the same structure represented by -L$^3$-(C$_0$-C$_{10}$ alkyl)-N=C(=O)O—X. In some embodiments, the cyclic olefin substructure comprises -L$^3$-(C$_1$-C$_{10}$ alkyl)-N=C(=O)O—Y—X, -L$^3$ (C$_1$-C$_8$ alkyl)-N=C(=O)O—Y—X, -L$^3$-(C$_1$-C$_6$ alkyl)-N=C(=O)O—Y—X, or -L$^3$-(C$_1$-C$_4$ alkyl)-N=C(=O)O—Y—X, which include -L$^3$-(C$_1$ alkyl)-N=C(=O)O—Y—X, -L$^3$-(C$_2$ alkyl)-N=C(=O)O—Y—X, -L$^3$-(C$_3$ alkyl)-N=C(=O)O—Y—X, -L$^3$-(C$_4$ alkyl)-N=C(=O)O—Y—X, -L$^3$-(C$_5$ alkyl)-N=C(=O)O—Y—X, -L$^3$-(C$_6$ alkyl)-N=C(=O)O—Y—X, -L$^3$-(C$_7$ alkyl)-N=C(=O)O—Y—X, -L$^3$-(C$_8$ alkyl)-N=C(=O)O—Y—X, -L$^3$-(C$_9$ alkyl)-N=C(=O)O—Y—X, or -L$^3$ (C$_{10}$ alkyl)-N=C(=O)O—Y—X. In some embodiments, the cyclic olefin substructure comprises -L$^3$-(CH$_2$)—N=C(=O)O—Y—X, -L$^3$-(CH$_2$)$_2$—N=C(=O)O—Y—X, -L$^3$-(CH$_2$)$_3$—N=C(=O)O—Y—X, -L$^3$-(CH$_2$)$_4$—N=C(=O)O—Y—X, -L$^3$-(CH$_2$)$_5$—N=C(=O)O—Y—X, -L$^3$-(CH$_2$)$_6$—N=C(=O)O—Y—X, -L$^3$-(CH$_2$)$_7$—N=C(=O)O—Y—X, -L$^3$-(CH$_2$)$_8$—N=C(=O)O—Y—X, -L$^3$-(CH$_2$)$_9$—N=C(=O)O—Y—X, or -L$^3$-(CH$_2$)$_{10}$—N=C(=O)O—Y—X. In some embodiments, the cyclic olefin substructure comprises -L$^3$-(CH$_2$)$_6$—N=C(=O)O—Y—X.

In some embodiments, the cyclic olefin substructure comprises —U$^3$-L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; U$^3$ comprises —O—(C=O)—NH— or —NH—(C=O)—O—; and X comprises a strained cyclic olefin moiety. In some embodiments, the cyclic olefin substructure comprises —U$^3$-L$^3$-(C$_0$-C$_{10}$ alkyl)-N=C(=O)O—Y—X, wherein Y is C$_0$-C$_{10}$ alkyl; L$^3$ comprises one or more C$_3$-C$_{10}$ cycloalkyl, C$_6$-C$_{10}$ aryl, and C$_2$-C$_{10}$ heteroaryl; U$^3$ comprises —O—(C=O)—NH— or —NH—(C=O)—O—; and X comprises a strained cyclic olefin moiety, wherein the strained cyclic olefin moiety is a bridged bicyclic moiety, the bridged bicyclic moiety comprising the backbone structure of Formula M1, wherein: (a) B$_1$ comprises —C— and B$_2$ comprises —C—; or (b) $B_1$ comprises —C— and $B_2$ comprises —O—; or (c) $B_1$ comprises —O— and $B_2$ comprises —C—. In some embodiments, the cyclic olefin substructure comprises —$U^3$-$L^3$-($C_0$-$C_{10}$ alkyl)-N═C(═O)O—Y—X, wherein Y is $C_0$-$C_{10}$ alkyl; $L^3$ comprises one or more $C_3$-$C_{10}$ cycloalkyl, $C_6$-$C_{10}$ aryl, and $C_2$-$C_{10}$ heteroaryl; $U^3$ comprises —O—(C═O)—NH— or —NH—(C═O)—O—; and X comprises a strained cyclic olefin moiety, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the cyclic olefin substructure comprises —$U^3$-$L^3$-($C_0$-$C_{10}$ alkyl)-N═C(═O)O—Y—X, wherein Y is $C_0$-$C_{10}$ alkyl; $L^3$ comprises one or more $C_3$-$C_{10}$ cycloalkyl, $C_6$-$C_{10}$ aryl, and $C_2$-$C_{10}$ heteroaryl; $U^3$ comprises —O—(C═O)— NH— or —NH—(C═O)—O—; and X comprises a strained cyclic olefin moiety, wherein the strained cyclic olefin moiety comprises a norbornene moiety. The structure represented by —$U^3$-$L^3$-($C_0$ alkyl)-N═C(═O)O—Y—X is the same structure represented by —$U^3$-$L^3$-(N═C(═O)O— Y—X. Similarly, when Y is $C_0$, the structure represented by —$U^3$-$L^3$-($C_0$-$C_{10}$ alkyl)-N═C(═O)O—Y—X is the same structure represented by —$U^3$-$L^3$-($C_0$-$C_{10}$ alkyl)-N═C (═O)O—X. In some embodiments, the cyclic olefin substructure comprises —$U^3$-$L^3$-($C_1$-$C_{10}$ alkyl)-N═C(═O) O—Y—X, —$U^3$-$L^3$-($C_1$-$C_8$ alkyl)-N═C(═O)O—Y—X, —$U^3$-$L^3$-($C_1$-$C_6$ alkyl)-N═C(═O)O—Y—X, or —$U^3$-$L^3$- ($C_1$-$C_4$ alkyl)-N═C(═O)O—Y—X, which include —$U^3$- $L^3$-($C_1$ alkyl)-N═C(═O)O—Y—X, —$U^3$-$L^3$-($C_2$ alkyl)- N═C(═O)O—Y—X, -$L^3$-($C_3$ alkyl)-N═C(═O)O—Y— X, —$U^3$-$L^3$-($C_4$ alkyl)-N═C(═O)O—Y—X, —$U^3$-$L^3$-($C_5$ alkyl)-N═C(═O)O—Y—X, —$U^3$-$L^3$-($C_6$ alkyl)-N═C (═O)O—Y—X, —$U^3$-$L^3$-($C_7$ alkyl)-N═C(═O)O—Y— X, —$U^3$-$L^3$-($C_8$ alkyl)-N═C(═O)O—Y—X, —$U^3$-$L^3$-($C_9$ alkyl)-N═C(═O)O—Y—X, or —$U^3$-$L^3$-($C_{10}$ alkyl)-N═C (═O)O—Y—X. In some embodiments, the cyclic olefin substructure comprises —$U^3$-$L^3$-($CH_2$)—N═C(═O)O— Y—X, —$U^3$-$L^3$-($CH_2$)$_2$—N═C(═O)O—Y—X, —$U^3$-$L^3$- ($CH_2$)$_3$—N═C(═O)O—Y—X, —$U^3$-$L^3$-($CH_2$)$_4$—N═C (═O)O—Y—X, —$U^3$-$L^3$-($CH_2$)$_5$—N═C(═O)O—Y—X, —$U^3$-$L^3$-($CH_2$)$_6$—N═C(═O)O—Y—X, —$U^3$-$L^3$- ($CH_2$)$_7$—N═C(═O)O—Y—X, —$U^3$-$L^3$-($CH_2$)$_8$—N═C (═O)O—Y—X, —$U^3$-$L^3$-($CH_2$)$_9$—N═C(═O)O—Y—X, or —$U^3$-$L^3$-($CH_2$)$_{10}$—N═C(═O)O—Y—X. In some embodiments, the cyclic olefin substructure comprises —$U^3$-$L^3$-($CH_2$)$_6$—N═C(═O)O—Y—X.

In some embodiments, Y is $C_{0-10}$ alkyl, where $C_0$ means that the alkyl linker is not present at the indicated location. In some embodiments, Y is $C_1$-$C_{10}$ alkyl, $C_1$-$C_8$alkyl, $C_1$-$C_6$ alkyl, or $C_1$-$C_4$ alkyl, including $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, and $C_{10}$ alkyl. In some embodiments, Y is a $C_1$ alkyl.

Representative moieties that comprise a norbornene moiety include: a norbornene moiety; a 5-methyl-2-norbornene moiety; a 5-ethyl-2-norbornene moiety; a 5-isobutyl-2-norbornene moiety; a 5,6-dimethyl-2-norbornene moiety; a 5-phenylnorbornene moiety; a 5-benzylnorbornene moiety; a 5-acetylnorbornene moiety; a 5-methoxycarbonylnorbornene moiety; a 5-ethoxycarbonyl-1-norbornene moiety; a 5-methyl-5-methoxycarbonylnorbornene moiety; a 5-cyanonorbornene moiety; a 5,5,6-trimethyl-2-norbornene moiety; a cyclo-hexenylnorbornene; an endo, exo-5,6-dimethoxynorbornene moiety; an endo, endo-5,6-dimethoxynorbornene moiety; an endo, exo-5-6-dimethoxycarbonylnorbornene moiety; an endo, endo-5,6-dimethoxycarbonylnorbornene moiety; a 2,3-dimethoxynorbornene moiety; a norbornadiene moiety; a tricycloundecene moiety; a tetracyclododecene moiety; an 8-methyltetracyclododecene moiety; a 8-ethyl-tetracyclododecene moiety; an 8-methoxycarbonyltetracyclododecene moiety; a 8-methyl-8-tetracyclo-dodecene; a 8-cyanotetracyclododecene moiety; a pentacyclopentadecene moiety; a pentacyclohexadecene moiety; a cyclopentadiene tetramer moiety, a cyclopentadiene pentamer moiety; a 5-butyl-2-norbornene moiety; a 5-hexyl-2-norbornene moiety; a 5-octyl-2-norbornene moiety; a 5-decyl-2-norbornene moiety; a 5-dodecyl-2-norbornene moiety; a 5-vinyl-2-norbornene moiety; a 5-ethylidene-2-norbornene moiety; a 5-isopropenyl 2-norbornene moiety; a 5-propenyl-2-norbornene moiety; and a 5-butenyl-2-norbornene moiety. In some embodiments, the norbornene moiety is derived from a strained cyclic olefin compound having one or more hydroxyl functional groups. In some embodiments, the norbornene moiety is derived from a strained cyclic olefin compound depicted in FIGS. 5a and 5b. In some embodiments, the norbornene moiety is derived from {bicyclo[2.2.1]hept-5-en-2-yl}methanol or bicyclo[2.2.1]hept-5-en-2-ol. In some embodiments, norbornene moiety is derived from {bicyclo [2.2.1]hept-5-en-2-yl}methanol. In some embodiments, norbornene moiety is derived from bicyclo[2.2.1]hept-5-en-2-ol. In some embodiments, the norbornene moiety is derived from 4-{bicyclo[2.2.1]hept-5-en-2-yl}butan-1-ol. In some embodiments, the norbornene moiety is derived from 3-{bicyclo[2.2.1]hept-5-en-2-yl}propan-1-ol. In some embodiments, the norbornene moiety is derived from 2-{bicyclo [2.2.1]hept-5-en-2-yl}ethan-1-ol. In some embodiments, the norbornene moiety is derived from {bicyclo[2.2.1]hept-5-en-2-yl}methanol. In some embodiments, the norbornene moiety is derived from bicyclo[2.2.1]hept-5-en-2-ol. In some embodiments, the norbornene moiety is derived from [3-(hydroxymethyl)bicyclo[2.2.1]hept-5-en-2-yl]methanol. In some embodiments, the norbornene moiety is derived from bicyclo[2.2.1]hept-5-ene-2,3-diol. In some embodiments, the norbornene moiety is derived from tricyclo [5.2.1.0$^{2,6}$]dec-8-en-3-ol. In some embodiments, the norbornene moiety is derived from tricyclo[5.2.1.0$^{2,6}$]dec-8-ene-3,4-diol. In some embodiments, the norbornene moiety is derived from tricyclo[5.2.1.0$^{2,6}$]dec-8-ene-3,5-diol. In some embodiments, the norbornene moiety is derived from tricyclo[5.2.1.0$^{2,6}$]dec-8-ene-3,4,5-triol. In some embodiments, the norbornene moiety is derived from a strained cyclic olefin compound having one or more isocyanate functional groups. In some embodiments, the norbornene moiety is derived from a strained cyclic olefin compound depicted in FIG. 6. In some embodiments, the norbornene moiety is derived from 5-(2-isocyanatoethyl)bicyclo[2.2.1] hept-2-ene. In some embodiments, the norbornene moiety is derived from 5-(isocyanatomethyl)bicyclo[2.2.1]hept-2-ene. In some embodiments, the norbornene moiety is derived from 5-isocyanatobicyclo[2.2.1]hept-2-ene. In some embodiments, the norbornene moiety is derived from 5,6-diisocyanatobicyclo[2.2.1]hept-2-ene.

In some embodiments, the multifunctional crosslinker comprises a structure selected from the group consisting of:

Formula 1

-continued

Formula 2

Formula 3

Formula 4

Formula 5

For Formulas 1-5, $R_1$, $R_2$ and $R_3$ are any one of the following: (a) $R_1$ comprises the first isocyanate functional group, $R_2$ comprises the second isocyanate functional group, and $R_3$ comprises the strained cyclic olefin moiety; (b) $R_1$ comprises the first isocyanate functional group, $R_2$ comprises the strained cyclic olefin moiety, and $R_3$ comprises the second isocyanate functional group; (c) $R_1$ comprises the strained cyclic olefin moiety, $R_2$ comprises the first isocyanate functional group, and $R_3$ comprises the second isocyanate functional group; (d) $R_1$ comprises the second isocyanate functional group, $R_2$ comprises the first isocyanate functional group, and $R_3$ comprises the strained cyclic olefin moiety; (e) $R_1$ comprises the second isocyanate functional group, $R_2$ comprises the strained cyclic olefin moiety, and $R_3$ comprises the first isocyanate functional group; (f) $R_1$ comprises the strained cyclic olefin moiety, $R_2$ comprises the second isocyanate functional group, and $R_3$ comprises the first isocyanate functional group.

In some embodiments, the multifunctional crosslinker comprises the structure of Formula 1:

wherein $R_1$ comprises the first isocyanate functional group, $R_2$ comprises the second isocyanate functional group, and $R_3$ comprises the strained cyclic olefin moiety.

In some embodiments, the first isocyanate substructure of Formula 1 comprises: —($C_0$-$C_{10}$ alkyl)-N═C═O, as described above. In some embodiments, the first isocyanate substructure of Formula 1 comprises -$L^1$-($C_0$-$C_{10}$ alkyl)-N═C═O, wherein $L^1$ comprises one or more $C_3$-$C_{10}$ cycloalkyl, $C_6$-$C_{10}$ aryl, and $C_2$-$C_{10}$ heteroaryl, as described above. In some embodiments, the second isocyanate substructure of Formula 1 comprises: —($C_0$-$C_{10}$ alkyl)-N═C═O as described above. In some embodiments, the second isocyanate substructure of Formula 1 comprises -$L^2$-($C_0$-$C_{10}$ alkyl)-N═C═O, wherein $L^2$ comprises one or more $C_3$-$C_{10}$ cycloalkyl, $C_6$-$C_{10}$ aryl, and $C_2$-$C_{10}$ heteroaryl, as described above. In some embodiments, the cyclic olefin substructure of Formula 1 comprises-($C_0$-$C_{10}$ alkyl)-N═C(═O)O—Y—X, wherein Y is $C_0$-$C_{10}$ alkyl, and X is the strained cyclic olefin moiety, as described above. In some embodiments, the cyclic olefin substructure of Formula 1 comprises -$L^3$-($C_0$-$C_{10}$ alkyl)-N═C(═O)O—Y—X, wherein X is the strained cyclic olefin moiety, Y is $C_0$-$C_{10}$ alkyl, and $L^3$ comprises one or more $C_3$-$C_{10}$ cycloalkyl, $C_6$-$C_{10}$ aryl, and $C_2$-$C_{10}$ heteroaryl, as described above. In some embodiments, the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the strained cyclic olefin moiety comprises a norbornene moiety.

In some embodiments, the multifunctional crosslinker comprises the structure of Formula 1.1:

In some embodiments, the multifunctional crosslinker comprises the structure of Formula 1.2:

In some embodiments, the multifunctional crosslinker comprises the structure of Formula 1.3:

In some embodiments, the multifunctional crosslinker comprises the structure of Formula 1.6:

In some embodiments, the multifunctional crosslinker comprises the structure of Formula 1.4:

In some embodiments, the multifunctional crosslinker comprises the structure of Formula 1.7:

In some embodiments, the multifunctional crosslinker comprises the structure of Formula 1.5:

In some embodiments, the multifunctional crosslinker comprises the structure of Formula 1.8:

In some embodiments, the multifunctional crosslinker comprises the structure of Formula 1.9:

In some embodiments, the multifunctional crosslinker comprises the structure of Formula 1.11:

In some embodiments, the multifunctional crosslinker comprises the structure of Formula 1.10:

In some embodiments, the multifunctional crosslinker comprises the structure of Formula 1.12:

In some embodiments, the multifunctional crosslinker comprises the structure of Formula 1.13:

In some embodiments, the multifunctional crosslinker comprises the structure of Formula 2:

wherein any one of the following: (a) $R_1$ comprises the first isocyanate functional group, $R_2$ comprises the second isocyanate functional group, and $R_3$ comprises the strained cyclic olefin moiety; (b) $R_1$ comprises the first isocyanate functional group, $R_2$ comprises the strained cyclic olefin moiety, and $R_3$ comprises the second isocyanate functional group; (c) $R_1$ comprises the strained cyclic olefin moiety, $R_2$ comprises the first isocyanate functional group, and $R_3$ comprises the second isocyanate functional group; (d) $R_1$ comprises the second isocyanate functional group, $R_2$ comprises the first isocyanate functional group, and $R_3$ comprises the strained cyclic olefin moiety; (e) $R_1$ comprises the second isocyanate functional group, $R_2$ comprises the strained cyclic olefin moiety, and $R_3$ comprises the first isocyanate functional group; and (f) $R_1$ comprises the strained cyclic olefin moiety, $R_2$ comprises the second isocyanate functional group, and $R_3$ comprises the first isocyanate functional group.

In some embodiments, the first isocyanate substructure of Formula 2 comprises: $-(C_0\text{-}C_{10}$ alkyl)$-N{=}C{=}O$, as described above. In some embodiments, the first isocyanate substructure of Formula 2 comprises $-L^1$-$(C_0\text{-}C_{10}$ alkyl)$-N{=}C{=}O$, wherein $L^1$ comprises one or more $C_3\text{-}C_{10}$ cycloalkyl, $C_6\text{-}C_{10}$ aryl, and $C_2\text{-}C_{10}$ heteroaryl, as described above. In some embodiments, the second isocyanate substructure of Formula 2 comprises: $-(C_0\text{-}C_{10}$ alkyl)$-N{=}C{=}O$ as described above. In some embodiments, the second isocyanate substructure of Formula 2 comprises $-L^2$-$(C_0\text{-}C_{10}$ alkyl)$-N{=}C{=}O$, wherein $L^2$ comprises one or more $C_3\text{-}C_{10}$ cycloalkyl, $C_6\text{-}C_{10}$ aryl, and $C_2\text{-}C_{10}$ heteroaryl, as described above. In some embodiments, the cyclic olefin substructure of Formula 2 comprises $-(C_0\text{-}C_{10}$ alkyl)$-N{=}C({=}O)O{-}Y{-}X$, wherein X is the strained cyclic olefin moiety, and Y is $C_0\text{-}C_{10}$ alkyl, as described above. In some embodiments, the cyclic olefin substructure of Formula 2 comprises $-L^3$-$(C_0\text{-}C_{10}$ alkyl)$-N{=}C({=}O)O{-}Y{-}X$, wherein X is the strained cyclic olefin moiety, Y is $C_0\text{-}C_{10}$ alkyl, and $L^3$ comprises one or more $C_3\text{-}C_{10}$ cycloalkyl, $C_6\text{-}C_{10}$ aryl, and $C_2\text{-}C_{10}$ heteroaryl, as described above. In some embodiments, the strained cyclic olefin moiety is a bridged bicyclic moiety, the bridged bicyclic moiety comprising the backbone structure of Formula M1, wherein: (a) $B_1$ comprises $-C-$ and $B_2$ comprises $-C-$; or (b) $B_1$ comprises $-C-$ and $B_2$ comprises $-O-$; or (c) $B_1$ comprises $-O-$ and $B_2$ comprises $-C-$. In some embodiments, the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the strained cyclic olefin moiety comprises a norbornene moiety.

In some embodiments, the multifunctional crosslinker comprises the structure of Formula 2.1:

In some embodiments, the multifunctional crosslinker comprises the structure of Formula 2.2:

In some embodiments, the multifunctional crosslinker comprises the structure of Formula 3:

wherein $R_1$ comprises the first isocyanate functional group, $R_2$ comprises the second isocyanate functional group, and $R_3$ comprises the strained cyclic olefin moiety.

In some embodiments, the first isocyanate substructure of Formula 3 comprises: $-(C_0\text{-}C_{10}$ alkyl)$-N{=}C{=}O$, as described above. In some embodiments, the first isocyanate substructure of Formula 3 comprises $-L^1$-$(C_0\text{-}C_{10}$ alkyl)$-N{=}C{=}O$, wherein $L^1$ comprises one or more $C_3\text{-}C_{10}$ cycloalkyl, $C_6\text{-}C_{10}$ aryl, and $C_2\text{-}C_{10}$ heteroaryl, as described above. In some embodiments, the second isocyanate substructure of Formula 3 comprises: $-(C_0\text{-}C_{10}$ alkyl)$-N{=}C{=}O$ as described above. In some embodiments, the second isocyanate substructure of Formula 3 comprises $-L^2$-$(C_0\text{-}C_{10}$ alkyl)$-N{=}C{=}O$, wherein $L^2$ comprises one or more $C_3\text{-}C_{10}$ cycloalkyl, $C_6\text{-}C_{10}$ aryl, and $C_2\text{-}C_{10}$ heteroaryl, as described above. In some embodiments, the cyclic olefin substructure of Formula 3 comprises $-(C_0\text{-}C_{10}$ alkyl)$-N{=}C({=}O)O{-}Y{-}X$, wherein X is the strained cyclic olefin moiety, and Y is $C_0\text{-}C_{10}$ alkyl, as described above. In some embodiments, the cyclic olefin substructure of Formula 3 comprises $-L^3$-$(C_0\text{-}C_{10}$ alkyl)$-N{=}C({=}O)O{-}Y{-}X$, wherein X is the strained cyclic olefin moiety, Y is $C_0\text{-}C_{10}$ alkyl, and $L^3$ comprises one or more $C_3$-$C_{10}$ cycloalkyl, $C_6$-$C_{10}$ aryl, and $C_2$-$C_{10}$ heteroaryl, as described above. In some embodiments, the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the strained cyclic olefin moiety comprises a norbornene moiety.

In some embodiments, the multifunctional crosslinker comprises the structure of Formula 3.1:

In some embodiments, the multifunctional crosslinker comprises the structure of Formula 3.2:

In some embodiments, the multifunctional crosslinker comprises the structure of Formula 4:

wherein $R_1$ comprises the first isocyanate functional group, $R_2$ comprises the second isocyanate functional group, and $R_3$ comprises the strained cyclic olefin moiety.

In some embodiments, the first isocyanate substructure of Formula 4 comprises: —($C_0$-$C_{10}$ alkyl)-N=C=O, as described above. In some embodiments, the first isocyanate substructure of Formula 4 comprises -$L^1$-($C_0$-$C_{10}$ alkyl)-N=C=O, wherein $L^1$ comprises one or more $C_3$-$C_{10}$ cycloalkyl, $C_0$-$C_{10}$ aryl, and $C_2$-$C_{10}$ heteroaryl, as described above. In some embodiments, the second isocyanate substructure of Formula 4 comprises: —($C_0$-$C_{10}$ alkyl)-N=C=O as described above. In some embodiments, the second isocyanate substructure of Formula 4 comprises -$L^2$-($C_0$-$C_{10}$ alkyl)-N=C=O, wherein $L^2$ comprises one or more $C_3$-$C_{10}$ cycloalkyl, $C_6$-$C_{10}$ aryl, and $C_2$-$C_{10}$ heteroaryl, as described above. In some embodiments, the cyclic olefin substructure of Formula 4 comprises —($C_0$-$C_{10}$ alkyl)-N=C(=O)O—Y—X, wherein X is the strained cyclic olefin moiety, and Y is $C_0$-$C_{10}$ alkyl, as described above. In some embodiments, the cyclic olefin substructure of Formula 4 comprises -$L^3$-($C_0$-$C_{10}$ alkyl)-N=C(=O)O—Y—X, wherein X is the strained cyclic olefin moiety, Y is $C_0$-$C_{10}$ alkyl, and $L^3$ comprises one or more $C_3$-$C_{10}$ cycloalkyl, $C_6$-$C_{10}$ aryl, and $C_2$-$C_{10}$ heteroaryl, as described above. In some embodiments, the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the strained cyclic olefin moiety comprises a norbornene moiety.

In some embodiments, the multifunctional crosslinker comprises the structure of Formula 4.1:

In some embodiments, the multifunctional crosslinker comprises the structure of Formula 4.2:

In some embodiments, the multifunctional crosslinker comprises the structure of Formula 5:

wherein $R_1$ comprises the first isocyanate functional group, $R_2$ comprises the second isocyanate functional group, and $R_3$ comprises the strained cyclic olefin moiety.

In some embodiments, the first isocyanate substructure of Formula 5 comprises: —$(C_0\text{-}C_{10}$ alkyl)-N=C=O, as described above. In some embodiments, the first isocyanate substructure of Formula 5 comprises -$L^1$-$(C_0\text{-}C_{10}$ alkyl)-N=C=O, wherein $L^1$ comprises one or more $C_3\text{-}C_{10}$ cycloalkyl, $C_6\text{-}C_{10}$ aryl, and $C_2\text{-}C_{10}$ heteroaryl, as described above. In some embodiments, the second isocyanate substructure of Formula 5 comprises: —$(C_0\text{-}C_{10}$ alkyl)-N=C=O as described above. In some embodiments, the second isocyanate substructure of Formula 5 comprises -$L^2$-$(C_0\text{-}C_{10}$ alkyl)-N=C=O, wherein $L^2$ comprises one or more $C_3\text{-}C_{10}$ cycloalkyl, $C_6\text{-}C_{10}$ aryl, and $C_2\text{-}C_{10}$ heteroaryl, as described above. In some embodiments, the cyclic olefin substructure of Formula 5 comprises —$(C_0\text{-}C_{10}$ alkyl)-N=C(=O)O—Y—X, wherein X is the strained cyclic olefin moiety, and Y is $C_0\text{-}C_{10}$ alkyl, as described above. In some embodiments, the cyclic olefin substructure of Formula 5 comprises -$L^3$-$(C_0\text{-}C_{10}$ alkyl)-N=C(=O)O—Y—X, wherein X is the strained cyclic olefin moiety, Y is $C_0\text{-}C_{10}$ alkyl, and $L^3$ comprises one or more $C_3\text{-}C_{10}$ cycloalkyl, $C_6\text{-}C_{10}$ aryl, and $C_2\text{-}C_{10}$ heteroaryl, as described above. In some embodiments, the strained cyclic olefin moiety is a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety. In some embodiments, the strained cyclic olefin moiety comprises a norbornene moiety.

In some embodiments, the multifunctional crosslinker comprises the structure of Formula 5.1:

In some embodiments, the multifunctional crosslinker comprises the structure of Formula 5.2:

In some embodiments, the multifunctional crosslinker comprises the structure of Formula 6:

wherein $R_1$ comprises the first isocyanate functional group, and $R_2$ comprises the second isocyanate functional group.

In some embodiments, the first isocyanate substructure of Formula 6 comprises: —$(C_0$-$C_{10}$ alkyl)-N═C═O, as described above. In some embodiments, the first isocyanate substructure of Formula 6 comprises -$L^1$-$(C_0$-$C_{10}$ alkyl)-N═C═O, wherein $L^1$ comprises one or more $C_3$-$C_{10}$ cycloalkyl, $C_6$-$C_{10}$ aryl, and $C_2$-$C_{10}$ heteroaryl, as described above. In some embodiments, the second isocyanate substructure of Formula 6 comprises:—$(C_0$-$C_{10}$ alkyl)-N═C═O as described above. In some embodiments, the second isocyanate substructure of Formula 6 comprises -$L^2$-$(C_0$-$C_{10}$ alkyl)-N═C═O, wherein $L^2$ comprises one or more $C_3$-$C_{10}$ cycloalkyl, $C_6$-$C_{10}$ aryl, and $C_2$-$C_{10}$ heteroaryl, as described above:

In some embodiments, the multifunctional crosslinker comprises the structure of Formula 6.1:

In some embodiments, the multifunctional crosslinker comprises the structure of Formula 6.2:

In some embodiments, the multifunctional crosslinker comprises the structure of Formula 7:

wherein $R_1$ comprises the first isocyanate functional group, and $R_2$ comprises the second isocyanate functional group, and A comprises a 5 membered or 6 membered cycloalkyl or heterocyclyl. In some embodiments, A comprises a cyclopentyl or a cyclohexyl. In some embodiments, A comprises 5 membered or 6 membered heterocyclyl containing 0-4 atoms selected from O, S, and N.

In some embodiments, the first isocyanate substructure of Formula 7 comprises: —$(C_0$-$C_{10}$ alkyl)-N═C═O, as described above. In some embodiments, the first isocyanate substructure of Formula 7 comprises -$L^1$-$(C_0$-$C_{10}$ alkyl)-N═C═O, wherein $L^1$ comprises one or more $C_3$-$C_{10}$ cycloalkyl, $C_6$-$C_{10}$ aryl, or $C_2$-$C_{10}$ heteroaryl, as described above. In some embodiments, the second isocyanate substructure of Formula 7 comprises: —$(C_0$-$C_{10}$ alkyl)-N═C═O as described above. In some embodiments, the second isocyanate substructure of Formula 7 comprises -$L^2$-$(C_0$-$C_{10}$ alkyl)-N═C═O, wherein $L^2$ comprises one or more $C_3$-$C_{10}$ cycloalkyl, $C_6$-$C_{10}$ aryl, and $C_2$-$C_{10}$ heteroaryl, as described above.

In some embodiments, the multifunctional crosslinker comprises the structure of Formula 7.1:

wherein $R_1$ comprises the first isocyanate functional group, and $R_2$ comprises the second isocyanate functional group.

In some embodiments, the first isocyanate substructure of Formula 7.1 comprises: —$(C_0$-$C_{10}$ alkyl)-N═C═O, as described above. In some embodiments, the first 94 $L^1$ comprises one or more $C_3$-$C_{10}$ cycloalkyl, $C_6$-$C_{10}$ aryl, and $C_2$-$C_{10}$ heteroaryl, as described above. In some embodiments, the second isocyanate substructure of Formula 7.1 comprises: —($C_0$-$C_{10}$ alkyl)-N=C=O as described above. In some embodiments, the second isocyanate substructure of Formula 7.1 comprises -$L^2$-($C_0$-$C_{10}$ alkyl)-N=C=O, wherein $L^2$ comprises one or more $C_3$-$C_{10}$ cycloalkyl, $C_6$-$C_{10}$ aryl, and $C_2$-$C_{10}$ heteroaryl, as described above.

In some embodiments, the multifunctional crosslinker comprises the structure of Formula 7.2:

In some embodiments, the multifunctional crosslinker comprises the structure of Formula 7.3:

5. Crosslinked Polyols

Also described herein are crosslinked polyol molecules comprising:

a first polyol molecule;

a second polyol molecule; and a linked multifunctional crosslinker, wherein the linked multifunctional crosslinker comprises a strained cyclic olefin moiety, and wherein the linked multifunctional crosslinker is bound to the first polyol molecule though a first urethane functional group, and is bound to the second polyol molecule though a second urethane functional group.

In some embodiments, the crosslinked polyol molecules comprise any of the multifunctional crosslinkers discussed in Section 4 covalently bound to at least two polyol molecules through a urethane functional group.

In some embodiments, the crosslinked polyol comprises the structure of Formula 8:

wherein

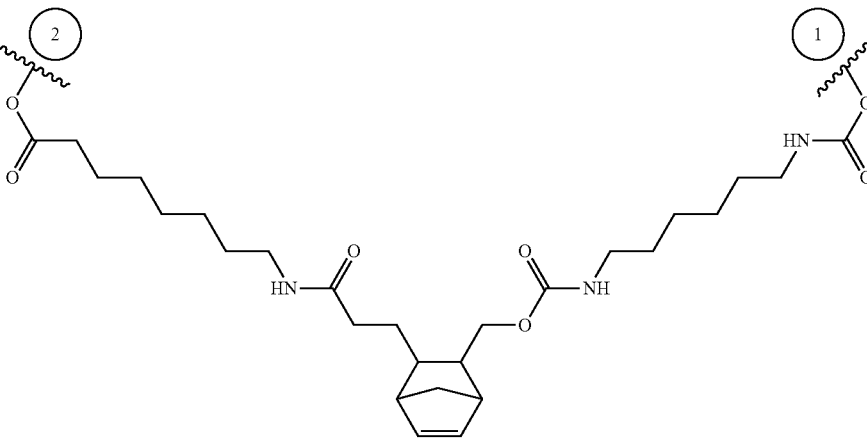

comprises the first polyol molecule, and comprises the second polyol molecule.

In some embodiments, the crosslinked polyol comprises the structure of Formula 9:

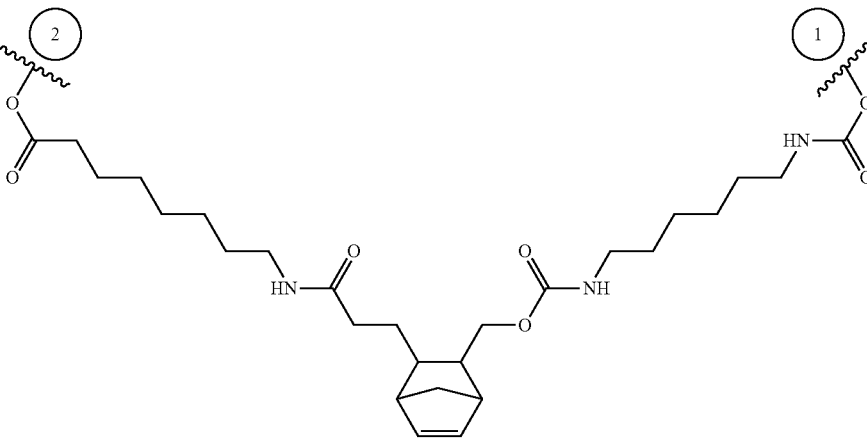

wherein comprises the first polyol molecule, and

comprises the second polyol molecule.

6. In-Mold Coated Manufacturing Methods and Articles

6.1 in-Mold Coated Manufacturing Methods

Also described herein is a method of manufacturing an in-mold coated article, the method comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one in-mold coating composition is an in-mold multifunctional composition, the in-mold multifunctional composition comprising:

a plurality of polyol molecules;

a polyol-polyol crosslinker functionality;

a polyol-cycloolefin crosslinker functionality; and a urethane formation catalyst; and wherein the in-mold multifunctional composition adheres to the cycloolefin polymer to form an in-mold coated article.

In some embodiments, the prepared mold surface is, for example, a preheated mold surface. In some embodiments, the prepared mold surface is, for example, a mold surface comprising a layer of precoating material, such as a mold release agent. In some embodiments, the prepared mold surface is, for example, a preheated mold surface comprising a layer of precoating material, such as a mold release agent.

In some preferred embodiments, the polyol-polyol crosslinker functionality and the polyol-cycloolefin crosslinker functionality reside in a multifunctional crosslinker according to any one of the multifunctional crosslinkers disclosed herein. In such embodiments, the in-mold multifunctional composition comprises:

a plurality of polyol molecules;

a multifunctional crosslinker; and a urethane formation catalyst.

In some embodiments, at least one layer of coating material is a paintable layer. In preferred embodiments, at least one interface forms between at least one in-mold multifunctional layer and at least one cycloolefin polymer layer. For example, in some embodiments, a prepared mold surface is contacted with an in-mold multifunctional composition, thereby providing a coated mold surface having one layer of coating material, after which the resulting coated mold surface having one layer of coating material is contacted with a polymerizable cyclic olefin material during the in-mold coating process under conditions to form a cycloolefin polymer, thereby forming at least one interface between at least one in-mold multifunctional layer and at least one cycloolefin polymer layer. In some embodiments, a prepared mold surface is contacted with a first in-mold coating composition, thereby providing a coated mold surface having one layer of coating material, and the resulting coated having one layer of coating material is subsequently contacted with a second in-mold coating composition, the second in-mold coating composition being a first in-mold multifunctional composition, thereby providing a coated mold surface having two layers (including one in-mold multifunctional layer), each layer differing from the other, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer. In some embodiments, a prepared mold surface comprising a layer of precoating material, such as a release agent, is, for example, contacted with an in-mold multifunctional composition, thereby providing a coated mold surface having two layers, namely one mold release layer and one in-mold multifunctional layer, each layer differing from the other, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer. In some embodiments, the release agent layer is removed from the article, such as by wiping with isopropyl alcohol or other solvents, after the article is removed from the mold. In some embodiments, two or more in-mold multifunctional layers may be present, and at least one in-mold multifunctional layer forms an interface with at least one cycloolefin polymer layer upon contacting the coated mold surface with a polymerizable cyclic olefin material during an in-mold coating process under conditions to form a cycloolefin polymer. For example, in some embodiments, a prepared mold surface is first contacted with a first in-mold multifunctional composition, thereby providing a coated mold surface having one in-mold multifunctional layer, and the resulting coated mold surface having one in-mold multifunctional layer is subsequently contacted with a second in-mold multifunctional composition, thereby providing a coated mold surface having two in-mold multifunctional layers, after which the resulting coated mold surface having two layers is contacted with a polymerizable cyclic olefin material during the in-mold coating process under conditions to form a cycloolefin polymer, thereby forming at least one interface between at least one in-mold multifunctional layer and at least one cycloolefin polymer layer.

In some embodiments, the in-mold coating compositions described herein may further comprise a UV absorber. Representative examples of UV absorbers include benzophenone UV absorbers, benzotriazole UV absorbers, and triazine UV absorbers. Representative examples of benzophenone UV absorbers include: Lowiolite 20 (CAS 131-57-7), CHISORB BP-12 (CAS No. 1843-05-6), and CHISORB BP-6 (CAS No. 131-54-4). Representative examples of benzotriazole UV absorbers include: Tinuvin 1130 (CAS 102577-46-8); Tinuvin 326 (CAS 3864-99-1); Tinuvin 384 (CAS 12759-17-9); Tinuvin 900 (CAS 70321-86-2); Tinuvin 928 (CAS 73936-91-1); and Tinuvin 328 (CAS 25973-55-1). Representative examples of triazine UV absorbers include: Tinuvin 400 (CAS 153519-44-9); Tinuvin 479 (CAS 204848-45-3); Appolo-1164 (CAS 2725-22-6); Appolo-1164L (CAS 137759-38-7); Appolo-1164 GL (CAS1820-28-6); and Appolo-1577 (CAS 147315-50-2).

In some embodiments, the in-mold coating composition comprising a UV absorber and/or a light stabilizer, when applied to a cycloolefin polymer using an in-mold coating process, provides an in-mold multifunctional layer that blocks at least 70% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 80% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 90% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 95% of UV light from reaching the cycloolefin polymer. In some embodiments, the in-mold coating composition comprising a UV absorber and/or a light stabilizer, when applied to a cycloolefin polymer using an in-mold coating process, provides an in-mold multifunctional layer that blocks at least 99% of UV light from reaching the cycloolefin polymer.

In some embodiments (a) at least one interface forms between at least one in-mold multifunctional layer and at least one cycloolefin polymer layer, and (b) the strained cyclic olefin moiety from a multifunctional crosslinker adheres to the cycloolefin polymer at or near the interface. (See FIGS. 1, 2, 3 and 4.) The strained cyclic olefin moiety from the multifunctional crosslinker may bind to the cycloolefin polymer through a non-covalent binding interaction or a covalent bond, such as a covalent bond resulting from a ring opening metathesis polymerization (ROMP) reaction. In some embodiments, the strained cyclic olefin moiety binds to a cycloolefin polymer through a non-covalent binding interaction. In some embodiments, the strained cyclic olefin moiety binds to a cycloolefin polymer through a covalent bond. In some embodiments, the covalent bond results from a ring opening metathesis polymerization (ROMP) reaction. In some embodiments, two or more in-mold multifunctional layers may be present, and at least one in-mold multifunctional layer forms an interface with at least one cycloolefin polymer layer upon contacting the coated mold surface with a polymerizable cyclic olefin material during an in-mold coating process under conditions to form a cycloolefin polymer.

In some embodiments, the polymerization reaction is a ring-opening metathesis polymerization. In some embodiments, the polymerization reaction is a vinyl-type addition polymerization.

In some embodiments, the cycloolefin polymer is a cyclic olefin polymer. In some embodiments, the cycloolefin polymer is a cyclic olefin copolymer. In some embodiments, the cycloolefin polymer described herein is a polymer prepared by polymerizing reactants using ring-opening metathesis polymerization or vinyl-type addition polymerization, wherein the reactants include molecules that comprise a strained cyclic olefin moiety. In some embodiments, the strained cyclic olefin moiety comprises a bridged bicyclic moiety. Examples of cycloolefin polymers include cyclic olefin polymer (COP) and cyclic olefin copolymer (COC). In some embodiments, the cycloolefin polymer described herein is a polymer prepared by polymerizing reactants using ring-opening metathesis polymerization, wherein the reactants include molecules that comprise a strained cyclic olefin moiety that comprises a bridged bicyclic moiety. In some embodiments, the cycloolefin polymer described herein is a polymer prepared by polymerizing reactants using ring-opening metathesis polymerization, wherein the reactants include molecules that comprise a strained cyclic olefin moiety that comprises a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the cycloolefin polymer described herein is a polymer prepared by polymerizing reactants using ring-opening metathesis polymerization, wherein the reactants include molecules that comprise a bicyclo[2.2.1]hept-2-ene moiety. In some embodiments, the cycloolefin polymer described herein is a polymer prepared by polymerizing reactants using ring-opening metathesis polymerization, wherein the reactants include molecules that comprise a 7-oxabicyclo[2.2.1]hept-2-ene moiety. In some embodiments, the cycloolefin polymer described herein is a polymer prepared by polymerizing reactants using ring-opening metathesis polymerization, wherein the reactants include molecules that comprise a 2-oxabicyclo[2.2.1]hept-5-ene moiety. In some embodiments, the cycloolefin polymer described herein is a polymer prepared by polymerizing reactants using vinyl-type addition polymerization, wherein the reactants include molecules that comprise a strained cyclic olefin moiety that comprises a bridged bicyclic moiety. In some embodiments, the cycloolefin polymer described herein is a polymer prepared by polymerizing reactants using vinyl-type addition polymerization, wherein the reactants include molecules that comprise a strained cyclic olefin moiety that comprises a bridged bicyclic moiety, the bridged bicyclic moiety comprising the backbone structure of Formula M1, wherein: (a) $B_1$ comprises —C— and $B_2$ comprises —C—; or (b) $B_1$ comprises —C— and $B_2$ comprises —O—; or (c) $B_1$ comprises —O— and $B_2$ comprises —C—. In some embodiments, the cycloolefin polymer described herein is a polymer prepared by polymerizing reactants using vinyl-type addition polymerization, wherein the reactants include molecules that comprise a bicyclo[2.2.1]hept-2-ene moiety. In some embodiments, the cycloolefin polymers described herein is a polymer prepared by polymerizing reactants using vinyl-type addition polymerization, wherein the reactants include molecules that comprise a 7-oxabicyclo[2.2.1]hept-2-ene moiety. In some embodiments, the cycloolefin polymer described herein is a polymer prepared by polymerizing reactants using vinyl-type addition polymerization, wherein the reactants include molecules that comprise a 2-oxabicyclo[2.2.1]hept-5-ene moiety. In some embodiments, the cycloolefin polymer described herein is a cyclic olefin polymer or cyclic olefin copolymer prepared by polymerizing reactants using ring-opening metathesis polymerization, wherein the reactants include one or more of cyclobutene, cyclopentene, cycloheptene, cyclooctene, cyclooctadiene, cyclooctatetraene, hydroxydicyclopentadiene, dicyclopentadiene, and norbornene. In some embodiments, the cycloolefin polymer described herein is a cyclic olefin polymer or cyclic olefin copolymer formed by polymerizing a solution comprising dicyclopentadiene monomers in the presence of a ROMP catalyst. In some embodiments, cycloolefin polymer described herein is a cyclic olefin polymer or cyclic olefin copolymer that comprises polydicyclopentadiene (PDCPD). In some embodiments, the cyclic olefin copolymer described herein comprises polydicyclopentadiene (PDCPD). In some embodiments, the cyclic olefin polymer described herein comprises polydicyclopentadiene (PDCPD). In some embodiments, the cycloolefin polymer described herein is a polymer prepared by polymerizing reactants using ring-opening metathesis polymerization or vinyl-type addition polymerization, wherein the reactants include molecules that comprise one or more of a mono-unsaturated cyclic olefin moiety, a monocyclic diene moiety, a bicyclic olefin moiety, and a polycyclic olefin moiety. In some embodiments, the reactants include molecules that comprise a norbornene moiety. In some embodiments, the norbornene moiety is derived from 5-norbornene-2-methanol (NB-MeOH), 2-hydroxyethyl bicycle[2.2.1]hept-2-ene-carboxylate (HENB), 2-cycloocten-1-ol, or 2-cyclooctadiene-1-ol. In some embodiments, the norbornene moiety is derived from 5-norbornene-2-methanol (NB-MeOH).

In some embodiments, the cycloolefin polymer comprises at least 60% cyclic olefin by weight. In some embodiments, the cycloolefin polymer comprises at least 70% cyclic olefin by weight. In some embodiments, the cycloolefin polymer comprises at least 80% cyclic olefin by weight. In some embodiments, the cycloolefin polymer comprises at least 90% cyclic olefin by weight. In some embodiments, the cycloolefin polymer comprises at least 95% cyclic olefin by weight. In some embodiments, the cycloolefin polymer comprises at least 97% cyclic olefin by weight. In some embodiments, the cycloolefin polymer comprises at least 99% cyclic olefin by weight. In some embodiments, the cycloolefin polymer described herein comprises polydicyclopentadiene (PDCPD). In some embodiments, the cycloolefin polymer comprises at least 60% polydicyclopentadiene by weight. In some embodiments, the cycloolefin polymer comprises at least 70% polydicyclopentadiene by weight. In some embodiments, the cycloolefin polymer comprises at least 80% polydicyclopentadiene by weight. In some embodiments, the cycloolefin polymer comprises at least 90% polydicyclopentadiene by weight. In some embodiments, the cycloolefin polymer comprises at least 95% polydicyclopentadiene by weight. In some embodiments, the cycloolefin polymer comprises at least 97% polydicyclopentadiene by weight. In some embodiments, the cycloolefin polymer comprises at least 99% polydicyclopentadiene by weight.

For the method of manufacture described herein, contacting the prepared mold surface with an in-mold coating composition may comprise heating and/or solvent evaporation. In some embodiments, contacting the prepared mold surface with an in-mold coating composition comprises heating. In some embodiments, contacting the prepared mold surface with an in-mold coating composition comprises solvent evaporation. In some embodiments, contacting the prepared mold surface with an in-mold coating composition comprises heating and solvent evaporation.

In general, to increase rates of production and reduce manufacturing costs, shorter layer-specific flash times are preferred. In some embodiments, each layer-specific flash time is 120 minutes or less. In some embodiments, each layer-specific flash time is 60 minutes or less. In some embodiments, each layer-specific flash time is 30 minutes or less. In some embodiments, each layer-specific flash time is 20 minutes or less. In some embodiments, each layer-specific flash time is 15 minutes or less. In some embodiments, each layer-specific flash time is 5 minutes or less. In some embodiments, each layer-specific flash time is 2 minutes or less. In some embodiments, each layer-specific flash time is 1 minute or less. In some embodiments, each layer-specific flash time is 30 seconds or less. In some embodiments, each layer-specific flash time is between 1 second and 120 minutes. In some embodiments, each layer-specific flash time is between 1 second and 60 minutes. In some embodiments, each layer-specific flash time is between 1 second and 30 minutes. In some embodiments, each layer-specific flash time is between 1 second and 20 minutes. In some embodiments, each layer-specific flash time is between 1 second and 15 minutes. In some embodiments, each layer-specific flash time is between 1 second and 5 minutes. In some embodiments, each layer-specific flash time is between 1 second and 2 minutes. In some embodiments, each layer-specific flash time is between 5 seconds and 120 minutes. In some embodiments, each layer-specific flash time is between 5 seconds and 60 minutes. In some embodiments, each layer-specific flash time is between 5 seconds and 30 minutes. In some embodiments, each layer-specific flash time is between 5 seconds and 20 minutes. In some embodiments, each layer-specific flash time is between 5 seconds and 15 minutes. In some embodiments, each layer-specific flash time is between 5 seconds and 10 minutes. In some embodiments, each layer-specific flash time is between 5 seconds and 5 minutes. In some embodiments, each layer-specific flash time is between 5 seconds and 2 minutes. In some embodiments, each layer-specific flash time is between 10 seconds and 60 minutes. In some embodiments, each layer-specific flash time is between 10 seconds and 30 minutes. In some embodiments, each layer-specific flash time is between 20 seconds and 120 minutes. In some embodiments, each layer-specific flash time is between 20 seconds and 60 minutes. In some embodiments, each layer-specific flash time is between 20 seconds and 30 minutes. In some embodiments, each layer-specific flash time is between 20 seconds and 20 minutes. In some embodiments, each layer-specific flash time is between 20 seconds and 15 minutes. In some embodiments, each layer-specific flash time is between 20 seconds and 10 minutes. In some embodiments, each layer-specific flash time is between 20 seconds and 5 minutes. In some embodiments, each layer-specific flash time is between 20 seconds and 2 minutes. In some embodiments, each layer-specific flash time is between 30 seconds and 120 minutes. In some embodiments, each layer-specific flash time is between 30 seconds and 60 minutes. In some embodiments, each layer-specific flash time is between 30 seconds and 30 minutes. In some embodiments, each layer-specific flash time is between 30 seconds and 20 minutes. In some embodiments, each layer-specific flash time is between 30 seconds and 15 minutes. In some embodiments, each layer-specific flash time is between 30 seconds and 10 minutes. In some embodiments, each layer-specific flash time is between 30 seconds and 5 minutes. In some embodiments, each layer-specific flash time is between 30 seconds and 2 minutes. In some embodiments, each layer-specific flash time is between 1 minute and 5 minutes. In some embodiments, each layer-specific flash time is between about 9 minutes and about 10 minutes. In some embodiments, each layer-specific flash time is between about 8 minutes and about 9 minutes. In some embodiments, each layer-specific flash time is between about 7 minutes and about 8 minutes. In some embodiments, each layer-specific flash time is between about 6 minutes and about 7 minutes. In some embodiments, each layer-specific flash time is between about 5 minutes and about 6 minutes. In some embodiments, each layer-specific flash time is between about 4 minutes and about 5 minutes. In some embodiments, each layer-specific flash time is between about 3 minutes and about 4 minutes. In some embodiments, each layer-specific flash time is between about 2 minutes and about 3 minutes. In some embodiments, each layer-specific flash time is between about 1 minutes and about 2 minutes. In some embodiments, each layer-specific flash time is between about 30 seconds minutes and about 1 minute.

In general, to increase rates of production and reduce manufacturing costs, shorter total flash times are preferred. In some embodiments, the total flash time is 120 minutes or less. In some embodiments, the total flash time is 60 minutes or less. In some embodiments, the total flash time is 30 minutes or less. In some embodiments, the total flash time is 20 minutes or less. In some embodiments, the total flash time is 15 minutes or less. In some embodiments, the total flash time is 5 minutes or less. In some embodiments, the total flash time is 2 minutes or less. In some embodiments, the total flash time is 1 minute or less. In some embodiments, the total flash time is 30 seconds or less. In some embodiments, the total flash time is between 1 second and 120 minutes. In some embodiments, the total flash time is between 1 second and 60 minutes. In some embodiments, the total flash time is between 1 second and 30 minutes. In some embodiments, the total flash time is between 1 second and 20 minutes. In some embodiments, the total flash time is between 1 second and 15 minutes. In some embodiments, the total flash time is between 1 second and 5 minutes. In some embodiments, the total flash time is between 1 second and 2 minutes. In some embodiments, the total flash time is between 5 seconds and 120 minutes. In some embodiments, the total flash time is between 5 seconds and 60 minutes. In some embodiments, the total flash time is between 5 seconds and 30 minutes. In some embodiments, the total flash time is between 5 seconds and 20 minutes. In some embodiments, the total flash time is between 5 seconds and 15 minutes. In some embodiments, the total flash time is between 5 seconds and 10 minutes. In some embodiments, the total flash time is between 5 seconds and 5 minutes. In some embodiments, the total flash time is between 5 seconds and 2 minutes. In some embodiments, the total flash time is between 10 seconds and 60 minutes. In some embodiments, the total flash time is between 10 seconds and 30 minutes. In some embodiments, the total flash time is between 20 seconds and 120 minutes. In some embodiments, the total flash time is between 20 seconds and 60 minutes. In some embodiments, the total flash time is between 20 seconds and 30 minutes. In some embodiments, the total flash time is between 20 seconds and 20 minutes. In some embodiments, the total flash time is between 20 seconds and 15 minutes. In some embodiments, the total flash time is between 20 seconds and 10 minutes. In some embodiments, the total flash time is between 20 seconds and 5 minutes. In some embodiments, the total flash time is between 20 seconds and 2 minutes. In some embodiments, the total flash time is between 30 seconds and 120 minutes. In some embodiments, the total flash time is between 30 seconds and 60 minutes. In some embodiments, the total flash time is between 30 seconds and 30 minutes. In some embodiments, the total flash time is between 30 seconds and 20 minutes. In some embodiments, the total flash time is between 30 seconds and 15 minutes. In some embodiments, the total flash time is between 30 seconds and 10 minutes. In some embodiments, the total flash time is between 30 seconds and 5 minutes. In some embodiments, the total flash time is between 30 seconds and 2 minutes. In some embodiments, the total flash time is between 1 minute and 5 minutes. In some embodiments, the total flash time is between about 9 minutes and about 10 minutes. In some embodiments, the total flash time is between about 8 minutes and about 9 minutes. In some embodiments, the total flash time is between about 7 minutes and about 8 minutes. In some embodiments, the total flash time is between about 6 minutes and about 7 minutes. In some embodiments, the total flash time is between about 5 minutes and about 6 minutes. In some embodiments, the total flash time is between about 4 minutes and about 5 minutes. In some embodiments, the total flash time is between about 3 minutes and about 4 minutes. In some embodiments, the total flash time is between about 2 minutes and about 3 minutes. In some embodiments, the total flash time is between about 1 minutes and about 2 minutes. In some embodiments, the total flash time is between about 30 seconds minutes and about 1 minute.

In some embodiments of the method of manufacture described herein, the plurality of polyol molecules comprises acrylic polyol molecules or polyester polyol molecules. In some embodiments, the plurality of polyol molecules comprises acrylic polyol molecules. In some embodiments, the plurality of polyol molecules comprises polyester polyol molecules. In some embodiments, the plurality of polyol molecules further comprises a conductive pigment.

The urethane formation catalyst used for the method of manufacture described herein may comprise a tin-based catalyst, a bismuth-based catalyst, a zinc-based catalyst, or a titanium-based catalyst. In some embodiments, the urethane formation catalyst may also be an organotin catalyst, an organobismuth catalyst, or a titanate catalyst. For instance, the tin-based catalyst may be an organotin catalyst, the bismuth-based catalyst may be an organobismuth catalyst, and the titanium-based catalyst may be a titanate catalyst.

In some embodiments, the urethane formation catalyst is a tin-based catalyst. Illustrative examples of tin-based catalysts include, but are not limited to, dibutyltin dilaureate, dioctyl tin dilaurate, dibutyltin mercaptide, dioctyl tin mercaptide, dimethyl tin dilaurate, or dimethyl tin mercaptide. In some embodiments, the tin-based catalyst is dibutyltin dilaureate, dioctyl tin dilaurate, dibutyltin mercaptide, dioctyl tin mercaptide, dimethyl tin dilaurate, or dimethyl tin mercaptide.

In some embodiments of the method of manufacture described herein, contacting the coated mold surface with a cycloolefin resin comprises heating and/or solvent evaporation. In some embodiments, contacting the coated mold surface with the cycloolefin resin comprises heating. In some embodiments, contacting the coated mold surface with the cycloolefin resin comprises solvent evaporation. In some embodiments, contacting the coated mold surface with the cycloolefin resin comprises heating and solvent evaporation.

6.2 in-Mold Coated Articles

Also provided in one aspect is an in-mold coated article, the article manufactured using any method of manufacture disclosed in Section 6.1 of this disclosure. In one embodiment, the in-mold coated article is an in-mold coated article manufactured using a method of manufacture comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one in-mold coating composition is an in-mold multifunctional composition, the in-mold multifunctional composition comprising:

a plurality of polyol molecules;

a polyol-polyol crosslinker functionality;

a polyol-cycloolefin crosslinker functionality; and a urethane formation catalyst; and wherein the in-mold multifunctional composition adheres to the cycloolefin polymer to form an in-mold coated article.

In some embodiments, the in-mold coated article comprises a cycloolefin polymer having in-mold coating layer adhered to a surface thereof. In some embodiments, the in-mold coating layer is an in-mold coating layer having a pencil hardness of 2H or harder. In some embodiments, the in-mold coating layer is an in-mold coating layer capable of passing one or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing two or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing three or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing four or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing five or more of the following industry recognized tests: (a) Tape Adhesion (6×6, 2 mm); (b) Distilled Water Immersion× 96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing six or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing). In some embodiments, the in-mold coating layer is an in-mold coating layer capable of passing each of the following industry recognized tests: (a) Tape Adhesion (6×6, 2 mm); (b) Distilled Water Immersion x 96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing).

In some embodiments, the in-mold coated article comprises a cycloolefin polymer having in-mold paintable layer adhered thereto, which in-mold paintable layer may be painted or coated post-mold. For example, a weatherable coating system (such as Red Spot 206LE as a basecoat, followed by Red Spot 379S as a clear topcoat) may be applied post-mold to an in-mold paintable layer. In some embodiments, the in-mold paintable layer is a layer capable of adhering a weatherable coating system (such as Red Spot 206LE as a basecoat, followed by Red Spot 379S as a clear topcoat) with sufficient adherence to pass one or more of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01). In some embodiments, the in-mold paintable layer is a layer capable of adhering a weatherable coating system (such as Red Spot 206LE as a basecoat, followed by Red Spot 379S as a clear topcoat) with sufficient adherence to pass two or more of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01). In some embodiments, the in-mold paintable layer is a layer capable of adhering a weatherable coating system (such as Red Spot 206LE as a basecoat, followed by Red Spot 379S as a clear topcoat) with sufficient adherence to pass each of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01).

Other contemplated embodiments of in-mold coated articles are apparent in view of the disclosure in general, and especially in view of the methods disclosed in Section 6.1 of the disclosure.

EXAMPLES

Preliminary Investigations

Over many years, Red Spot has accumulated extensive experience applying coatings to a variety of articles using in-mold coating processes. (See, for example, U.S. Pat. Nos. 9,169,345; 9,539,745; 10,144,157; and 10,604,674.) Leveraging our experience in the field of in-mold coatings, we attempted to apply polyurethane coatings to cycloolefin polymer articles comprising polydicyclopentadiene (PDCPD) using an in-mold coating process in conjunction with commercially available coating compositions. Despite providing long layer-specific flash times on the heated mold (e.g., 30 minutes or more) prior to injecting the formulated DCPD monomer during the in-mold process, none of our attempts yielded acceptable adherence when attempting to apply commercially available polyurethane multi-component systems that employ commercially available isocyanates for crosslinking the polyol resins. Because long flash times are unacceptable in many manufacturing scenarios, layer-specific flash times longer than 30 minutes were not investigated. In view of our preliminary investigations, we determined that there is a need for crosslinkers, resins, compositions, methods, and systems suitable for applying in-mold coatings to articles that comprise a cycloolefin polymer, such as PDCPD.

The following Examples disclose, inter alia, crosslinkers, resins, compositions, methods, and systems for applying in-mold coating compositions to articles comprising a cycloolefin polymer. The Examples provided herein are merely illustrative and are not intended to limit the scope or content of the disclosure in any way.

Example 1: In-Mold Coatings Applied to a Cycloolefin Polymer Article Using System 1

1.1 Preparation of the Multifunctional Crosslinker of System 1

Multifunctional crosslinkers were produced by reacting Tolonate HDT 90 (comprising 1,3,5-tris(6-isocyanato-hexyl)-1,3,5-triazinane-2,4,6-trione and oligomers thereof) with the strained cyclic olefin of Formula S1.1 (hydroxymethyl norbornene) under a nitrogen blanket at 80° C. for two hours before being diluted with xylene and methyl propyl ketone. Analysis of the reaction product revealed that about 30% of the NCO content from the precursor was converted to norbornene terminated sites, indicating that multifunctional crosslinkers (including, for example, the multifunctional crosslinker of Formula 1.3) to be among the predominant reaction products.

1.2 Components and Compositions of System 1

Using the multifunctional crosslinkers disclosed in Example 1.1 above, an in-mold coating composition was obtained by reacting the multifunctional crosslinker with commercially available polyols. For this Example, Parts A and B comprised:

TABLE 1A

| Components of Part A for System 1 | | |
| --- | --- | --- |
| Component | Amount | Comment |
| poly(alphaolefin) polyol | 5.7 parts | Reactant; tradename Vybar H-6175 |
| Acrylic polyol solution | 14.4 parts | Reactant; tradename Joncryl 581 |
| B0071238 | 15.2 parts | Solvent Blend |
| Urethane catalyst | 0.03 parts | Speed up polyol-isocyanate reaction |
| Conductive carbon black pigment | 4.7 parts | Black tint |
| B0071238 | 40 parts | Added as a thinner |

TABLE 1B

| Components of Part B for System 1 | | |
|---|---|---|
| Component | Amount | Comment |
| Tolonate HDT 90 | 12.17 parts | These components are precursors that |
| Hydroxymethyl | 2.16 parts | had been prereacted to form the |
| norbornene | | multifunctional crosslinker used in this |
| | | Example. |
| Urethane Catalyst | 0.001 parts | Speed up polyol-isocyanate reaction |
| Xylene | 4.40 parts | Solvent |
| Methyl Propyl | 3.12 parts | Solvent |
| Ketone | | |

In this Example, Part A included a conductive additive to form a final coating layer that was conductive, which allows a charge to be applied during the top coating step so greater transfer efficiency is achieved during painting. The process of using a conductive paint layer prior to painting a subsequent layer is called electrostatic spray.

To prepare the in-mold coating composition of System 1, Part A and Part B were mixed in an 8-ounce cup and agitated to uniform homogeneity. Upon mixing, the reactive NCO groups of the multifunctional crosslinker (a component of Part B) began to react with the hydroxyl reactive sites of the polyols (a component of Part A). The rate of this reaction may be accelerated with heat and also with catalysts, such as metal or tertiary amine catalysts, and curing may be accelerated upon evaporation of the solvent carrier. The resulting in-mold coating composition is a solvent borne urethane coating composition intended for spray application onto a prepared mold surface, the prepared mold surface being a heated mold surface and lightly coated with a mold release agent.

1.3 Application of System 1 to a Cycloolefin Polymer Article

In this process an open and heated mold was sprayed with the in-mold coating composition of System 1. This mold was a flat surface that was designed for making flat square plaques comprising PDCPD.

In preparation for applying the in-mold coating composition of System 1, the cavity side of the mold surface was first preheated and then lightly coated with a mold release agent (Chemtrend 17132 MR) to form a prepared mold surface. Preheating comprised raising the temperature of the cavity side of the mold surface to a temperature about 10 to 30° C. higher than the core of the mold, and the core was held at a temperature between 35-100° C. with 50-70° C. as preferred range. Coating with the mold release agent comprised spraying a few even passes of the mold release agent onto the cavity side of the mold using a paint spray gun to provide a prepared mold surface comprising a mold release agent.

Prior to use, Part A and Part B were mixed in an 8-ounce cup and agitated to uniform homogeneity to form the in-mold coating composition of System 1, as described in Example 1.2. A hole was cut in the lid of the 8-ounce cup containing the in-mold coating composition, and a siphon tube was attached to a conventional paint spray gun. Using multiple, uniform passes with the spray gun, the in-mold coating composition of System 1 was sprayed onto the cavity side of the prepared mold surface (the surface that had been lightly coated with a mold release agent). Sufficient in-mold coating composition of System 1 was applied to form a layer of coating material as a film having a thickness of about 15 to about 40 microns. A layer-specific flash time of less than 5 minutes was provided for the layer comprising System 1. Solvent evaporation occurred almost immediately due to the heat of the mold.

After the in-mold coating composition of System 1 had been applied to the prepared mold surface, the mold was closed and clamped shut, after which formulated DCPD monomer and appropriate catalyst were injected into the mold cavity. The DCPD monomer polymerized within a few minutes after injection, and the part was de-molded with the coating adhered to the cycloolefin polymer to form an in-mold coated article. Success of this process is determined by appearance, adhesion, and performance to any relevant test specifications.

1.4 Evaluation of System 1 Applied in-Mold to a Cycloolefin Polymer Article

The in-mold coated cycloolefin article prepared according to the in-mold process disclosed in Example 1.3 above was visually inspected. System 1 yielded robust adhesion and desirable appearance (smooth glossy surface) across the entire in-mold coated cycloolefin polymer article. Furthermore, we detected no evidence that the DCPD polymerization reaction had been hindered, which is a surprising result, considering that DCPD polymerization reactions are known to be susceptible to hindrance by the presence of contaminants. Performance of System 1 was also evaluated according to various relevant test specifications. The results included the following:

TABLE 1C

| Evaluation of System 1 | | |
|---|---|---|
| Test | Result | Comment |
| Pencil Hardness | 2H | Pass |
| Tape Adhesion | Pass - | |
| (6 × 6, 2 mm) | Grade A | |
| Distilled Water Immersion × 96 hours @ 25° C. (Tested in accordance with JDQ 138A) | Pass | Adhesion Classification A (no loss) |
| Engine Oil Spot Test × 24 hours (Tested in accordance with JDQ 142D) | Pass | Passed visual assessment, gloss retention, and post-test pencil hardness |
| Diesel Fuel Spot Test (Tested in accordance with JDQ 142F) | Pass | Passed visual assessment, gloss retention, and post-test pencil hardness |
| Unleaded Fuel Spot Test (Tested in accordance with JDQ 142G) | Pass | Passed visual assessment, gloss retention, and post-test pencil hardness |
| Humidity (38° C., 100% RH) × 144 hours | Pass | Visual |
| Post Humidity Adhesion (6 × 6,1 mm spacing) | Pass | Rating 0 |

1.5 Weatherable Coating System Applied Post-Mold to an in-Mold Coated Article

Although application of System 1 alone resulted in robust adhesion and desirable appearance across the entire article when applied as an in-mold coating (see Example 1.4), post-mold application of a coating system having proven weatherability characteristics to the in-mold coated article is desirable in some industrial scenarios. To these ends, System 1 was applied to another cycloolefin polymer article using the in-mold process described for Example 1.3. After the in-mold coated cycloolefin polymer article had been removed from the mold, and the applied coating comprising System 1 had been allowed to cure, a weatherable coating system (Red Spot 206LE as a basecoat, followed by Red Spot 379S as a clear topcoat) was applied post-mold to the in-mold coated article. Adhesion of the post-mold applied weatherable coating system was evaluated according to various relevant test specifications. The results included the following:

TABLE ID

Adhesion of the Weatherable Coating System to the In-Mold Coated Article

| Test | Result | Comment |
|------|--------|---------|
| Thermal Shock Adhesion (Tested in accordance with FLTM BI 107-05) | Pass | Rating 20 |
| Humidity (85° C., 90% RH) × 96 hours (Tested in accordance with FLTM BI 106-01) | Pass | Visual Assessment |
| Post Humidity Adhesion (lightly sanded) (Tested in accordance with FLTM BI 106-01) | Pass | Rating 0 |

EQUIVALENTS

The disclosure may be embodied in other specific forms without departing from the spirit or essential characteristics thereof. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. The foregoing embodiments are therefore to be considered in all respects illustrative rather than limiting on the disclosure described herein. The scope of the disclosure is thus indicated by the appended claims rather than by the foregoing description, and all changes that come within the meaning and range of equivalency of the claims are intended to be embraced therein.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where compositions are described in the disclosure as having, including, or comprising specific components, it should be understood that, in addition to contemplating open-ended and non-limiting compositions that don't exclude additional unrecited elements, compositions of the present disclosure that "consist essentially of" or "consist of" the recited components are also contemplated. Similarly, although the use of the term "include," "includes," "including," "have," "has," "having," "contain," "contains," or "containing," including grammatical equivalents thereof, should be understood generally as open-ended and non-limiting, where methods are described in the disclosure as having, including, or comprising specific steps, it should be understood that, in addition to contemplating open-ended and non-limiting methods that don't exclude additional unrecited steps, methods of the present disclosure that "consist essentially of" or "consist of" the recited steps are also contemplated.

In the application, where an element or component is said to be selected from a list of recited elements or components, it should be understood that the element or component can be any one of the recited elements or components, or the element or component can be selected from a group consisting of two or more of the recited elements or components.

Further, it should be understood that elements or features of a composition described herein, or elements or features of a method described herein, can be combined in a variety of ways without departing from the spirit and scope of the present disclosure, whether explicit or implicit herein. For example, where reference is made to a particular compound, that compound can be used in various embodiments of compositions of the present disclosure and in methods of the present disclosure, unless otherwise understood from the context. In other words, within this application, embodiments have been described and depicted in a way that enables a clear and concise application to be written and drawn, but it is intended and will be appreciated that embodiments may be variously combined or separated without parting from the present teachings and disclosure. For example, it will be appreciated that all features described and depicted herein can be applicable to all aspects of the disclosure described and depicted herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to" and "at least" include the number recited and refer to ranges which can be subsequently broken down into subranges as discussed above. As will be understood by one skilled in the art, a range includes each individual member. It should be understood that the expression "at least one of" includes individually each of the recited objects after the expression and the various combinations of two or more of the recited objects unless otherwise understood from the context and use.

In addition, where features or aspects of the disclosure are described in terms of Markush groups, those skilled in the art will recognize that the disclosure is also thereby described in terms of any individual member or subgroup of members of the Markush group.

Where the use of the term "about" is before a quantitative value, the present disclosure also includes the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present disclosure remains operable. Moreover, two or more steps or actions may be conducted simultaneously.

The use of any and all examples, or exemplary language herein, for example, "such as" is intended merely to illustrate better the present disclosure and does not pose a limitation on the scope of the disclosure unless claimed. No language in the specification should be construed as indicating any non-claimed element as essential to the practice of the present disclosure.

Other embodiments are set forth in the following illustrative embodiments and claims.

INCORPORATION BY REFERENCE

All publications, patent applications, issued patents, and other documents referred to in this specification are herein incorporated by reference as if each individual publication, patent application, issued patent, or other document was specifically and individually indicated to be incorporated by reference in its entirety. In the event that a definition that is recited in text incorporated by reference contradicts, or is otherwise inconsistent with, a definition set forth in the instant specification, the definition set forth in the instant specification prevails.

ILLUSTRATIVE EMBODIMENTS

Contemplated embodiments include, but are not limited to, the following illustrative embodiments:

Illustrative Multifunctional Crosslinker (MC) Embodiments

MC1. A multifunctional crosslinker, the multifunctional crosslinker comprising:
  a first isocyanate substructure comprising a first isocyanate functional group;
  a second isocyanate substructure comprising a second isocyanate functional group, and
  a cyclic olefin substructure comprising a strained cyclic olefin moiety.

MC2. The multifunctional crosslinker of embodiment MC1, the multifunctional crosslinker for use in an in-mold coating process.

MC3. The multifunctional crosslinker for use in an in-mold coating process of embodiment MC2, the in-mold coating process comprising:
  providing a mold having a prepared mold surface;
  contacting the prepared mold surface with one or more in-mold coating compositions, thereby providing a coated mold surface having one or more layers of coating material; and
  contacting the coated mold surface with a polymerizable cyclic olefin material to form a cycloolefin polymer layer through a polymerization reaction,
  wherein at least one of the one or more in-mold coating compositions is an in-mold multifunctional composition, the in-mold multifunctional composition comprising:
  a plurality of polyol molecules;
  a urethane formation catalyst; and
  the multifunctional crosslinker.

MC4. The multifunctional crosslinker for use in an in-mold coating process of embodiment MC3, wherein the in-mold multifunctional composition adheres to the cycloolefin polymer layer to form an in-mold coated article.

MC5. The multifunctional crosslinker of any one of embodiments MC1-MC4, wherein the first isocyanate substructure comprises: —$(C_0$-$C_{10}$ alkyl)-N=C=O.

MC6. The multifunctional crosslinker of any one of embodiments MC1-MC5, wherein the first isocyanate substructure comprises: -$L^1$-$(C_0$-$C_{10}$ alkyl)-N=C=O, and wherein $L^1$ comprises $C_3$-$C_{10}$ cycloalkyl, $C_6$-$C_{10}$ aryl, or $C_3$-$C_{10}$ heteroaryl.

MC7. The multifunctional crosslinker of embodiment MC6, wherein $L^1$ comprises at least one $C_3$-$C_{10}$ cycloalkyl or at least one $C_3$-$C_{10}$ heteroaryl.

MC8. The multifunctional crosslinker of any one of embodiments MC1-MC7, wherein the second isocyanate substructure comprises: —$(C_0$-$C_{10}$ alkyl)-N=C=O.

MC9. The multifunctional crosslinker of any one of embodiments MC1-MC8, wherein the second isocyanate substructure comprises:

-$L^2$-$(C_0$-$C_{10}$ alkyl)-N=C=O, and wherein $L^2$ comprises $C_3$-$C_{10}$ cycloalkyl, $C_6$-$C_{10}$ aryl, or $C_3$-$C_{10}$ heteroaryl.

MC10. The multifunctional crosslinker of embodiment MC9, wherein $L^2$ comprises at least one $C_3$-$C_{10}$ cycloalkyl or at least one $C_3$-$C_{10}$ heteroaryl.

MC11. The multifunctional crosslinker of any one of embodiments MC1-MC10, wherein the cyclic olefin substructure comprises:

—$(C_0$-$C_{10}$ alkyl)-NH—C(=O)O—Y—X, wherein X is the strained cyclic olefin moiety, and wherein Y is $C_0$-$C_{10}$ alkyl.

MC12. The multifunctional crosslinker of embodiment MC11, wherein the cyclic olefin substructure comprises:

-$L^3$-$(C_0$-$C_{10}$ alkyl)-NH—C(=O)O—Y—X, wherein $L^3$ comprises $C_3$-$C_{10}$ cycloalkyl, $C_6$-$C_{10}$ aryl, or $C_3$-$C_{10}$ heteroaryl,
  wherein X is the strained cyclic olefin moiety, and wherein Y is $C_0$-$C_{10}$ alkyl.

MC13. The multifunctional crosslinker of embodiment MC12, wherein $L^3$ comprises at least one $C_3$-$C_{10}$ cycloalkyl or at least one $C_3$-$C_{10}$ heteroaryl.

MC14. The multifunctional crosslinker of any one of embodiments MC1-MC13, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety.

MC15. The multifunctional crosslinker of any one of embodiments MC1-MC14, wherein the strained cyclic olefin moiety comprises a norbornene moiety.

MC16. The multifunctional crosslinker of any one of embodiments MC1-MC15, wherein the strained cyclic olefin moiety is derived from:
  4-{bicyclo[2.2.1]hept-5-en-2-yl}butan-1-ol;
  3-{bicyclo[2.2.1]hept-5-en-2-yl}propan-1-ol;
  2-{bicyclo[2.2.1]hept-5-en-2-yl}ethan-1-ol;
  {bicyclo[2.2.1]hept-5-en-2-yl}methanol;
  bicyclo[2.2.1]hept-5-en-2-ol;
  [3-(hydroxymethyl)bicyclo[2.2.1]hept-5-en-2-yl]methanol,
  bicyclo[2.2.1]hept-5-ene-2,3-diol;
  tricyclo[5.2.1.0$^{2,6}$]dec-8-en-3-ol;
  tricyclo[5.2.1.0$^{2,6}$]dec-8-ene-3,4-diol;
  tricyclo[5.2.1.0$^{2,6}$]dec-8-ene-3,5-diol; or
  tricyclo[5.2.1.0$^{2,6}$]dec-8-ene-3,4,5-triol.

MC17. The multifunctional crosslinker of any one of embodiments MC1-MC16, wherein the strained cyclic olefin moiety is derived from:
  5-(2-isocyanatoethyl)bicyclo[2.2.1]hept-2-ene;
  5-(isocyanatomethyl)bicyclo[2.2.1]hept-2-ene;
  5-isocyanatobicyclo[2.2.1]hept-2-ene; or
  5,6-diisocyanatobicyclo[2.2.1]hept-2-ene.

MC18. The multifunctional crosslinker of any one of embodiments MC1-MC17, wherein the multifunctional crosslinker comprises a structure selected from the group consisting of:

Formula 1

-continued

Formula 2

Formula 3

Formula 4

Formula 5 wherein:
R₁ comprises the first isocyanate functional group,
$R_1$ comprises the first isocyanate functional group,
$R_2$ comprises the second isocyanate functional group, and
$R_3$ comprises the strained cyclic olefin moiety;
or
$R_1$ comprises the first isocyanate functional group,
$R_2$ comprises the strained cyclic olefin moiety, and
$R_3$ comprises the second isocyanate functional group;
or
$R_1$ comprises the strained cyclic olefin moiety,
$R_2$ comprises the first isocyanate functional group, and
$R_3$ comprises the second isocyanate functional group,
or
$R_1$ comprises the second isocyanate functional group,
$R_2$ comprises the first isocyanate functional group, and
$R_3$ comprises the strained cyclic olefin moiety;
or
$R_1$ comprises the second isocyanate functional group,
$R_2$ comprises the strained cyclic olefin moiety, and
$R_3$ comprises the first isocyanate functional group;
or
$R_1$ comprises the strained cyclic olefin moiety,
$R_2$ comprises the second isocyanate functional group, and
$R_3$ comprises the first isocyanate functional group.

MC19. The multifunctional crosslinker of embodiment MC18, wherein the multifunctional crosslinker comprises the structure of Formula 1, wherein:
$R_1$ comprises the first isocyanate functional group,
$R_2$ comprises the second isocyanate functional group, and
$R_3$ comprises the strained cyclic olefin moiety.

MC20. The multifunctional crosslinker of embodiment MC19, wherein the multifunctional crosslinker comprises the structure of Formula 1.1.

MC21. The multifunctional crosslinker of embodiment MC19, wherein the multifunctional crosslinker comprises the structure of Formula 1.2.

MC22. The multifunctional crosslinker of embodiment MC19, wherein the multifunctional crosslinker comprises the structure of Formula 1.3.

MC23. The multifunctional crosslinker of embodiment M19, wherein the multifunctional crosslinker comprises the structure of Formula 1.4.

MC24. The multifunctional crosslinker of embodiment MC19, wherein the multifunctional crosslinker comprises the structure of Formula 1.5.

MC25. The multifunctional crosslinker of embodiment MC19, wherein the multifunctional crosslinker comprises the structure of Formula 1.6.

MC26. The multifunctional crosslinker of embodiment MC18, wherein the multifunctional crosslinker comprises the structure of Formula 2,
wherein:
$R_1$ comprises the first isocyanate functional group,
$R_2$ comprises the second isocyanate functional group, and
$R_3$ comprises the strained cyclic olefin moiety;
or
$R_1$ comprises the first isocyanate functional group,
$R_2$ comprises the strained cyclic olefin moiety, and
$R_3$ comprises the second isocyanate functional group;
or
$R_1$ comprises the strained cyclic olefin moiety,
$R_2$ comprises the first isocyanate functional group, and
$R_3$ comprises the second isocyanate functional group,
or
$R_1$ comprises the second isocyanate functional group,
$R_2$ comprises the first isocyanate functional group, and
$R_3$ comprises the strained cyclic olefin moiety;
or
$R_1$ comprises the second isocyanate functional group,
$R_2$ comprises the strained cyclic olefin moiety, and
$R_3$ comprises the first isocyanate functional group;
or
$R_1$ comprises the strained cyclic olefin moiety,
$R_2$ comprises the second isocyanate functional group, and
$R_3$ comprises the first isocyanate functional group.

MC27. The multifunctional crosslinker of embodiment MC26, wherein the multifunctional crosslinker comprises the structure of Formula 2.1.

MC28. The multifunctional crosslinker of embodiment MC26, wherein the multifunctional crosslinker comprises the structure of Formula 2.2.

MC29. The multifunctional crosslinker of embodiment MC18, wherein the multifunctional crosslinker comprises the structure of Formula 3,
wherein:
$R_1$ comprises the first isocyanate functional group,
$R_2$ comprises the second isocyanate functional group, and
$R_3$ comprises the strained cyclic olefin moiety.

MC30. The multifunctional crosslinker of embodiment MC29, wherein the multifunctional crosslinker comprises the structure of Formula 3.1.

MC31. The multifunctional crosslinker of embodiment MC29, wherein the multifunctional crosslinker comprises the structure of Formula 3.2.

MC32. The multifunctional crosslinker of embodiment MC18, wherein the multifunctional crosslinker comprises the structure of Formula 4:
wherein:
$R_1$ comprises the first isocyanate functional group,
$R_2$ comprises the second isocyanate functional group, and
$R_3$ comprises the strained cyclic olefin moiety.

MC33. The multifunctional crosslinker of embodiment MC32, wherein the multifunctional crosslinker comprises the structure of Formula 4.1.

MC34. The multifunctional crosslinker of embodiment MC32, wherein the multifunctional crosslinker comprises the structure of Formula 4.2.

MC35. The multifunctional crosslinker of embodiment MC18, wherein the multifunctional crosslinker comprises the structure of Formula 5, wherein:

$R_1$ comprises the first isocyanate functional group, $R_2$ comprises the second isocyanate functional group, and $R_3$ comprises the strained cyclic olefin moiety.

MC36. The multifunctional crosslinker of embodiment MC35, wherein the multifunctional crosslinker comprises the structure of Formula 5.1.

MC37. The multifunctional crosslinker of embodiment MC35, wherein the multifunctional crosslinker comprises the structure of Formula 5.2.

MC38. The multifunctional crosslinker of any one of embodiments MC18, MC19, MC26, MC29, MC32, and MC35, wherein the cyclic olefin substructure comprises:

—($C_0$-$C_{10}$ alkyl)-NH—C(=O)O—Y—X, wherein X is the strained cyclic olefin moiety, and wherein Y is $C_0$-$C_{10}$ alkyl.

MC39. The multifunctional crosslinker of any one of embodiments MC18, MC19, MC26, MC29, MC32, MC35, and MC38, wherein the cyclic olefin substructure comprises:

-$L^3$-($C_0$-$C_{10}$ alkyl)-NH—C(=O)O—Y—X, wherein $L^3$ comprises $C_3$-$C_{10}$ cycloalkyl, $C_6$-$C_{10}$ aryl, or $C_3$-$C_{10}$ heteroaryl, wherein X is the strained cyclic olefin moiety, and wherein Y is $C_0$-$C_{10}$ alkyl.

MC40. The multifunctional crosslinker of embodiment MC39, wherein $L^3$ comprises at least one $C_3$-$C_{10}$ cycloalkyl or at least one $C_3$-$C_{10}$ heteroaryl.

MC41. The multifunctional crosslinker of any one of embodiments MC18, MC19, MC26, MC29, MC32, MC35, and MC38-MC40, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety.

MC42. The multifunctional crosslinker of any one of embodiments MC18, MC19, MC26, MC29, MC32, MC35, and MC38-MC41, wherein the strained cyclic olefin moiety comprises a norbornene moiety.

MC43. The multifunctional crosslinker of any one of embodiments MC1-MC10, wherein the multifunctional crosslinker comprises the structure of Formula 6, wherein:

$R_1$ comprises the first isocyanate functional group, and $R_2$ comprises the second isocyanate functional group.

MC44. The multifunctional crosslinker of embodiment MC43, wherein the multifunctional crosslinker comprises the structure of Formula 6.1.

MC45. The multifunctional crosslinker of embodiment MC43, wherein the multifunctional crosslinker comprises the structure of Formula 6.2.

MC46. The multifunctional crosslinker of any one of embodiments MC1-MC10, wherein the multifunctional crosslinker comprises the structure of Formula 7, wherein:

$R_1$ comprises the first isocyanate functional group, $R_2$ comprises the second isocyanate functional group, and A comprises a 5 membered or 6 membered cycloalkyl or heterocyclyl.

MC47. The multifunctional crosslinker of any one of embodiments MC1-MC10 and MC46, wherein the multifunctional crosslinker comprises the structure of Formula 7.1, wherein:

$R_1$ comprises the first isocyanate functional group, and $R_2$ comprises the second isocyanate functional group.

MC48. The multifunctional crosslinker of embodiment MC47, wherein the multifunctional crosslinker comprises the structure of Formula 7.2.

MC49. The multifunctional crosslinker of embodiment MC47, wherein the multifunctional crosslinker comprises the structure of Formula 7.3.

MC50. The multifunctional crosslinker of any one of embodiments MC2-MC49, wherein the first isocyanate substructure comprises: —($C_0$-$C_{10}$ alkyl)-N=C=O.

MC51. The multifunctional crosslinker of any one of embodiments MC2-MC50, wherein the first isocyanate substructure comprises: -$L^1$-($C_0$-$C_{10}$ alkyl)-N=C=O, and wherein $L^1$ comprises $C_3$-$C_{10}$ cycloalkyl, $C_6$-$C_{10}$ aryl, or $C_3$-$C_{10}$ heteroaryl.

MC52. The multifunctional crosslinker of embodiment MC51, wherein $L^1$ comprises at least one $C_3$-$C_{10}$ cycloalkyl or at least one $C_3$-$C_{10}$ heteroaryl.

MC53. The multifunctional crosslinker of any one of embodiments MC2-MC52, wherein the second isocyanate substructure comprises: —($C_0$-$C_{10}$ alkyl)-N=C=O.

MC54. The multifunctional crosslinker of any one of embodiments MC2-MC53, wherein the second isocyanate substructure comprises:

-$L^2$-($C_0$-$C_{10}$ alkyl)-N=C=O, and wherein $L^2$ comprises $C_3$-$C_{10}$ cycloalkyl, $C_6$-$C_{10}$ aryl, or $C_3$-$C_{10}$ heteroaryl.

MC55. The multifunctional crosslinker of embodiment MC54, wherein $L^2$ comprises at least one $C_3$-$C_{10}$ cycloalkyl or at least one $C_3$-$C_{10}$ heteroaryl.

MC56. The multifunctional crosslinker of any one of embodiments MC1-MC55, wherein the cyclic olefin substructure comprises a norbornene moiety.

Illustrative in-Mold Coating Composition (CC) Embodiments

CC1. An in-mold coating composition comprising:

a plurality of polyol molecules;

a polyol-polyol crosslinker functionality;

a polyol-cycloolefin crosslinker functionality; and a urethane formation catalyst.

CC2. The in-mold coating composition of embodiment CC1, wherein the polyol-polyol crosslinker functionality and the polyol-cycloolefin crosslinker functionality reside in a multifunctional crosslinker, the multifunctional crosslinker comprising:

a first isocyanate substructure comprising a first isocyanate functional group;

a second isocyanate substructure comprising a second isocyanate functional group; and a cyclic olefin substructure comprising a strained cyclic olefin moiety.

CC3. An in-mold coating composition comprising:

a plurality of polyol molecules;

a urethane formation catalyst; and a multifunctional crosslinker, wherein the multifunctional crosslinker comprises:

a first isocyanate substructure comprising a first isocyanate functional group;

a second isocyanate substructure comprising a second isocyanate functional group; and a cyclic olefin substructure comprising a strained cyclic olefin moiety.

CC4. The in-mold coating composition of any one of embodiments CC2-CC3, wherein the strained cyclic olefin moiety comprises (a) a norbornene moiety, (b) a 7-oxabicyclo[2.2.1]hept-2-ene moiety, or (c) a 7-oxabicyclo[2.2.1]hept-2-ene moiety.

CC5. The in-mold coating composition of embodiment CC4, wherein the strained cyclic olefin moiety comprises a norbornene moiety.

CC6. The in-mold coating composition of any one of embodiments CC1-CC5, further comprising a UV absorber.

CC7. The in-mold coating composition of embodiment CC6, wherein the UV absorber is selected from the group consisting of: Lowiolite 20 (CAS 131-57-7); CHISORB BP-12 (CAS No. 1843-05-6); CHISORB BP-6 (CAS No. 131-54-4); Tinuvin 1130 (CAS 102577-46-8); Tinuvin 326 (CAS 3864-99-1); Tinuvin 384 (CAS 12759-17-9); Tinuvin 900 (CAS 70321-86-2); Tinuvin 928 (CAS 73936-91-1); Tinuvin 328 (CAS 25973-55-1); Tinuvin 400 (CAS 153519-44-9); Tinuvin 479 (CAS 204848-45-3); Appolo-1164 (CAS 2725-22-6); Appolo-1164L (CAS 137759-38-7); Appolo-1164 GL (CAS1820-28-6); and Appolo-1577 (CAS 147315-50-2).

CC8. The in-mold coating composition of any one of embodiments CC6-CC7, wherein the in-mold coating composition, when applied during an in-mold process to manufacture an in-mold coated article, the in-mold coated article comprising a cycloolefin polymer layer, forms an in-mold multifunctional layer comprising the UV absorber, and wherein the in-mold multifunctional layer comprising the UV absorber blocks at least 70% of UV light from reaching the cycloolefin polymer layer.

CC9. The in-mold coating composition of any one of embodiments CC1-CC8, further comprising a conductive pigment.

CC10. The in-mold coating composition of embodiment CC9, wherein the conductive pigment is selected from the group consisting of: conductive carbon black, graphene, carbon nanotubes, antimony-doped tin oxides, indium-doped tin oxides, and silver-coated particles.

CC11. The in-mold coating composition of any one of embodiments CC9-CC10, wherein the in-mold coating composition, when applied during an in-mold process to manufacture an in-mold coated article, the in-mold coated article comprising a cycloolefin polymer layer, forms an in-mold multifunctional layer comprising the conductive pigment, and wherein the in-mold multifunctional layer comprising the conductive pigment imparts conductivity to the in-mold coated article.

CC12. The in-mold coating composition of embodiment CC8 or embodiment CC11, wherein the cycloolefin polymer layer comprises polydicyclopentadiene (PDCPD).

CC13. The in-mold coating composition of any one of embodiments CC1-CC12, wherein the plurality of polyol molecules comprises acrylic polyol molecules.

CC14. The in-mold coating composition of any one of embodiments CC1-CC13, wherein the plurality of polyol molecules comprises polyester polyol molecules.

CC15. The in-mold coating composition of any one of embodiments CC1-CC14, wherein the plurality of polyol molecules comprises cellulosic polyol molecules.

CC16. The in-mold coating composition of any one of embodiments CC1-CC15, wherein the plurality of polyol molecules comprises:

a plurality of polyolefin polyol molecules; or a mixture of acrylic polyol molecules and polyester polyol molecules; or a mixture of polyester polyol molecules and cellulosic polyol molecules; or a mixture of acrylic polyol molecules and cellulosic polyol molecules; or a mixture of polyester polyol molecules and polyolefin polyol molecules; or a mixture of cellulosic polyol molecules and polyolefin polyol molecules; or a mixture of acrylic polyol molecules and polyolefin polyol molecules; or a mixture of acrylic polyol molecules, polyester polyol molecules, and cellulosic polyol molecules; or a mixture of acrylic polyol molecules, polyester polyol molecules, and polyolefin polyol molecules; or a mixture of acrylic polyol molecules, polyolefin polyol molecules, and cellulosic polyol molecules; or a mixture of polyolefin polyol molecules, polyester polyol molecules, and cellulosic polyol molecules.

CC17. The in-mold coating composition of any one of embodiments CC1-CC16, wherein the urethane formation catalyst comprises a tin-based catalyst, a bismuth-based catalyst, a zinc-based catalyst, or a titanium-based catalyst.

CC18. The in-mold coating composition of embodiment CC17, wherein the tin-based catalyst is an organotin catalyst, the bismuth-based catalyst is an organobismuth catalyst, or the titanium-based catalyst is a titanate catalyst.

CC19. The in-mold coating composition of embodiment CC17, wherein the tin-based catalyst is dibutyltin dilaureate, dioctyl tin dilaurate, dibutyltin mercaptide, dioctyl tin mercaptide, dimethyl tin dilaurate, or dimethyl tin mercaptide.

CC20. The in-mold coating composition of any one of embodiments CC2-CC19, wherein the multifunctional crosslinker comprises a structure selected from the group consisting of: Formula 1, Formula 2, Formula 3, Formula 4, and Formula 5, wherein:

$R_1$ comprises the first isocyanate functional group, $R_2$ comprises the second isocyanate functional group, and $R_3$ comprises the strained cyclic olefin moiety;

or $R_1$ comprises the first isocyanate functional group, $R_2$ comprises the strained cyclic olefin moiety, and $R_3$ comprises the second isocyanate functional group;

or $R_1$ comprises the strained cyclic olefin moiety, $R_2$ comprises the first isocyanate functional group, and $R_3$ comprises the second isocyanate functional group, or $R_1$ comprises the second isocyanate functional group, $R_2$ comprises the first isocyanate functional group, and $R_3$ comprises the strained cyclic olefin moiety;

or $R_1$ comprises the second isocyanate functional group, $R_2$ comprises the strained cyclic olefin moiety, and $R_3$ comprises the first isocyanate functional group;

or $R_1$ comprises the strained cyclic olefin moiety, $R_2$ comprises the second isocyanate functional group, and $R_3$ comprises the first isocyanate functional group.

CC21. The in-mold coating composition of embodiment CC20, wherein the multifunctional crosslinker comprises the structure of Formula 1, wherein:

$R_1$ comprises the first isocyanate functional group, $R_2$ comprises the second isocyanate functional group, and $R_3$ comprises the strained cyclic olefin moiety.

CC22. The in-mold coating composition of embodiment CC21, wherein the multifunctional crosslinker comprises the structure of Formula 1.1.

CC23. The in-mold coating composition of embodiment CC21, wherein the multifunctional crosslinker comprises the structure of Formula 1.2.

CC24. The in-mold coating composition of embodiment CC21, wherein the multifunctional crosslinker comprises the structure of Formula 1.3.

CC25. The in-mold coating composition of embodiment CC21, wherein the multifunctional crosslinker comprises the structure of Formula 1.4.

CC26. The in-mold coating composition of embodiment CC21, wherein the multifunctional crosslinker comprises the structure of Formula 1.5.

CC27. The in-mold coating composition of embodiment CC21, wherein the multifunctional crosslinker comprises the structure of Formula 1.6.

CC28. The in-mold coating composition of embodiment CC20, wherein the multifunctional crosslinker comprises the structure of Formula 2, wherein:

$R_1$ comprises the first isocyanate functional group, $R_2$ comprises the second isocyanate functional group, and $R_3$ comprises the strained cyclic olefin moiety;

or $R_1$ comprises the first isocyanate functional group, $R_2$ comprises the strained cyclic olefin moiety, and $R_3$ comprises the second isocyanate functional group;

or $R_1$ comprises the strained cyclic olefin moiety, $R_2$ comprises the first isocyanate functional group, and $R_3$ comprises the second isocyanate functional group, or $R_1$ comprises the second isocyanate functional group, $R_2$ comprises the first isocyanate functional group, and $R_3$ comprises the strained cyclic olefin moiety;

or $R_1$ comprises the second isocyanate functional group, $R_2$ comprises the strained cyclic olefin moiety, and $R_3$ comprises the first isocyanate functional group;

or $R_1$ comprises the strained cyclic olefin moiety, $R_2$ comprises the second isocyanate functional group, and $R_3$ comprises the first isocyanate functional group.

CC29. The in-mold coating composition of embodiment CC28, wherein the multifunctional crosslinker comprises the structure of Formula 2.1.

CC30. The in-mold coating composition of embodiment CC28, wherein the multifunctional crosslinker comprises the structure of Formula 2.2.

CC31. The in-mold coating composition of embodiment CC20, wherein the multifunctional crosslinker comprises the structure of Formula 3, wherein:

$R_1$ comprises the first isocyanate functional group, $R_2$ comprises the second isocyanate functional group, and $R_3$ comprises the strained cyclic olefin moiety.

CC32. The in-mold coating composition of embodiment CC31, wherein the multifunctional crosslinker comprises the structure of Formula 3.1.

CC33. The in-mold coating composition of embodiment CC31, wherein the multifunctional crosslinker comprises the structure of Formula 3.2.

CC34. The in-mold coating composition of embodiment CC20, wherein the multifunctional crosslinker comprises the structure of Formula 4, wherein:

$R_1$ comprises the first isocyanate functional group, $R_2$ comprises the second isocyanate functional group, and $R_3$ comprises the strained cyclic olefin moiety.

CC35. The in-mold coating composition of embodiment CC34, wherein the multifunctional crosslinker comprises the structure of Formula 4.1.

CC36. The in-mold coating composition of embodiment CC34, wherein the multifunctional crosslinker comprises the structure of Formula 4.2.

CC37. The in-mold coating composition of embodiment CC20, wherein the multifunctional crosslinker comprises the structure of Formula 5, wherein:

$R_1$ comprises the first isocyanate functional group, $R_2$ comprises the second isocyanate functional group, and $R_3$ comprises the strained cyclic olefin moiety.

CC38. The in-mold coating composition of embodiment CC37, wherein the multifunctional crosslinker comprises the structure of Formula 5.1.

CC39. The in-mold coating composition of embodiment CC37, wherein the multifunctional crosslinker comprises the structure of Formula 5.2.

CC40. The in-mold coating composition of any one of embodiments CC20, CC21, CC28, CC31, CC34, and CC37, wherein the cyclic olefin substructure comprises:

$$-(C_0\text{-}C_{10}\text{ alkyl})\text{-NH}-C(=O)O-Y-X,$$

wherein X is the strained cyclic olefin moiety, and wherein Y is $C_0$-$C_{10}$ alkyl.

CC41. The in-mold coating composition of any one of embodiments CC20, CC21, CC28, CC31, CC34, CC37, and CC40, wherein the cyclic olefin substructure comprises:

$$-L^3\text{-}(C_0\text{-}C_{10}\text{ alkyl})\text{-NH}-C(=O)O-Y-X,$$

wherein $L^3$ comprises $C_3$-$C_{10}$ cycloalkyl, $C_6$-$C_{10}$ aryl, or $C_3$-$C_{10}$ heteroaryl, wherein X is the strained cyclic olefin moiety, and wherein Y is $C_0$-$C_{10}$ alkyl.

CC42. The in-mold coating composition of embodiment CC41, wherein $L^3$ comprises at least one $C_3$-$C_{10}$ cycloalkyl or at least one $C_3$-$C_{10}$ heteroaryl.

CC43. The in-mold coating composition of any one of embodiments CC20, CC21, CC28, CC31, CC34, CC37, and CC40-CC42, wherein the strained cyclic olefin moiety comprises (a) a norbornene moiety, (b) a 7-oxabicyclo[2.2.1] hept-2-ene moiety, or (c) a 7-oxabicyclo[2.2.1]hept-2-ene moiety.

CC44. The in-mold coating composition of any one of embodiments CC20, CC21, CC28, CC31, CC34, CC37, and CC40-CC43, wherein the strained cyclic olefin moiety comprises a norbornene moiety.

CC45. The in-mold coating composition of any one of embodiments CC2-CC19, wherein the multifunctional crosslinker comprises the structure of Formula 6, wherein:

$R_1$ comprises the first isocyanate functional group, and $R_2$ comprises the second isocyanate functional group.

CC46. The in-mold coating composition of embodiment CC45, wherein the multifunctional crosslinker comprises the structure of Formula 6.1.

CC47. The in-mold coating composition of embodiment CC45, wherein the multifunctional crosslinker comprises the structure of Formula 6.2.

CC48. The in-mold coating composition of any one of embodiments CC2-CC19, wherein the multifunctional crosslinker comprises the structure of Formula 7, wherein:

$R_1$ comprises the first isocyanate functional group, $R_2$ comprises the second isocyanate functional group, and A comprises a 5 membered or 6 membered cycloalkyl or heterocyclyl.

CC49. The in-mold coating composition of any one of embodiments CC2-CC19 and CC46, wherein the multifunctional crosslinker comprises the structure of Formula 7.1, wherein:

$R_1$ comprises the first isocyanate functional group, and $R_2$ comprises the second isocyanate functional group.

CC50. The in-mold coating composition of embodiment CC49, wherein the multifunctional crosslinker comprises the structure of Formula 7.2.

CC51. The in-mold coating composition of embodiment CC49, wherein the multifunctional crosslinker comprises the structure of Formula 7.3.

CC52. The in-mold coating composition of any one of embodiments CC2-CC51, wherein the first isocyanate substructure comprises:

$$—(C_0\text{-}C_{10}\text{ alkyl})\text{-N}{=}C{=}O.$$

CC53. The in-mold coating composition of any one of embodiments CC2-CC52, wherein the first isocyanate substructure comprises:

$$-L^1\text{-}(C_0\text{-}C_{10}\text{ alkyl})\text{-N}{=}C{=}O, \text{ and}$$

wherein $L^1$ comprises $C_3$-$C_{10}$ cycloalkyl, $C_6$-$C_{10}$ aryl, or $C_3$-$C_{10}$ heteroaryl.

CC54. The in-mold coating composition of embodiment CC53, wherein $L^1$ comprises at least one $C_3$-$C_{10}$ cycloalkyl or at least one $C_3$-$C_{10}$ heteroaryl.

CC55. The in-mold coating composition of any one of embodiments CC2-CC54, wherein the second isocyanate substructure comprises:

$$—(C_0\text{-}C_{10}\text{ alkyl})\text{-N}{=}C{=}O.$$

CC56. The in-mold coating composition of any one of embodiments CC2-CC55, wherein the second isocyanate substructure comprises:

$$-L^2\text{-}(C_0\text{-}C_{10}\text{ alkyl})\text{-N}{=}C{=}O, \text{ and}$$

wherein $L^2$ comprises $C_3$-$C_{10}$ cycloalkyl, $C_6$-$C_{10}$ aryl, or $C_3$-$C_{10}$ heteroaryl.

CC57. The in-mold coating composition of embodiment CC56, wherein $L^2$ comprises at least one $C_3$-$C_{10}$ cycloalkyl or at least one $C_3$-$C_{10}$ heteroaryl.

CC58. The in-mold coating composition of any one of embodiments CC2-CC57, wherein the cyclic olefin substructure comprises a norbornene moiety.

CC59. The in-mold coating composition of any one of embodiments CC2-CC19, the in-mold coating composition comprising of the multifunctional crosslinker of any one of embodiments MC1-MC56.

Illustrative in-Mold Coating System (CS) Embodiments

CS1. A multi-component system for use in manufacturing an in-mold coated article, the in-mold coated article comprising a cycloolefin polymer layer, the multi-component system comprising:

a first component comprising a plurality of polyol molecules; and a second component comprising the multifunctional crosslinker of any one of embodiments MC1-MC56.

CS2. The multi-component system of embodiment CS1, wherein the plurality of polyol molecules comprises acrylic polyol molecules.

CS3. The multi-component system of any one of embodiments CS1-CS2, wherein the plurality of polyol molecules comprises polyester polyol molecules.

CS4. The multi-component system of any one of embodiments CS1-CS3, wherein the plurality of polyol molecules comprises cellulosic polyol molecules.

CS5. The multi-component system of any one of embodiments CS1-CS4, wherein the plurality of polyol molecules comprises:

a plurality of polyolefin polyol molecules; or a mixture of acrylic polyol molecules and polyester polyol molecules; or a mixture of polyester polyol molecules and cellulosic polyol molecules; or a mixture of acrylic polyol molecules and cellulosic polyol molecules; or a mixture of polyester polyol molecules and polyolefin polyol molecules; or a mixture of cellulosic polyol molecules and polyolefin polyol molecules; or a mixture of acrylic polyol molecules and polyolefin polyol molecules; or a mixture of acrylic polyol molecules, polyester polyol molecules, and cellulosic polyol molecules; or a mixture of acrylic polyol molecules, polyester polyol molecules, and polyolefin polyol molecules; or a mixture of acrylic polyol molecules, polyolefin polyol molecules, and cellulosic polyol molecules; or a mixture of polyolefin polyol molecules, polyester polyol molecules, and cellulosic polyol molecules.

CS6. The multi-component system of any one of embodiments CS1-CS5, wherein the first component and/or the second component comprises a urethane formation catalyst.

CS7. The multi-component system of embodiment CS6, wherein the urethane formation catalyst comprises a tin-based catalyst, a bismuth-based catalyst, a zinc-based catalyst, or a titanium-based catalyst.

CS8. The multi-component system of any one of embodiments CS1-CS7, wherein the cycloolefin polymer layer comprises polydicyclopentadiene (PDCPD).

Illustrative in-Mold Method and Article (MA) Embodiments

MA1. A method of manufacturing an in-mold coated article, the method comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one of the one or more in-mold coating compositions is an in-mold multifunctional composition, the in-mold multifunctional composition comprising:

a plurality of polyol molecules;

a polyol-polyol crosslinker functionality;

a polyol-cycloolefin crosslinker functionality; and a urethane formation catalyst; and wherein the in-mold multifunctional composition forms an in-mold multifunctional layer that adheres to the cycloolefin polymer layer to form an in-mold coated article.

MA2. The method of embodiment MA1, wherein the polyol-polyol crosslinker functionality and the polyol-cycloolefin crosslinker functionality reside in a multifunctional crosslinker.

MA3. A method of manufacturing an in-mold coated article, the method comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one of the one or more in-mold coating compositions is an in-mold multifunctional composition, the in-mold multifunctional composition comprising:

a plurality of polyol molecules;

a urethane formation catalyst; and a multifunctional crosslinker; and wherein the in-mold multifunctional composition forms an in-mold multifunctional layer that adheres to the cycloolefin polymer layer to form an in-mold coated article.

MA4. The method of any one of embodiments MA2-MA3, wherein the multifunctional crosslinker comprises:

a first isocyanate substructure comprising a first isocyanate functional group;

a second isocyanate substructure comprising a second isocyanate functional group, and a cyclic olefin substructure comprising a strained cyclic olefin moiety.

MA5. The method of any one of embodiments MA1-MA4, wherein the one or more layers of coating material comprises a first layer of coating material, wherein the first layer of coating material is an in-mold multifunctional layer;

wherein a first interface forms between the first layer of coating material and the cycloolefin polymer layer, and wherein the first layer of coating material adheres to the cycloolefin polymer layer.

MA6. The method of embodiment MA5, wherein the first layer of coating material is an in-mold paintable layer.

MA7. The method of embodiment MA5, wherein the one or more layers of coating material comprises a second layer of coating material, wherein a second interface forms between the second layer of coating material and the first layer of coating material, and wherein the second layer of coating material adheres to the first layer of coating material.

MA8. The method of embodiment MA7, wherein the second layer of coating material is an in-mold paintable layer.

MA9. The method of embodiment MA7, wherein the one or more layers of coating material comprises a third layer of coating material, wherein a third interface forms between the third layer of coating material and the second layer of coating material, and wherein the third layer of coating material adheres to the second layer of coating material.

MA10. The method of embodiment MA9, wherein third layer of coating material is an in-mold paintable layer.

MA11. The method of any one of embodiments MA1-MA10, the method having a total flash time of 120 minutes or less.

MA12. The method of embodiment MA11, wherein the total flash time is between 1 second and 120 minutes.

MA13. The method of any one of embodiments MA1-MA12, wherein the prepared mold surface comprises a precoating material.

MA14. The method of embodiment MA13, wherein the precoating material comprises a mold release agent.

MA15. The method of any one of embodiments MA1-MA14, wherein the in-mold multifunctional composition comprises acrylic polyol molecules.

MA16. The method of any one of embodiments MA1-MA15, wherein the in-mold multifunctional composition comprises polyester polyol molecules.

MA17. The method of any one of embodiments MA1-MA16, wherein the in-mold multifunctional composition comprises cellulosic polyol molecules.

MA18. The method of any one of embodiments MA1-MA17, wherein the in-mold multifunctional composition comprises:

a plurality of polyolefin polyol molecules; or a mixture of acrylic polyol molecules and polyester polyol molecules; or a mixture of polyester polyol molecules and cellulosic polyol molecules; or a mixture of acrylic polyol molecules and cellulosic polyol molecules; or a mixture of polyester polyol molecules and polyolefin polyol molecules; or a mixture of cellulosic polyol molecules and polyolefin polyol molecules; or a mixture of acrylic polyol molecules and polyolefin polyol molecules; or a mixture of acrylic polyol molecules, polyester polyol molecules, and cellulosic polyol molecules; or a mixture of acrylic polyol molecules, polyester polyol molecules, and polyolefin polyol molecules; or a mixture of acrylic polyol molecules, polyolefin polyol molecules, and cellulosic polyol molecules; or a mixture of polyolefin polyol molecules, polyester polyol molecules, and cellulosic polyol molecules.

MA19. The method of any one of embodiments MA1-MA18, wherein the polymerizable cyclic olefin material comprises polydicyclopentadiene (PDCPD).

MA20. The method of any one of embodiments MA1-MA19, wherein at least one in-mold coating composition comprises a UV absorber.

MA21. The method of embodiment MA20, wherein the UV absorber is selected from the group consisting of: Lowiolite 20 (CAS 131-57-7); CHISORB BP-12 (CAS No. 1843-05-6); CHISORB BP-6 (CAS No. 131-54-4); Tinuvin 1130 (CAS 102577-46-8); Tinuvin 326 (CAS 3864-99-1); Tinuvin 384 (CAS 12759-17-9); Tinuvin 900 (CAS 70321-86-2); Tinuvin 928 (CAS 73936-91-1); Tinuvin 328 (CAS 25973-55-1); Tinuvin 400 (CAS 153519-44-9); Tinuvin 479 (CAS 204848-45-3); Appolo-1164 (CAS 2725-22-6); Appolo-1164L (CAS 137759-38-7); Appolo-1164 GL (CAS1820-28-6); and Appolo-1577 (CAS 147315-50-2).

MA22. The method of any one of embodiments MA20-MA21, wherein the in-mold coating composition comprising the UV absorber blocks at least 70% of UV light from reaching the cycloolefin polymer layer.

MA23. The method of any one of embodiments MA5-MA22, wherein the cycloolefin polymer layer and the in-mold multifunctional layer share an interface, and the strained cyclic olefin moiety adheres to the cycloolefin polymer layer at the interface.

MA24. The method of any one of embodiments MA1-MA23, wherein the strained cyclic olefin moiety binds to the cycloolefin polymer layer through a non-covalent binding interaction.

MA25. The method of any one of embodiments MA1-MA23, wherein the strained cyclic olefin moiety binds to a cycloolefin polymer layer through a covalent bond.

MA26. The method of embodiment MA25, wherein the covalent bond results from a ring opening metathesis polymerization (ROMP) reaction.

MA27. The method of any one of embodiments MA1-MA26, wherein the strained cyclic olefin moiety comprises a norbornene moiety.

MA28. The method of any one of embodiments MA1-MA26, wherein the strained cyclic olefin moiety comprises one or more of a mono-unsaturated cyclic olefin moiety, monocyclic diene moiety, bicyclic olefin moiety, and polycyclic olefin moiety.

MA29. The method of any one of embodiments MA1-MA26, wherein the strained cyclic olefin moiety is derived from 5-norbornene-2-methanol (NB-MeOH), 2-hydroxyethyl bicycle[2.2.1]hept-2-ene-carboxylate (HPMNB), 2-cycloocten-1-ol, or 2-cyclooctadiene-1-ol.

MA30. The method of embodiment MA29, wherein the cyclic olefin moiety is derived from 5-norbornene-2-methanol (NB-MeOH).

MA31. The method of any one of embodiments MA1-MA30, wherein the polymerizable cyclic olefin material is a material comprising molecules that comprise a strained cyclic olefin moiety.

MA32. The method of embodiment MA31, wherein the strained cyclic olefin moiety comprises a bridged bicyclic moiety.

MA33. The method of any one of embodiments MA31-MA32, wherein the strained cyclic olefin moiety comprises a bicyclo[2.2.1]hept-2-ene moiety, 7-oxabicyclo[2.2.1]hept-2-ene moiety, or a 2-oxabicyclo[2.2.1]hept-5-ene moiety.

MA34. The method of embodiment MA33, wherein the strained cyclic olefin moiety comprises a bicyclo[2.2.1]hept-2-ene moiety.

MA35. The method of any one of embodiments MA31-MA34, wherein the strained cyclic olefin moiety comprises one or more of: dicyclopentadiene or tricyclopentadiene.

MA36. The method of any one of embodiments MA31-MA35, wherein the strained cyclic olefin moiety comprises dicyclopentadiene.

MA37. The method of any one of embodiments MA1-MA36, wherein the polymerization reaction is a ring-opening metathesis polymerization reaction or a vinyl-type addition polymerization reaction.

MA38. The method of embodiment MA37, wherein the polymerization reaction is a ring-opening metathesis polymerization reaction.

MA39. The method of any one of embodiments MA1-MA31, wherein the cycloolefin polymer layer comprises one or more of: dicyclopentadiene; tricyclopentadiene; and dicyclohexadiene.

MA40. The method of any one of embodiments MA1-MA31, wherein the cycloolefin polymer layer comprises polydicyclopentadiene.

MA41. The method of any one of embodiments MA1-MA40, wherein contacting the prepared mold surface with the in-mold coating composition comprises heating and/or solvent evaporation.

MA42. The method of any one of embodiments MA1-MA41, wherein at least one in-mold coating composition comprises a conductive pigment.

MA43. The method of any one of embodiments MA1-MA42, wherein the urethane formation catalyst comprises a tin-based catalyst, bismuth-based catalyst, zinc-based catalyst or titanium-based catalyst.

MA44. The method of embodiment MA43, wherein the tin-based catalyst is an organotin catalyst, the bismuth-based catalyst is an organobismuth catalyst, or the titanium-based catalyst is a titanate catalyst.

MA45. The method of embodiment MA44, wherein the tin-based catalyst is dibutyltin dilaureate, dioctyl tin dilaurate, dibutyltin mercaptide, dioctyl tin mercaptide, dimethyl tin dilaurate, or dimethyltin mercaptide.

MA46. The method of any one of embodiments MA1-MA45, wherein contacting the coated mold surface with a cycloolefin resin comprises heating.

MA47. The method of any one of embodiments MA2-MA46, wherein the multifunctional crosslinker is the multifunctional crosslinker of any one of embodiments MC1-MC56.

MA48. The method of any one of embodiments MA2-MA47, wherein the multifunctional crosslinker comprises the structure of Formula 1.

MA49. The method of embodiment MA11, wherein the total flash time is between 1 second and 60 minutes.

MA50. The method of embodiment MA11, wherein the total flash time is between 1 second and 30 minutes.

MA51. The method of embodiment MA11, wherein the total flash time is between 1 second and 10 minutes.

MA52. The method of embodiment MA11, wherein the total flash time is between 1 second and 5 minutes.

MA53. The method of embodiment MA11, wherein the total flash time is between 1 second and 1 minute.

MA54. An in-mold coated article, the article manufactured using the method of any one of embodiments MA1-MA53.

MA55. The in-mold coated article of embodiment MA54, wherein the in-mold coated article comprises a cycloolefin polymer layer having an in-mold coating layer adhered to a surface thereof, and wherein the in-mold coating layer has a pencil hardness of 2H or harder.

MA56. The in-mold coated article of embodiment MA54, wherein the in-mold coated article comprises a cycloolefin polymer layer having an in-mold coating layer adhered to a surface thereof, and wherein the in-mold coating layer is capable of passing one or more of the following industry recognized tests: (a) Tape Adhesion (6×6, 2 mm); (b) Distilled Water Immersion×96 hours@25° C. (Tested in accordance with John Deere (JDQ) 138A); (c) Engine Oil Spot Test×24 hours (Tested in accordance with JDQ 142D); (d) Diesel Fuel Spot Test (Tested in accordance with JDQ 142F); (e) Unleaded Fuel Spot Test (Tested in accordance with JDQ 142G); (f) Humidity (38° C., 100% RH)×144 hours; and (g) Post Humidity Adhesion (6×6, 1 mm spacing).

MA57. The in-mold coated article of embodiment MA54, wherein the in-mold coated article comprises a cycloolefin polymer layer having an in-mold paintable layer adhered thereto, wherein the in-mold paintable layer is a layer capable of adhering a weatherable coating system with sufficient adherence to pass one or more of the following relevant industry recognized tests: (a) Thermal Shock Adhesion (Tested in accordance with Ford Laboratory Test Method (FLTM) BI 107-05); (b) Humidity (85° C., 90% RH)×96 hours (Tested in accordance with FLTM BI 106-01); and (c) Post Humidity Adhesion (lightly sanded) (Tested in accordance with FLTM BI 106-01).

Illustrative Crosslinked Polyol (CP) Embodiments

CP1. A crosslinked polyol comprising:
a first polyol molecule;
a second polyol molecule; and
a linked multifunctional crosslinker,
wherein the linked multifunctional crosslinker comprises a strained cyclic olefin moiety, and
wherein the linked multifunctional crosslinker
is bound to the first polyol molecule though a first urethane functional group, and
is bound to the second polyol molecule though a second urethane functional group.

CP2. The crosslinked polyol of embodiment CP1, wherein the crosslinked polyol comprises the structure of Formula 8.

CP3. The crosslinked polyol of embodiment CP1, wherein the crosslinked polyol comprises the structure of Formula 9.

CP4. The crosslinked polyol of any one of embodiments CP1-CP3, wherein the strained cyclic olefin moiety adheres to a cycloolefin polymer layer.

CP5. The crosslinked polyol of any one of embodiments CP1-CP4, wherein the strained cyclic olefin moiety binds to a cycloolefin polymer layer through a non-covalent binding interaction.

CP6. The crosslinked polyol of any one of embodiments CP1-CP4, wherein the strained cyclic olefin moiety binds to a cycloolefin polymer layer through a covalent bond.

CP7. The crosslinked polyol of embodiment CP6, wherein the covalent bond results from a ring opening metathesis polymerization (ROMP) reaction.

CP8. The crosslinked polyol embodiment CP1, wherein the multifunctional crosslinker is the multifunctional crosslinker of any one of embodiments MC1-MC56.

CP9. A crosslinked polyol, the crosslinked polyol produced by a process comprising: providing a first component and a second component,
the first component comprising a plurality of polyol molecules, and
the second component comprising a plurality of multifunctional crosslinkers, the plurality of multifunctional crosslinkers comprising the multifunctional crosslinker of any one of embodiments MC1-MC56, and
mixing the first component and the second component in the presence of a urethane formation catalyst to provide a reaction product, the reaction product comprising the crosslinked polyol, the crosslinked polyol comprising:
a first polyol molecule;
a second polyol molecule; and
a linked multifunctional crosslinker,
wherein the linked multifunctional crosslinker
is bound to the first polyol molecule though a first urethane functional group, and
is bound to the second polyol molecule though a second urethane functional group, and
wherein the linked multifunctional crosslinker comprises a strained cyclic olefin moiety.

CP10. The crosslinked polyol of embodiment CP9, wherein the strained cyclic olefin moiety comprises a norbornene moiety.

What is claimed is:

1. An in-mold coating composition comprising:
a plurality of polyol molecules;
a urethane formation catalyst; and
a multifunctional crosslinker,
wherein the multifunctional crosslinker comprises a structure of Formula 1:

(1)

$R_1$ comprises a first isocyanate functional group,
$R_2$ comprises a second isocyanate functional group, and
$R_3$ comprises a strained cyclic olefin moiety.

2. The in-mold coating composition of claim 1, wherein $R_3$ comprises a group of formula:

—($C_0$-$C_{10}$ alkyl)-NH—C(═O)O—Y—X, wherein X is the strained cyclic olefin moiety, and
wherein Y is $C_0$-$C_{10}$ alkyl.

3. The in-mold coating composition of claim 1, wherein the structure of Formula 1 is represented by a structure of Formula 1.1:

4. The in-mold coating composition of claim 1, wherein the plurality of polyol molecules comprises acrylic polyol molecules.

5. The in-mold coating composition of claim 1, wherein the plurality of polyol molecules comprises polyester polyol molecules.

6. The in-mold coating composition of claim 1, wherein the plurality of polyol molecules comprises cellulosic polyol molecules.

7. The in-mold coating composition of claim 1, wherein the plurality of polyol molecules comprises poly(alphaolefin) polyol molecules.

8. The in-mold coating composition of claim 1, wherein the in-mold coating composition comprises a conductive pigment.

9. A multifunctional crosslinker of Formula 1:

(1)

wherein:

$R_1$ comprises a first isocyanate functional group, $R_2$ comprises a second isocyanate functional group, and $R_3$ comprises a strained cyclic olefin moiety.

10. The multifunctional crosslinker of claim 9, wherein the cyclic olefin substructure comprises wherein $R_3$ comprises a group of formula:

—$(C_0$-$C_{10}$ alkyl)-NH—C(=O)O—Y—X, wherein X is the strained cyclic olefin moiety, and wherein Y is $C_0$-$C_{10}$ alkyl.

11. The multifunctional crosslinker of claim 9, wherein the multifunctional crosslinker comprises the structure of Formula 1.1:

12. A crosslinked polyol, the crosslinked polyol produced by a process comprising:

providing a first component and a second component, the first component comprising a plurality of polyol molecules, and the second component comprising a plurality of multifunctional crosslinkers, the plurality of multifunctional crosslinkers comprising the multifunctional crosslinker of claim 10, and mixing the first component and the second component in the presence of a urethane formation catalyst to provide a reaction product, the reaction product comprising the crosslinked polyol.

13. The crosslinked polyol of claim 12, wherein the crosslinked polyol comprises the structure of Formula 8:

wherein:

comprises the first polyol molecule, and comprises the second polyol molecule.

14. The crosslinked polyol of claim 12, wherein the plurality of polyol molecules comprises acrylic polyol molecules.

15. The crosslinked polyol of claim 12, wherein the plurality of polyol molecules comprises polyester polyol molecules.

16. The crosslinked polyol of claim 12, wherein the plurality of polyol molecules comprises cellulosic polyol molecules.

17. The crosslinked polyol of claim 12, wherein the plurality of polyol molecules comprises poly(alphaolefin) polyol molecules.

18. A method of manufacturing an in-mold coated article, the method comprising:

providing a mold having a prepared mold surface;

contacting the prepared mold surface with one or more in-mold coating compositions, thereby providing a coated mold surface having one or more layers of coating material; and contacting the coated mold surface with a polymerizable cyclic olefin material to form a cycloolefin polymer layer through a polymerization reaction, wherein at least one of the one or more in-mold coating compositions is an in-mold multifunctional composition, the in-mold multifunctional composition comprising:

a plurality of polyol molecules;

a urethane formation catalyst; and a multifunctional crosslinker comprising a structure of Formula 1:

$$(1)$$

wherein:

R$_1$ comprises a first isocyanate functional group,

R$_2$ comprises a second isocyanate functional group, and

R$_3$ comprises a strained cyclic olefin moiety; and wherein the in-mold multifunctional composition forms an in-mold multifunctional layer that adheres to the cycloolefin polymer layer to form an in-mold coated article.

19. The method of claim 18, wherein the multifunctional crosslinker comprises:

a first isocyanate substructure comprising a first isocyanate functional group;

a second isocyanate substructure comprising a second isocyanate functional group, and a cyclic olefin substructure comprising a strained cyclic olefin moiety.

20. The method of claim 18, wherein the polymerizable cyclic olefin material comprising polycyclopentadiene (PDCPD).

21. The method of claim 18, wherein at least one of the one or more in-mold coating compositions comprises a conductive pigment.

22. An in-mold coated article, the in-mold coated article manufactured using the method of claim 18.

23. A process for producing a crosslinked polyol, the process comprising:

providing a first component and a second component, the first component comprising a plurality of polyol molecules, and the second component comprising a plurality of multifunctional crosslinkers, the plurality of multifunctional crosslinkers comprising a multifunctional crosslinker comprising a structure of Formula 1:

$$(1)$$

wherein:

R$_1$ comprises a first isocyanate functional group,

R$_2$ comprises a second isocyanate functional group, and

R$_3$ comprises a strained cyclic olefin moiety;

and mixing the first component and the second component in the presence of a urethane formation catalyst to provide a reaction product, the reaction product comprising the crosslinked polyol.

* * * * *